US009170989B2

(12) United States Patent
Norwood et al.

(10) Patent No.: US 9,170,989 B2
(45) Date of Patent: Oct. 27, 2015

(54) SYSTEM AND METHOD FOR FACILITATING POSTING OF PUBLIC AND PRIVATE USER COMMENTS AT A WEB SITE

(71) Applicants: Michael R Norwood, Ormond Beach, FL (US); Mauricio Luiz Schiavon Marini, Sao-Paoulo (BR)

(72) Inventors: Michael R Norwood, Ormond Beach, FL (US); Mauricio Luiz Schiavon Marini, Sao-Paoulo (BR)

(73) Assignee: SOCIAL COMMENTING, LLC, Sedona, AZ (US)

( * ) Notice: Subject to any disclaimer, the term of this patent is extended or adjusted under 35 U.S.C. 154(b) by 0 days.

(21) Appl. No.: 14/267,299

(22) Filed: May 1, 2014

(65) Prior Publication Data

US 2014/0298160 A1   Oct. 2, 2014

Related U.S. Application Data

(63) Continuation of application No. 13/759,693, filed on Feb. 5, 2013, which is a continuation of application No. 11/818,912, filed on Jun. 15, 2007, now Pat. No. 8,402,357.

(60) Provisional application No. 60/813,982, filed on Jun. 15, 2006.

(51) Int. Cl.
*G06F 17/00* (2006.01)
*G06F 17/22* (2006.01)
*G06F 17/30* (2006.01)

(52) U.S. Cl.
CPC ........ *G06F 17/2247* (2013.01); *G06F 17/3089* (2013.01); *G06F 17/30867* (2013.01)

(58) Field of Classification Search
CPC .............. G06F 17/2235; G06F 17/211; G06F 17/30867
USPC .......... 715/202, 234, 243, 246, 256; 705/319, 705/344
See application file for complete search history.

(56) References Cited

U.S. PATENT DOCUMENTS 5,794,039 A  *  8/1998  Guck .................................. 1/1
6,297,819 B1     10/2001  Furst
(Continued)

FOREIGN PATENT DOCUMENTS

DE         10131571 A1    1/2003
FR         EP 0940960      *  9/1999
(Continued)

OTHER PUBLICATIONS

Fiedler, Sebastian, et al, "Navigating Personal Information Repositories with Weblog Authoring and Concept Mapping", Jan. 2005, University of Augsburg, Augsburg, Germany, pp. 302-325, ISBN 3-540-26921-5 978-3-540-26921-2.*
(Continued)

*Primary Examiner* — Laurie Ries
(74) *Attorney, Agent, or Firm* — Smith Risley Tempel Santos LLC; Gregory Scott Smith

(57) ABSTRACT

A software system and method that allows web site operators to adapt web pages for posting of public and private user comments. An administrator accesses a web site to enter data for creating reader comment areas. HTML code for the reader comment areas is generated for insertion into web pages. When the web page containing the code is posted to a web site, the code results in a reader comment display page where web site visitors can comment on the content of the particular web page where the reader comment area appears. Comments are saved at a remote web site accessible to the administrator. The administrator may review and manage the reader comments. A reader who makes a comment on a web page has the option of creating a personal journal comprising all comments entered by the reader at any web page enabled according to the invention.

9 Claims, 72 Drawing Sheets

(56) References Cited

U.S. PATENT DOCUMENTS

| | | |
|---|---|---|
| 6,421,724 B1 | 7/2002 | Nickerson |
| 6,606,581 B1 | 8/2003 | Nickerson et al. |
| 6,748,449 B1 | 6/2004 | Dutta |
| 6,928,392 B2 | 8/2005 | Nickerson |
| 7,032,005 B2* | 4/2006 | Mathon et al. ............... 709/206 |
| 7,060,532 B2* | 6/2006 | Takyu et al. ................. 438/114 |
| 7,062,532 B1* | 6/2006 | Sweat et al. ................. 709/205 |
| 7,085,820 B1 | 8/2006 | Nickerson |
| 7,130,885 B2* | 10/2006 | Chandra et al. .............. 709/206 |
| 7,162,471 B1* | 1/2007 | Knight et al. ................ 707/750 |
| 7,203,704 B1 | 4/2007 | Stern et al. |
| 7,370,285 B1 | 5/2008 | Nickerson et al. |
| 7,478,121 B1 | 1/2009 | Nickerson et al. |
| 7,529,795 B2* | 5/2009 | Arav ........................... 709/204 |
| 7,548,930 B2* | 6/2009 | Kobza et al. ......................... 1/1 |
| 7,548,957 B1* | 6/2009 | Wichmann et al. .......... 709/217 |
| 7,552,383 B2 | 6/2009 | Morris et al. |
| 7,558,828 B1 | 7/2009 | Panzer |
| 7,734,610 B2* | 6/2010 | Rakowski et al. ............ 707/706 |
| 7,774,378 B2* | 8/2010 | Nelson ......................... 707/803 |
| 7,810,027 B2* | 10/2010 | Bendik ......................... 715/255 |
| 7,827,487 B1 | 11/2010 | Nickerson et al. |
| 7,970,887 B2 | 6/2011 | Nickerson |
| 8,024,668 B2 | 9/2011 | Nickerson |
| 8,041,805 B2 | 10/2011 | Nickerson |
| 8,112,403 B2 | 2/2012 | Repasi et al. |
| 8,275,796 B2* | 9/2012 | Spivack et al. .............. 707/794 |
| 8,396,891 B2* | 3/2013 | Tsao ............................ 707/781 |
| 8,601,060 B2 | 12/2013 | Barkley et al. |
| 8,606,845 B2* | 12/2013 | Dickinson et al. ........... 709/203 |
| 8,694,490 B2* | 4/2014 | Mandel et al. ............... 707/722 |
| 8,700,704 B2* | 4/2014 | Arav ............................ 709/204 |
| 2002/0046244 A1* | 4/2002 | Bimson et al. ............... 709/205 |
| 2002/0062368 A1* | 5/2002 | Holtzman et al. ............ 709/224 |
| 2002/0073160 A1 | 6/2002 | Purcell |
| 2002/0085030 A1* | 7/2002 | Ghani ........................... 345/751 |
| 2002/0087660 A1 | 7/2002 | Martin et al. |
| 2002/0111838 A1 | 8/2002 | Welbourne |
| 2002/0126708 A1* | 9/2002 | Skog et al. ................... 370/522 |
| 2002/0174179 A1* | 11/2002 | Toyota et al. ................. 709/203 |
| 2003/0167315 A1* | 9/2003 | Chowdhry et al. ........... 709/218 |
| 2003/0204490 A1 | 10/2003 | Kasriel |
| 2004/0019688 A1 | 1/2004 | Nickerson et al. |
| 2004/0021686 A1* | 2/2004 | Barberis ....................... 345/738 |
| 2004/0028212 A1* | 2/2004 | Lok et al. ................. 379/265.09 |
| 2004/0075681 A1 | 4/2004 | Anati |
| 2004/0163050 A1* | 8/2004 | Matter .......................... 715/530 |
| 2004/0172405 A1 | 9/2004 | Farran |
| 2004/0205547 A1* | 10/2004 | Feldt et al. ................... 715/512 |
| 2005/0086188 A1* | 4/2005 | Hillis et al. ..................... 706/50 |
| 2005/0198299 A1* | 9/2005 | Beck et al. ................... 709/226 |
| 2005/0228742 A1* | 10/2005 | McHale et al. ................ 705/37 |
| 2005/0240618 A1 | 10/2005 | Nickerson et al. |
| 2005/0240623 A1* | 10/2005 | Kobza et al. .............. 707/104.1 |
| 2005/0271037 A1* | 12/2005 | Habaguchi et al. ........... 370/351 |
| 2006/0010194 A1 | 1/2006 | Inage |
| 2006/0059160 A1* | 3/2006 | Smola et al. ................... 707/10 |
| 2006/0173775 A1* | 8/2006 | Cullen et al. ................... 705/37 |
| 2006/0173985 A1* | 8/2006 | Moore .......................... 709/223 |
| 2006/0178910 A1* | 8/2006 | Eisenberger et al. ............ 705/3 |
| 2006/0230021 A1* | 10/2006 | Diab et al. ........................ 707/3 |
| 2006/0240851 A1* | 10/2006 | Washburn .................... 455/466 |
| 2006/0242554 A1* | 10/2006 | Gerace et al. .............. 715/501.1 |
| 2006/0253365 A1* | 11/2006 | Langshur et al. .............. 705/37 |
| 2006/0265368 A1 | 11/2006 | Nickerson et al. |
| 2006/0284744 A1 | 12/2006 | Shotland |
| 2006/0294215 A1* | 12/2006 | Noble et al. ................. 709/223 |
| 2007/0043617 A1 | 2/2007 | Stein et al. |
| 2007/0191040 A1* | 8/2007 | Kadar et al. ................. 455/466 |
| 2007/0282904 A1* | 12/2007 | Mitchell .................... 707/104.1 |
| 2009/0006549 A1* | 1/2009 | Singh et al. .................. 709/204 |

FOREIGN PATENT DOCUMENTS

| | | |
|---|---|---|
| GB | 2366497 A | 3/2002 |
| WO | WO0109738 A1 | 2/2001 |
| WO | WO2004015897 A3 | 6/2004 |

OTHER PUBLICATIONS www.cocomTitle: Www.cocomment.com; (web.archive.org) Pub. Date: Feb. 16, 2006 (Capture date on archive.org) Bibliographic Info: URL:https://web.archive.org/web/20060216105050/http://www.cocomment.com/learnmore Located Via: www.archive.orgment.com (web.archive.org) published Feb. 16, 2.

Title: Xara online feedback form (web.archive.org) Pub. Date: Feb. 7, 2005 (Capture date on archive.org) Bibliographic Info: URL:https://web.archive.org/web/20050207180348/http://www.xa raonline.com/home/applications/ffo_home.htm Located Via: www.archive.org.

Shozu: shozu one—click camera phone image sharing service adds support for personal blogs, 2—way messages & more shoot. click. share. anywhere M2 Presswire Apr. 2006 Found via Proquest Technology Collection ProQuest document ID 443614005 Document URL http://search.proquest.com/docview/443614005?accountid=142944.

Gathering customer feedback via the Internet: instruments and prospects Scott E. Sampson Industrial Management & Data Systems 1998, Issue 2, pp. 71-82 Located via Google Scholar.

GuestWorld Debuts With 500,000 Web Sites, Oct. 28, 1997, Business Wire.

* cited by examiner

Personal Journal
patent pending

LOGIN
User Name:
Password:
Login

— 140

SIGN UP
for Your Own Personal Journal!

My First Name:
My Last Name:
My Email:
Choose a User Name:
Choose a Password:

"Create My Journal"

ADMIN PAGE CREATOR
patent pending

Create a New Journal Page:

⦿ Newsletter Page  ○ Miscellaneous Page  — 150

Title: [_____] — 152

Keyword Phrase: [_____] — 154

Autoresponder Code: [_____] — 156

Add Icons for Posts: [_____] [Browse...] [Upload] — 158

Remove Icons: [Choose Icon ▾] [Delete] No Icon Selected — 160

Reader Comment Area Code: [_____] — 164

[Create Page] — 162

FIGURE 4

Michael's Personal Journal
patent pending

170

View: 172

◉ Latest Newsletter  ○ Latest Miscellaneous Page  ○ All My Journal Posts

176

| Why the Skinny Guy Wants to Lose Weight ▼ |   [ Display Web Page ]   174

Select to See Posts at Lower 1/3 of this Page

180

Post Title: [                                              ]

184                                                                                        182

[ Enlarge Writing Area ]

[                                                                                     ]

186

[ Choose Icon                ▼ ]

188

Publish My: ◉ Full Name  ○ First Name  ○ Initials  ○ User Name

190

[ Publish My Post ]        [ Publish My Post in My Journal ]

---

192

Log Out

Why the Skinny Guy Wants to Lo - Newsletter           194
2 - Skinny People have fun

It's mental weight                                                            196
                    FIGURE 5              198

Shared by minorwood  04-29-2008 09:37 AM  | Lose Weight 1 - 2 - Skinny People have fun

- - - - - - - - - - - - - - - - - - - - - - - - - - - - - - - - - - - - - - - - -

Current Page 1 of 1
| First page | Prev page | Next page | Last page |

FIGURE 5

Why the Skinny Guy Wants to Lose Weight — 232

230

Title of My Post: [ ] — 234

Comments: [ ] — 236

Choose Icon: [Choose Icon ▼] — 238

My First Name: [ ] Last Name: [ ]

My Email: [ ] — 240

◉ Full Name  ○ First Name Only  ○ Initials Only — 242

◉ I would like to create my onw Personal Journal
○ First Name Only — 244

User Name: [ ] (for your Personal Journal) — 246

Password: [ ] (to keep your Personal Journal *personal*) — 248

[Post My Comments Now!] — 250

252

XML — 254

*258*

When a Tree Falls in a Forest . . . .  Tell a Friend  Rating
When a tree falls in a forest, does it actually fall if no one is there to see it? — 260

262   264   266

Shared by M.N.  06-11-2006 04:27 AM  | One Minute Miracle - When a Tree Falls in a Forest . . . .

Why the Skinny Guy Wants to Lo - Newsletter
2 - Skinny People have fun   Tell a Friend  Rating It's mental weight   268

Shared by minorwood  04-29-2006 09:37 AM  | Lose Weight 1 - 2 - Skinny People have fun Current Page 1 of 1
| First page | Prev page | Next page | Last page |

FIGURE 7

Tell A Friend!

|  | First Name Only: | Email Address: |
|---|---|---|
| Friend 1: | | |
| Friend 2: | | |
| Friend 3: | | |
| Friend 4: | | |

The Message Your Friends will Receive:

Subject: Emal My Journal Post to a Friend  ∽ 270

Content: Subject: Great Article!
URL;
This is a great newsletter!  ∽ 272

[ Send ]  [ Cancel ]

FIGURE 8

ADMIN EMAIL

From: [_____] ⟿ 1
To: [_____] ⟿ 2
Subject: [_____] ⟿ 3
Content: [_____] ⟩ 4

[Send]  [Cancel]

FIGURE 9

BIBLE HEADER

| Personal Menu | Create & Manage | Admin Setting |

*Categories*

280  Add New Category  Order [Non-Sequential ▼]  Change Order

| # | Category Name | Order Type | Title | Action |
|---|---|---|---|---|
| 1 | Old Testament | Non-Sequential | --Select Book-- | Edit \| Delete |
| 2 | New Testament | Non-Sequential | --Select Book-- | Edit \| Delete |
| 3 | Newsletter | Non-Sequential | | Edit \| Delete |
| 4 | Miscellaneous | Non-Sequential | | Edit \| Delete |

1 of 4   Prev | Next |   First | Last

BIBLE FOOTER

FIGURE 11A

BIBLE HEADER

| Personal Menu | Create & Manage | Admin Setting |

*Categories*

Add New Category

Category Name    |Old Testament|    ⟿ 282

Next Level Selection    --Select Book--    ⟿ 284

Order Type    |Non-Sequential ▼|

| Add New Category | Cancel |

286      BIBLE FOOTER

BIBLE HEADER

| Personal Menu | Create & Manage | Admin Setting |

*Sub-Category*

286

Category :    | -Select Category- ▼ |    | Edit | Delete |
              -Select Category-
              Old Testament
Create New Sub-Cate New Testament
              Newsletter
288           Miscellaneous

BIBLE FOOTER

FIGURE 12A

Category : Old Testament ▼  Edit  Delete
Sub Category : ──Sub-Category── ▲
                                ▼

Check to create a new
1st Level Subcategory: ☑

Choose the options
⊙ Text
○ Numeric (1 - 1000)
○ Alphabetic (A-Z)
Text
Sub-Category Name: Genesis      Sequential ▼ —⌇— 304
Next Level Selection : --Select Chapter-- —⌇— 306

Text
Sub-Category Name: Exodus       Sequential ▼
Next Level Selection : --Select Chapter--

Text
Sub-Category Name: Leviticus    Sequential ▼                —⌇— 302
Next Level Selection : --Select Chapter--

Text
Sub-Category Name: Numbers      Sequential ▼
Next Level Selection : --Select Chapter--

Text
Sub-Category Name: Deuteronomy  Sequential ▼
Next Level Selection : --Select Chapter--

[ Create New Sub-Category ] —⌇— 308

FIGURE 12C

BIBLE HEADER

| Personal Menu | Create & Manage | Admin Setting |

*Sub-Category*

Category :   [Old Testament ▼]     Edit | Delete

Sub Category :
```
->4
->5
->6      — 316
->7
->8
->9
->10
->11
->12
->13
```

Check to create a new
1st Level Subcategory:  ☐

--- Choose the options ---
○ Text
● Numeric (1 - 1000)
○ Alphabetic (A-Z)

--- Numeric ---
Number from 1- will be added uder this selected subcategory.

FIGURE 12F

A Sub-Category then has to be selected to view
(if there are subcategories).

Edit Subcategory

| | |
|---|---|
| Subcategory | Genesis |
| Next Level Selection | --Select Chapter-- |
| Type | Sequential |

Update  Cancel

— 322

Personal Menu

*Sub-Category*

Category : Old Testament    Edit  Delete

Sub Category :
- —Sub-Category—
- Genesis
  - ->1
  - ->1
  - ->2
  - ->3
  - ->4
  - ->5
  - ->6
  - ->7

— 320

Check to create a new
1st Level Subcategory: ☐

--Choose the options--
- ○ Text
- ○ Numeric (1 - 1000)
- ○ Alphabetic (A-Z)

Create New Sub-Category

FIGURE 13A

A Sub-Category then has to be selected to view
(if there are subcategories).

| Personal Menu | Create & Manage | Admin Setting |

*Page Content* —/—320

| Old Testament ▼ |

| Genesis ▼ | Page Template | Add Page Content | Iframe Code |
| 1 ▼ | Page Template | Add Page Content | Iframe Code |
| 1 ▼ | Page Template | Add Page Content | Iframe Code |

```
—Select Verse—
1
2
3
4
5
6
7
8
9
10
11
12
13
```

Hide Page Content bd created the heaven and the earth.

| First | Last    3 comments    View Archives | Check All | Display | Hide |

The very beginning

Comments xxxxxxxxxxxxxxxxxxxxxx

Shared by Michael Horwood April 24th, 2007 at 1:33 pm

FIGURE 15 bibleu's Journal

Personal Menu    Page

Select Title

[Old Testament ▼]
[Genesis ▼]
[1 ▼]
[1 ▼]

Michael's Comments

Comment Title (optional)

[                                        ]

[ Enlarge Writing Area ]

Icon    [– Select Icon – ▼] No Icon Selected

Publish My    ⦿ Full Name ○ First Name ○ Initials ○ User Name

Access    ⦿ Public ○ Private

[ Submit Comment ]

Page 1                 [ Hide Page Content ]

Verse 1

In the beginning God created the heaven and the earth.

March 10th, 2007 9:35 am iframe 1 of 2   Prev | Next |   First | Last    6 comments    My Comments |   All Comments

390

← End User comment appears.

Comment 1

Great that there's light!

Shared by Michael Horwood June 6th, 2007 at 1:42 pm ( Public )

FIGURE 22

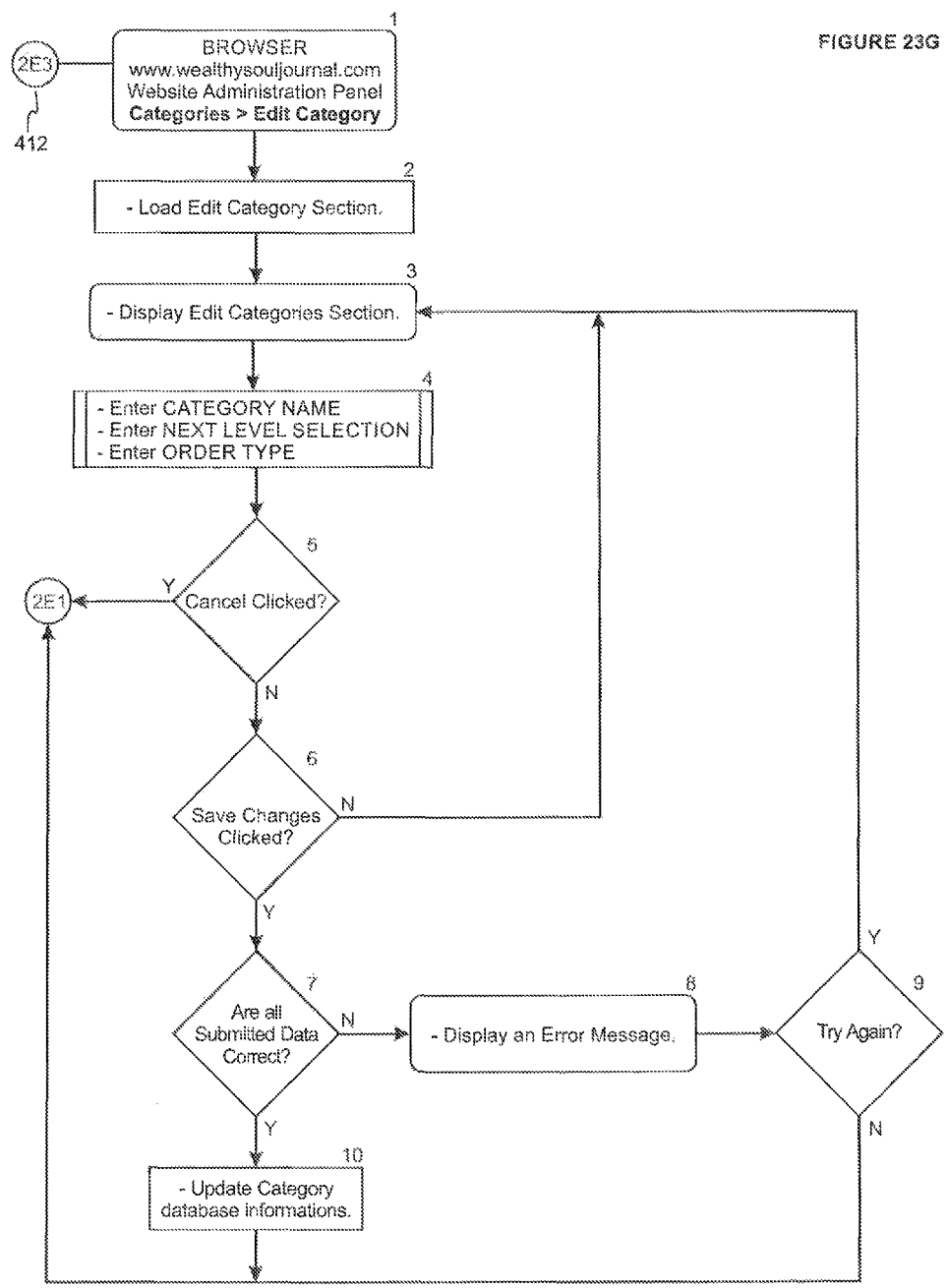

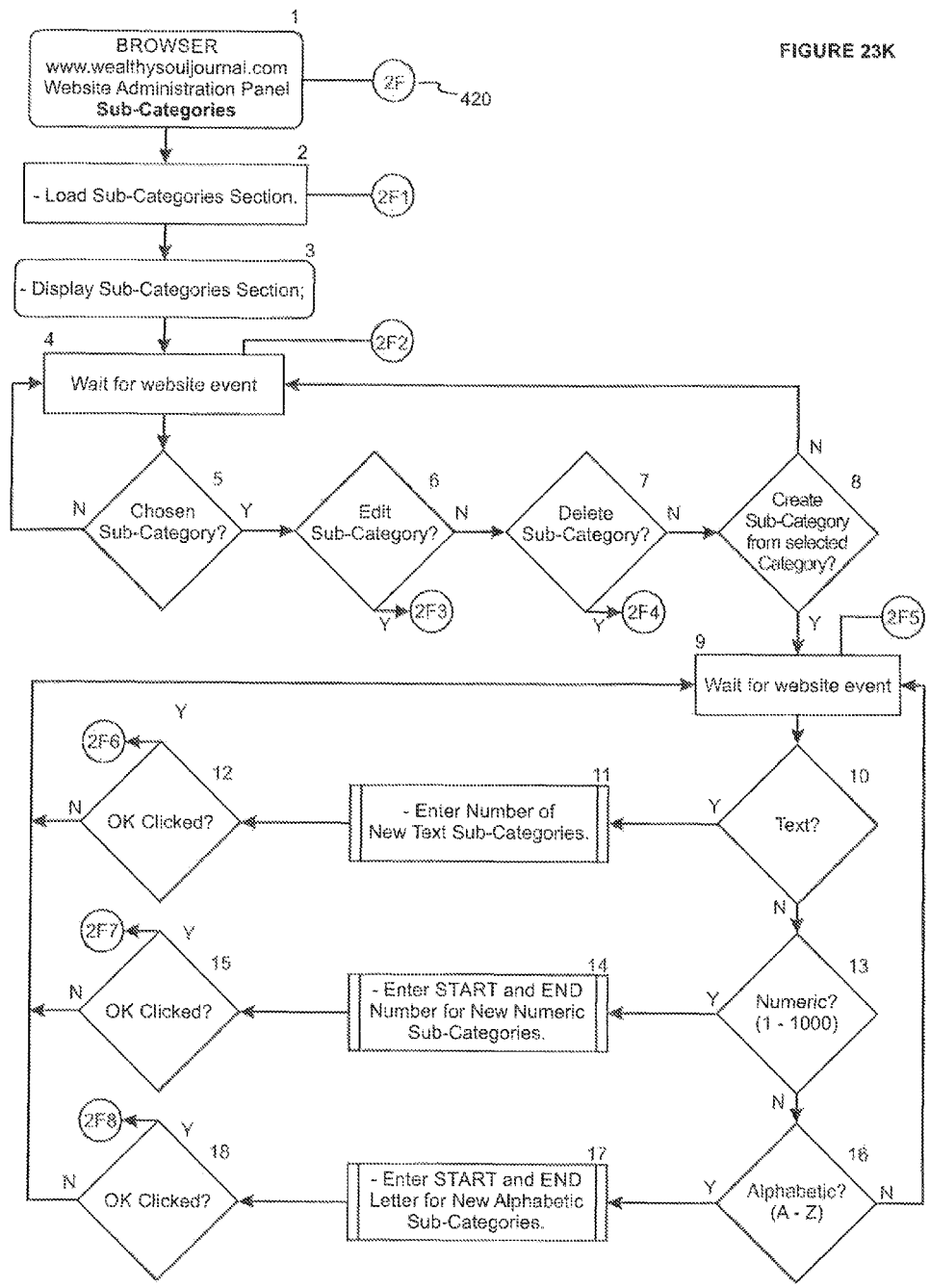

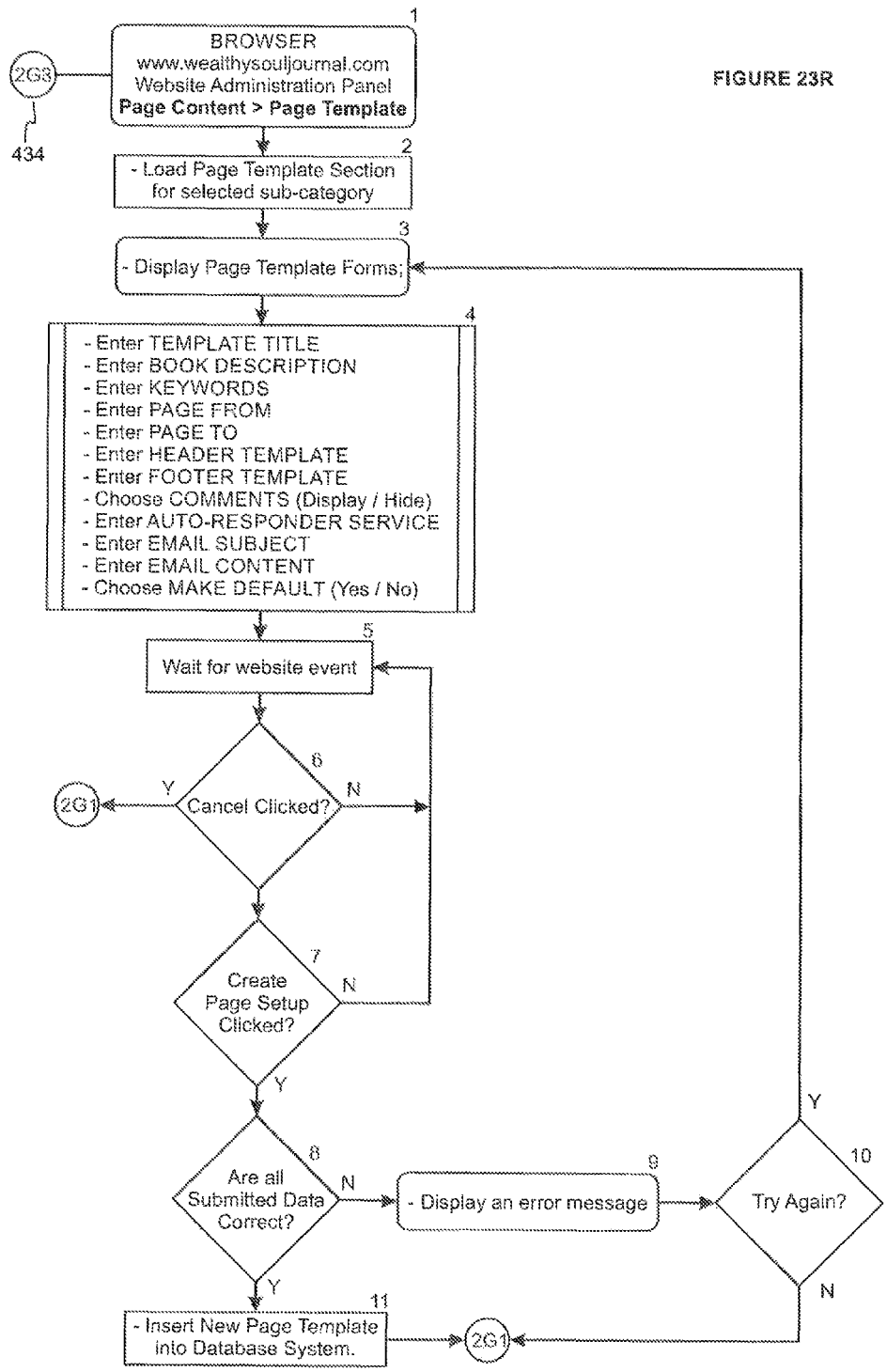

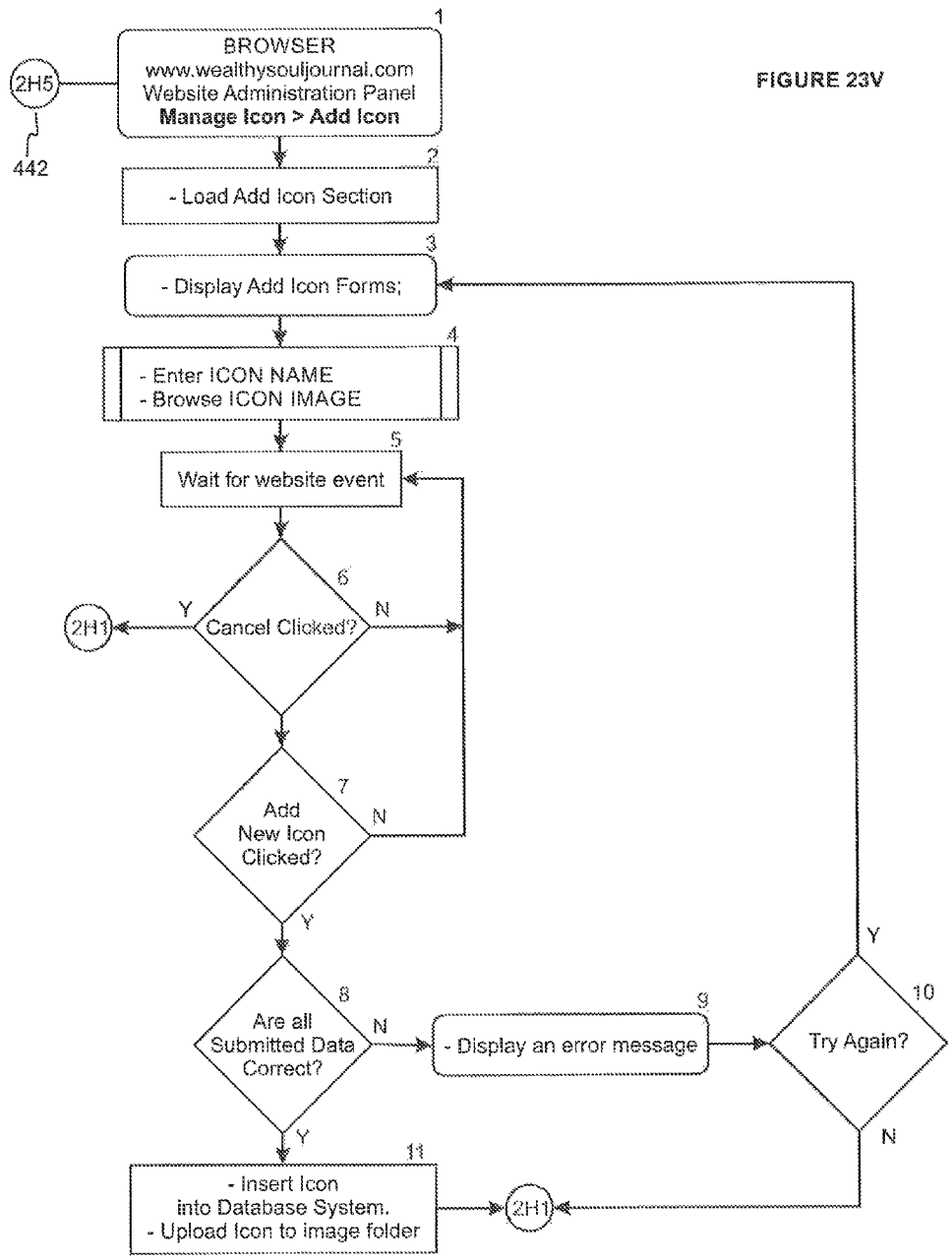

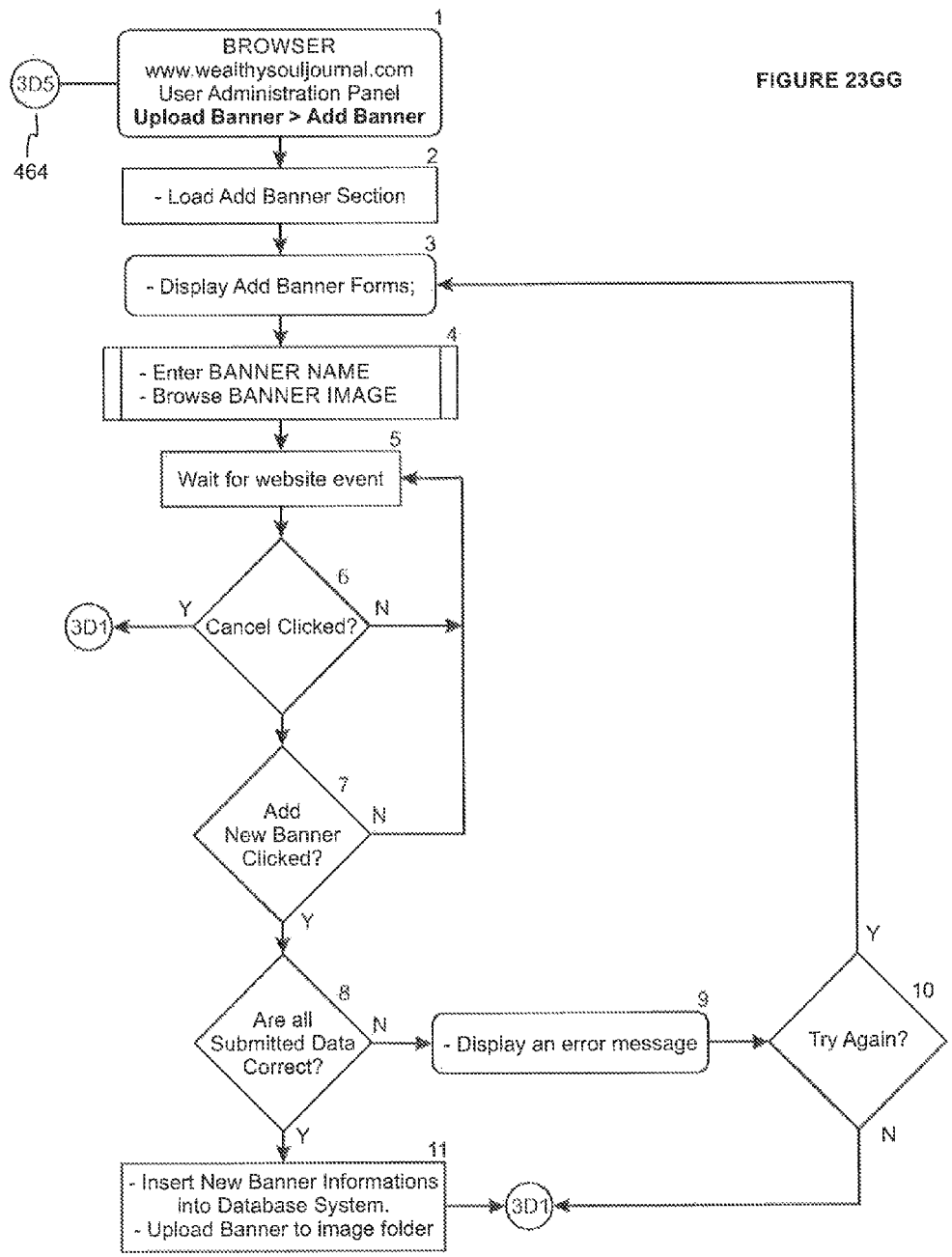

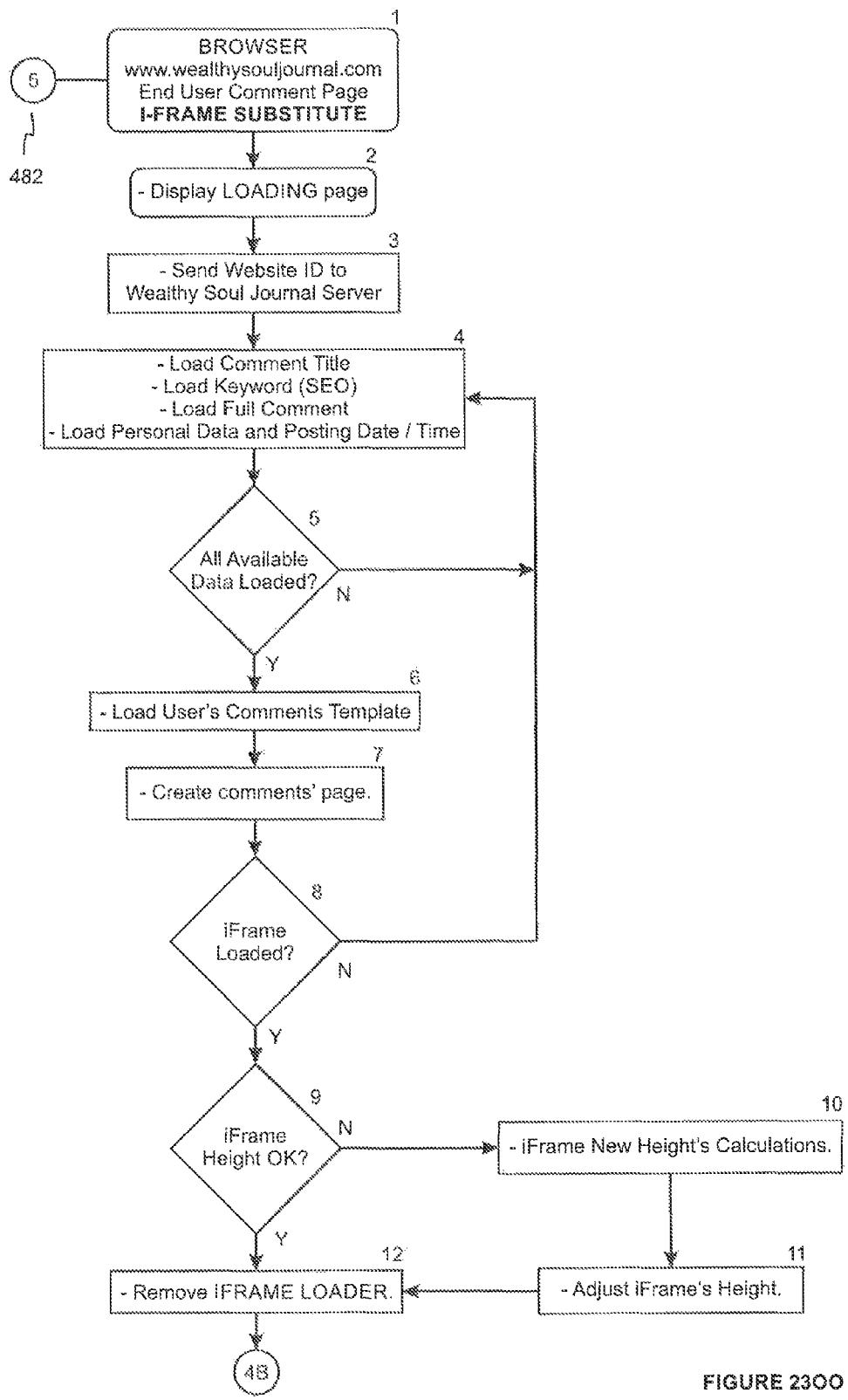
FIGURE 2300

SYSTEM AND METHOD FOR FACILITATING POSTING OF PUBLIC AND PRIVATE USER COMMENTS AT A WEB SITE

CROSS-REFERENCE TO RELATED APPLICATIONS

This application is a continuation of the United States Application for Patent that was filed on Feb. 5, 2013 and assigned Ser. No. 13/759,693, which application is a continuation of the United States Application for Patent that was filed on Jun. 15, 2007 and assigned Ser. No. 11/818,912 and issued as U.S. Pat. No. 8,402,357 on Mar. 19, 2013, which application claims the benefit of the filing date of U.S. Provisional Application 60/813,982 which was filed on Jun. 15, 2006. Each of these applications are incorporated herein by reference in their entirety.

FIELD OF THE INVENTION

The present invention relates generally to software applications for annotating web pages. In particular, the present invention is a system and method for use by web site operators to facilitate user posting of public and private comments at a web site.

BACKGROUND OF THE INVENTION

Although web site blogs that provide commentary on a variety of topics are very popular, they typically emphasize the web site owner's or blogger's comments. Many bloggers do not allow readers to comment on posts for fear of the readers submitting inappropriate comments. As a result, reader interaction with blogs and other web sites is limited. If readers were permitted to post private rather than public comments, bloggers could allow readers to comment on posts without the fear that inappropriate comments will be read by other readers. However, blogs and web sites typically do not support posting of private comments.

Another problem with current web technology is that adapting blogs and other web pages for annotations and comments is very cumbersome and difficult. Even if a blogger would like to invite his or her readers to comment on the blogger's posts, adapting the blog or other web site content to allow such interactivity is difficult and requires programming skills. Details related to web page layout and content can also make it difficult to adapt pages for comments. Because of the difficulties in facilitating comments on individual web pages, many web site operators maintain a single blog for the entire site. Comments regarding unrelated content appear in the same area of the web site simply because a blog is supported in only one area of the site that users can visit to post. If a blogger would like to support private as well as public comments, additional programming is required to allow such postings on web pages. There is a need for a software system and method that allows web site operators to easily adapt web pages to facilitate posting of comments at web sites. There is also a need for a system and method that supports posting of private as well as public user comments at sites.

SUMMARY OF THE INVENTION

The present invention is a software system and method that allows web site operators to easily adapt web page content to support posting of public and private user comments at web sites. Web site operators can support interactivity with their web site visitors centering on public reader comment areas as well as private visitor journals.

Reader comment areas according to the present invention allow web site visitors to comment on the content found on the particular web pages where the reader comment areas appear. Examples of such pages are ones containing articles, newsletters, photographs, quotes, news commentaries, etc. An important design feature of the present invention is the ability to create a "mini-blog" out of every single content-oriented web page of an owner's web site. Reader comment areas are added easily to all types of web pages and in fact, may be added to literally thousands of web pages, requiring just a minute or two of time for each new page.

To prevent publication of inappropriate comments, the web site owner or an administrator has a variety of controls to maintain the privacy of comments. One such control is a "hide incoming posts" control that allows the administrator to review posts before permitting them to be published. Other controls allow the administrator to hide or delete posts that have already been published. Every reader who makes a comment on a web page enabled according to the present invention may be automatically added to the web site owner's subscriber list (if the web site owner so chooses, and if the reader approves via typical double opt-in methods). Every end user who makes a comment on the web site owner's site also has the opportunity to sign up for a personal journal. This option further enrolls the end user to return to the owner's site and become part of the web site owner's community and subscriber list.

A variety of personal journal features are also supported. Personal journal features include keeping comments private for the user's personal viewing only, posting comments to other public web pages containing the specialized reader comment areas, and creating a unique page with the user's own individualized URL that mimics the public web page to which he or she has posted a comment. The end user comment is always displayed most prominently (e.g., at the top of all other comments entered by other end users, and/or highlighted in some way such as in bold or in a different color or any number of other highlighting techniques that may be selected. The end user may also be permitted to choose to eliminate all the other comments posted on the original web page so his or her comment is the only one featured.)

Additionally, from the personal journal page, the end user may print all or pre-selected journal entries in various design formats (such as mini-books or ebooks or on-line or off-line greeting cards), create a public blog out of posts he or she chooses to make public under a private domain or sub-domain name, create his or her own web pages or a web site using additional formatting features or simply publish his or her posts as text under a private domain or sub-domain name, enter audio comments to a journal, enter video comments to a journal, create podcasts of these audio and video comments, and make actual saleable products of these written, audio and/or video posts, which will be available collectively on a common commercial web site.

The features and functionality of the present invention are made available to web site owners in a "prepackaged" and ready-made, ready-to-install system. The present invention allows web site owner to avoid hiring programmers to create each individual feature. The system enables the web site owner to be the administrator of the entire system. The administrator may perform the following functions:

1. Create reader comment areas that can be added to any web page of the administrator's choosing by having the program automatically create the code for the reader comment areas. This code is simply copied and pasted into the code of the administrator's pre-existing web pages where the administrator wants the reader comment areas to appear.
2. Search engine optimize the end user posts by specifying single or multiple search engine keywords that appear either as a subtitle of each end user post or appear in any other area of the post. This coupling makes the keywords "contextual," for which some search engines may assign a higher ranking than if the keywords were standing alone.
3. Place his or her own advertisements next to each individual post entered both on the public display page and the private journal pages
4. Add a tell-a-friend page, pop-up, layer or other tell-a-friend format which allows the end user to automatically email notice of his or her post(s) to friends. The end user benefits from this feature by publicizing his or her posts and allowing a taste of fame, and the administrator enjoys it as a way of getting more people to visit his or her web site.
5. Automatically add each new end user who places a post or signs up for his or her own personal journal to an auto-responder series of emails created by the administrator.
6. Automatically rotate the end user posts on the web page so different end user posts are featured each day. Automatic emails are sent to each end user at predetermined times to notify the end user that his or her post will be featured at the specified times so the end user, even years later, may re-activate interest in what he or she wrote, and refer friends to the site on the particular day his or her posts are featured. (This feature is also very important for search engine optimization. Search engines give higher rankings to continually-changing web pages. Search engines consider the content on these updated pages to be more timely and relevant to the keywords for which users are searching).
7. Enable the administrator to delete or hide any post of his or her choosing.
8. Enable the administrator either to hide all incoming posts until approved for public display, or to immediately allow the posts to appear for public display.
9. Select individual posts using checkmark boxes for printing out these posts together, either onto a separate web page or into a printed document to create such things as books and ebooks.
10. See the number of posts on each public web page by a counter in the administrator area and/or to the public on the public web page itself
11. Create a contest, by allowing other web site visitors to rate posts numerically (e.g., using 1-5 with 1 being "under average" and 5 being "superb" and giving prizes to the highest scoring end-user for all his or her posts scores combined over a given time period).
12. Create RSS feeds to receive additional Search Engine Traffic.

The present invention facilitates eliciting reader comments to engage readers in the blogger's or web site owner's writings. It also provides greater search engine optimization resulting from specialized keyword utilization associated with the incoming posts, as well as list building advantages.

BRIEF DESCRIPTION OF THE DRAWINGS

FIG. 3 is a login screen shot according to an example embodiment of the present invention;

FIG. 4 is an administrator page creator screen shot according to an example embodiment of the present invention;

FIG. 5 is a personal journal screen shot according to an example embodiment of the present invention;

FIG. 7 is a display page screen shot for an example embodiment of the present invention;

FIG. 8 is a tell-a-friend screen shot according to an example embodiment of the present invention;

FIG. 9 is an administrator email screen shot according to an example embodiment of the present invention;

FIGS. 20-22 are end user comment screen shots for an example embodiment of the present invention;

DETAILED DESCRIPTION OF THE INVENTION

Figure 1:
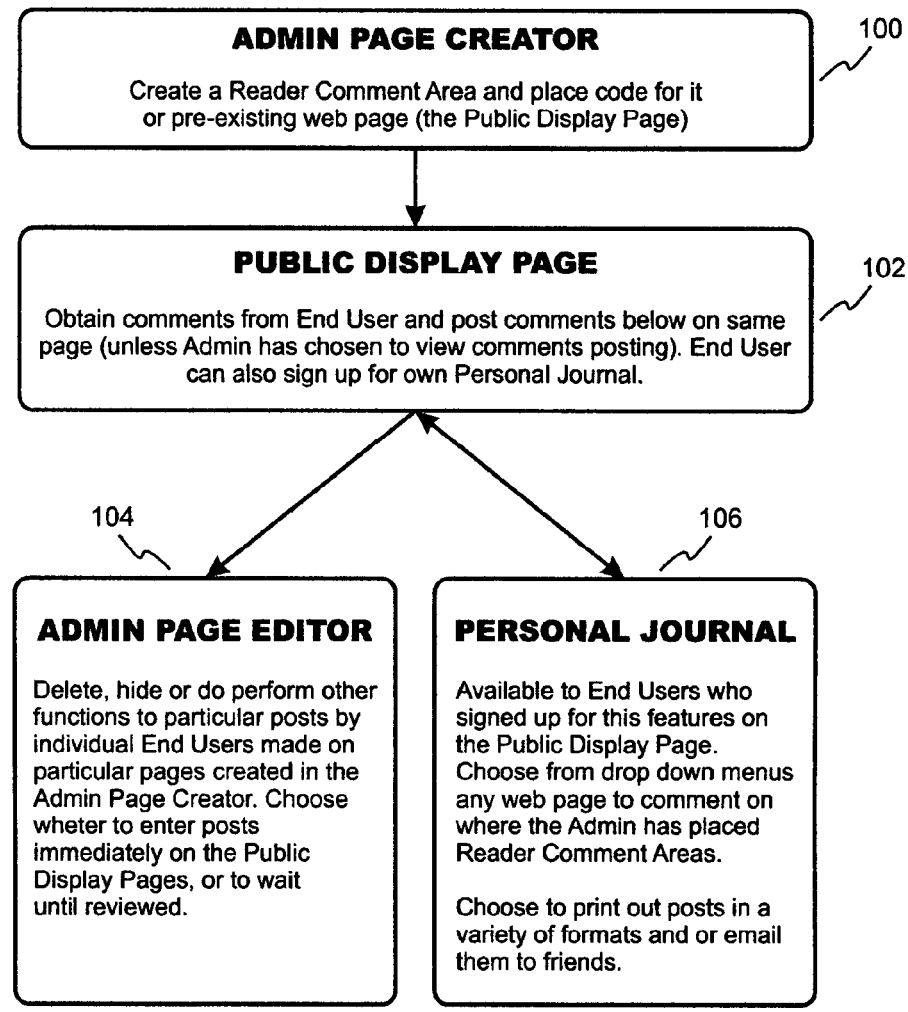
FIG. 1 is a block diagram of the basic components for an example embodiment of the present invention.

Referring to FIG. 1, a block diagram of the basic components for an example embodiment of the present invention is shown. An administrator page creator component allows an administrator to first create a reader comment area and place code for the reader comment on any new or pre-existing web page 100. Once posted to a web site, a public display page component 102 allows end users to input comments that are posted on the page. The comments may be displayed on the page when they are entered or the administrator may review them prior to displaying them. The end user may also sign up for his or her own personal journal at the web page. An administrator page editor 104 component allows an administrator to delete, hide, and perform other functions on posts entered by individual end users on particular pages created using the administrator page creator 100. The administrator may decide whether to enter posts immediately on the public display page or to review them prior to displaying them. A personal journal component 106 is available to end users that select a personal journal feature. End users can choose web pages from drop down menus and enter comments in any area where an administrator has placed a reader comment area. The end user can review and manage his or her own comments, print them in a variety of formats, and/or email them to friends.

Figure 2:
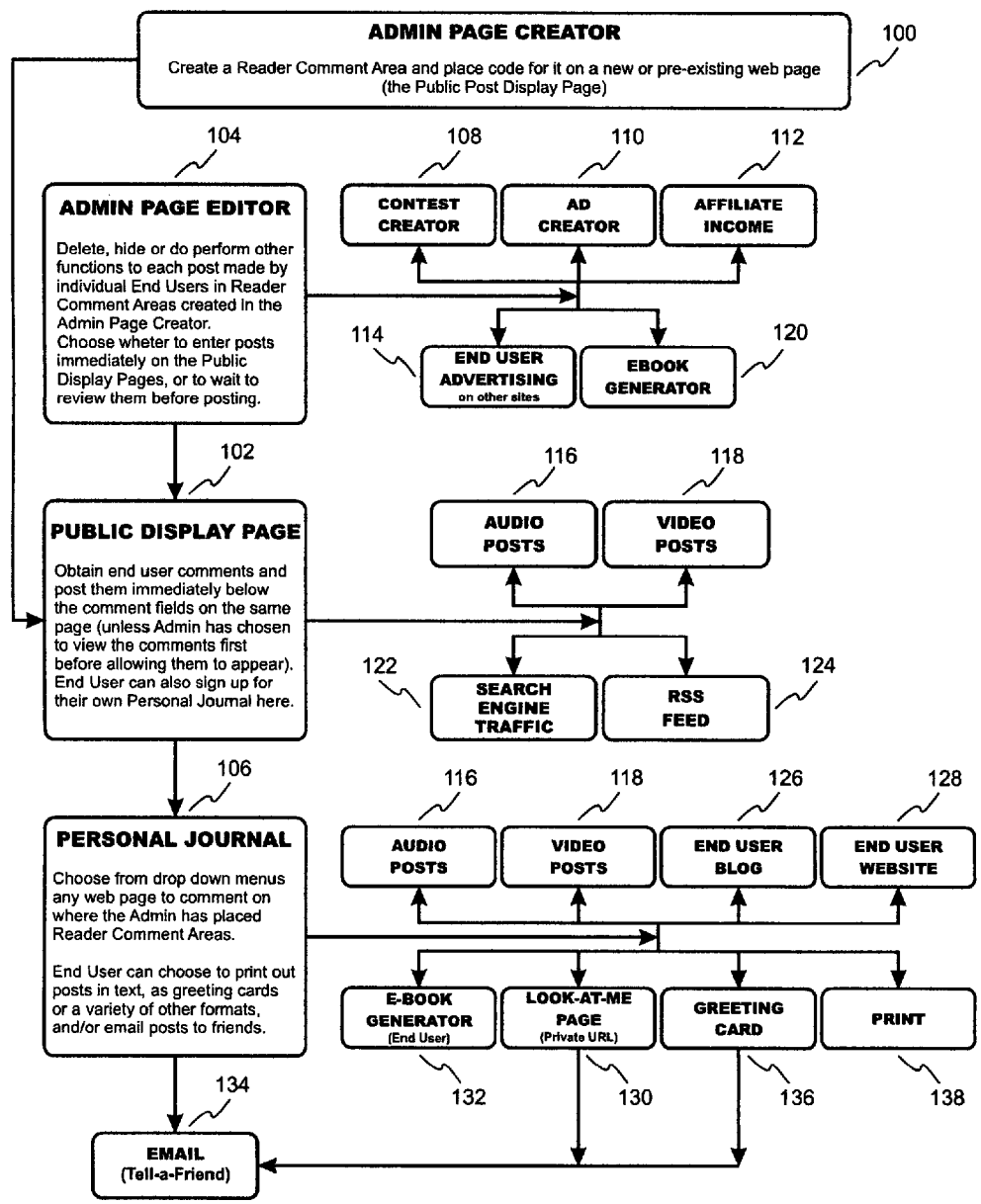
FIG. 2 is a detailed block diagram of components for an example embodiment of the present invention.

Referring to FIG. 2, a detailed block diagram of component for an example embodiment of the present invention is shown. A public display page component 102 may support audio posts 116 and video posts 118 in addition to text entries. Because posts are part of the web pages on which they are entered, they may be considered by search engines in page rankings 122 and they may be considered web page updates to RSS feed readers 124. An administrator page editor component 104 may used to generate ebooks of end user posts 120. Finally, a personal journal component 106 allows an end user to manage his or her own posts and perform various functions based the personal posts. For example, an end user may create an end user blog 126 or a web site 128 based on his or her own posts as well as a private URL to a page of the end user's posts 130. The end user may create an ebook of the posts 132 or a greeting card of the posts 136. Finally, the end user may print the posts 138. Posts in a variety of formats may be emailed to friends 134.

Referring to FIG. 3, a login screen shot according to an example embodiment of the present invention is shown. An end user who is already signed up for a personal journal logs in with his or her user name and password and selects a sign-up option to reach a personal journal page 140. In another portion of the screen 142, the end user signs up to create his or her own personal journal. Fields include first name, last name, email address, user name, and password. The end user selects a "create my journal" option to the complete the process.

Referring to FIG. 4, an administrator page creator screen shot according to an example embodiment of the present invention is shown. The administrator may create new reader comment areas for various types of web documents such as newsletters and miscellaneous web pages at the web site. The administrator identifies the type of web page 150. A newsletter page option may be used for a web page that was originally created as a newsletter. A miscellaneous page may refer to any other type of web page. In the title field 152, the administrator enters the title of the web site page for which he or she is creating a reader comment area. In the keyword phrase field 154, administrator enters keywords of his or her choice for search engine optimization. These keywords appear next to the time/date stamp of the end user posts. An autoresponder code field 156 is where the administrator enters the form/post HTML code that automatically subscribes new end users who are making posts or who are signing up for personal journals to the administrator's Autoresponder. (The autoresponder is the database/emailing service that maintains the administrator's list of subscribers). The "add icons for posts" browse menu 158 enables the administrator to upload images from which the end user can choose to add to his or her posts. Images uploaded automatically are reformatted to a preset width, length and kilobyte size. A "remove icons" pull down menu 160 enables the administrator to remove previously added icons. A reader comment area code field 164 is an output field and is created after the administrator presses the create page option 162.

Referring to FIG. 5, a personal journal screen shot according to an example embodiment of the present invention is shown. This screen displays the end user's personal journal resulting from the sign-up process of FIG. 3. At the top of the page, the end user's first name automatically appears indicating <end user's first name>personal journal 170. Radio buttons 172 allow the end user to choose the web page to which he or she would like to post a comment. The end user may also choose to view the previous posts he or she wrote. This option displays every post the end user previously entered on every newsletter or other web page the administrator has made available for postings. A pull down menu option 176 displays all the web pages with titles entered by the administrator in the title field of the administrator page creator based on the radio button 172 selected. A display web page option 174 allows the end user to see a popup of the display page where his or her posts will be appearing. The title next to the display web page option automatically reflects the title that the end user selected from the pull down menu 176.

Posting data fields are in the middle section of the screen. The end user may provide a title for his or her post in a post title field 180. A comment field 182 is where the end user enters his or her actual post. An enlarge writing area option 184 results in a popup that provides the end user with an enlarged writing area to compose his or her comment. The end user can adjust this writing area to any comfortable size including full screen. It automatically adjusts the writing area field proportionately to whatever size the end user desires the page to appear on his screen. A choose icon pull down menu 186 allows the end user to choose from the icons the administrator entered in the "add icons for posts" field of the administrator page creator screen (FIG. 4). The end user may choose from a selection of four radio buttons 188 to have his or her full name, first name, initials, or user name published on the public display page. Publishing options 190 include a public posting option and an option to publish the post only in the end user's private journal.

Post fields appear at the bottom of the screen. The newsletter/miscellaneous title 194 listing reflects which newsletter or miscellaneous page the end user selected previously. The title listing reflects the title the end user chose from post title field 196. The comment field has the content entered previously by the end user. Next to the comment field is the icon selected by the end user. The identifier reflects the name option selected previously 198.

Figure 6:
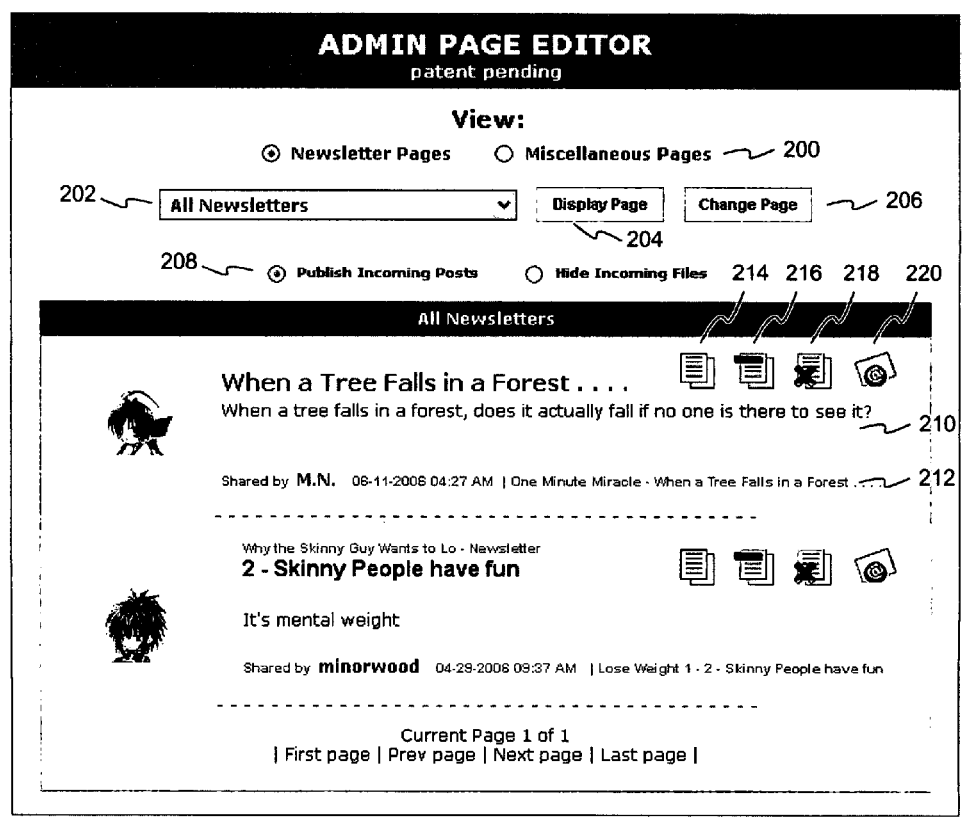
FIG. 6 is an administrator page editor screen shot according to an example embodiment of the present invention.

Referring to FIG. 6, an administrator page editor screen shot according to an example embodiment of the present invention is shown. Using this screen an administrator may monitor incoming end user posts created in the reader comment areas. The administrator may select a newsletter or other page 200. Pull down menu options 202 display the web page titles entered by the administrator for the selected newsletter or other miscellaneous page. A display page option 204 allows the administrator to view a popup of the display page for the selected title. A change page option 206 allows the administrator to view a popup of the original administrator page creator to change any item previously entered on that page such as titles, keywords, and autoresponder codes. The selected title is displayed in the pull down menu option 202 and the administrator can select an option to display new posts or to hide new posts 208 depending on whether posts entered by end users should be automatically posted onto the display pages, or if they first should be manually approved for publication by the administrator. Hidden posts receive a grey background so the administrator knows at a glance they are hidden.

Each end user post may be displayed in a separate portion of the screen. The icon the end user selected appears with his or her post 210. The title 210 selected by the end user is displayed as well as the end user's comment 210. Also shown is the identifier 212 (name, initials, user name) selected by the end user. A publish option 214 enables the administrator to allow the end user's post to appear on the display page if the administrator had previously chosen to hide this post either via a hide post option 216, or the hide new posts option above 208. The hide post option 216 enables the administrator to hide any individual end user post from appearing on a display page. The entire post appears with a grey background when it is hidden so the administrator knows at a glance it is hidden. A delete post option 218 permanently deletes the post. An email-a-friend option 220 results in a popup that enables the administrator to email the end user who wrote the post (e.g., to thank them for posting, to ask permission to quote his or her post, etc.)

Posts may be selected (e.g., by selecting a checkbox next to each post) for printing, to appear in an ebook, or for other functions. A post counter may be used to tell the administrator how many total posts were received for each newsletter or miscellaneous web page.

Reader comments areas defined by administrators and comments entered by end users are hosted on a server and stored in database remote from the administrator's web site server. An "iFrame" substitution process is used to allow this remote hosting of the reader comments. The iFrame substitution of the present invention provides a simple "window" to the server and database where all reader comments are actually entered, stored, and posted. However, they are also a part of the local site. It is important for the actual text of the posts to be a part of the local site (i.e., the administrator's web site) rather than just being reflected there so that the administrator gets the benefit of using incoming posts for search engine optimization. The administrator does not receive this benefit if the text in the posts is not actually on the local site and remains solely in the remote database.

Referring to FIG. 7, a display page screen shot for an example embodiment of the present invention is shown. The display page is the page that is created for public viewing. It is the page that results when an administrator uses the administrator page creator component to create reader comment areas for pre-existing web pages. Typically, the administrator places code generated in the administrator page creator below any pre-existing content on a web page to allow the reader comment areas and posts to appear at the bottom. The administrator can also place code for the reader comment areas in such a way that the reader comment areas appear at the very top of the page or any other area of the page relative to the pre-existing content. The web page content with the inserted code is then saved for posting at a web site. In FIG. 7, the title 232 is the only pre-existing content appearing above the reader comment area on this particular web page.

The display page comprises a reader comment input section 230. The reader enters comment data in this section of the display page. In the title field 232, the end user provides a title for his or her post. The end user enters his or her actual comment in the comment field 236. The end user can select an icon from the icon pull down menu 238 which has the icons the administrator originally uploaded in the administrator page creator. The end user enters a name in the name field and an email address 240. The end user can select an option for publishing his or her full name, first name only, or initials 242. The user name options from the personal journal page are not available on the display page because end users coming to the display page may not yet have signed up for a personal journal, and therefore, do not have a user name.

If the end user then chooses an option to create a personal journal 244, Javascript Show-Hide Layer Code allows the appearance of the otherwise invisible user name and password fields 248. The end user chooses a use name for logging onto his or her personal journal and a password. These user name and password fields 248 remain hidden if the end user chooses a "just post my comments below without creating my personal journal" option 246. The end user's comments are posted with the selection of a post comments option 250.

The display page also comprises a reader comment output section 252. The post fields appear at the bottom of the display page in the reader comment output section. The most recent end user's post is posted first on the page rather then last. The advantage of publishing the most recent end user's post first is the immediate gratification it gives the end user of being "headlined," versus stuck at the bottom of the webpage. An RSS option 254 enables web site visitors to create RSS feeds of the incoming posts on his or her own web sites if they like, or to view in other RSS-viewable places (e.g., choosing different RSS feeds is one of various preferences available to Yahoo.com's users). This option support further promotion of the administrator's web site.

The icon 256 for the post reflects the icon selected by the user from the icon pull down menu 238. The title 258 reflects the title entered by the end user previously in the title field 232. The comment 260 reflects the content entered by the end user in the comment field 236. The identifier 262 reflects the end user's choice for identifying his or her posts 242. Because the posts here also reflect posts made by end users in their personal journals, the identifier may reflect the end user's user name per that option uniquely available to end users posting from a personal journal. The date and time labels 264 reflect the date and the time the end user's post was made. The keyword label 266 reflects the keywords the administrator chose in the administrator page creator screen (FIG. 4). The combination of the keyword label 266 and the title listing 258 makes a dynamic keyword-rich page thus making it highly optimized to receive search engine traffic.

A tell-a-friend option 268 displayed next to each post results in a tell-a-friend popup. This feature enables the end user to email any post to multiple friends, which brings more traffic to the site. A rating option 268 may also be added next to each post to allow the end user and other visitors to rate every post on the page (e.g., 1=I didn't like this post; 2=I liked this post; and 3=I loved this post!). This option enables the administrator to create a contest for web page postings. As an incentive to get end users to write more posts, the administrator can award prizes to the top-winning end user poster for a given period of time.

Referring to FIG. 8, a tell-a-friend screen shot according to an example embodiment of the present invention is shown. This figure shows a standard tell-a-friend script that enables the end user to simultaneously email multiple friends to tell them about the web site they have just visited. It is coupled directly to the posts generated by end users. The entire tell-a-friend page can be made to automatically appear in a popup window when an end user enters a post on the display page or in his or her personal journal. The administrator page creator screen allows the administrator to automatically provide a subject line for the message 270 and to type any message into the message field 272 of the tell-a-friend page to provide the end user with a readily available message for the end user to tell a friend. The message includes a dynamically-generated URL that refers the end user's friend to the dynamically-generated "look-at-me-page" (as described below) which always highlights the end user's post.

Referring to FIG. 9, an administrator email screen shot according to an example embodiment of the present invention is shown. This figure shows a standard email script that enables the administrator to email the specific end user who made a post. The administrator selects an email option from the administrator page editor screen. The email option of the administrator page editor is linked for easy use to every post generated by end users. The "From" field is automatically populated with the administrator's name and email address. The "To" field is automatically populated with the end user's name and email address obtained when the end user made his or her first post either on the display page, or when he or she signed up for a personal journal on the login/sign-up screen. The content field can be made to automatically populate with any script the administrator entered into the administrator page creator. In the administrator page creator, any message can be input and automatically sent to every end user making a post.

Figure 10:
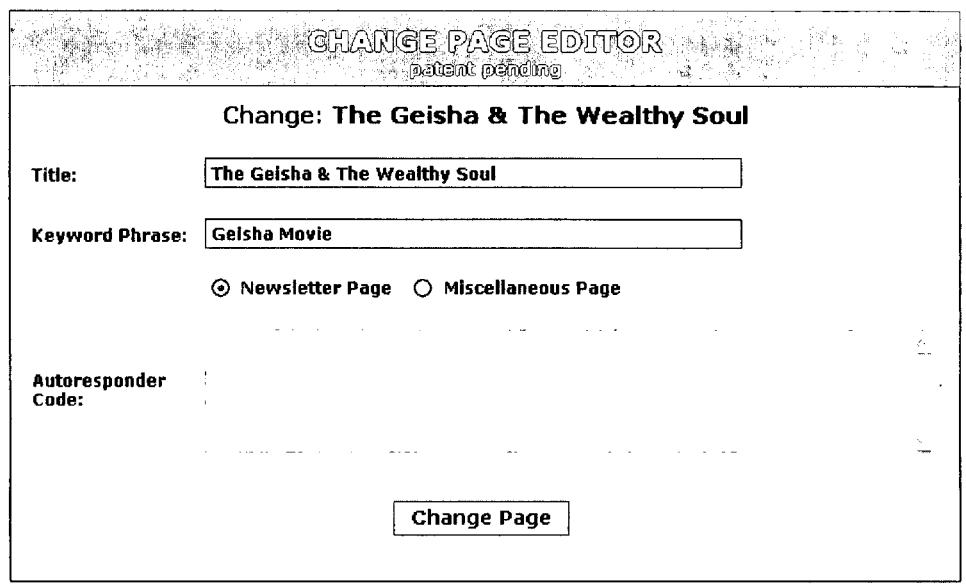
FIG. 10 is an administrator change page editor screen shot according to an example embodiment of the present invention.
Figure 11:
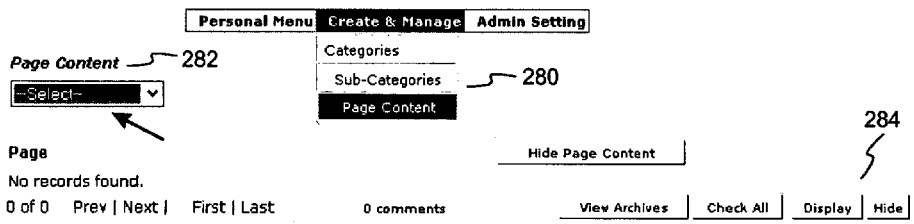
FIGS. 11-16 are screen shots for administrator category creation according to an example embodiment of the present invention.

Referring to FIG. 10, an administrator change page editor screen shot according to an example embodiment of the present invention is shown. This screen is virtually identical to the administrator page creator of FIG. 4. An important difference is that all of the fields are auto-populated with the information the administrator previously entered to create a specific page. This change page editor screen allows the administrator to update or change previous settings appearing on the display page of FIG. 7. The change page editor screen is accessible to the administrator via the change page option on the administrator page editor screen of FIG. 6.

A "look-at-me page" may be virtually identical to the display page of—FIG. 7 except for its URL. The URL for the "look-at-me page" is dynamically generated, and it features the end user's posts at the top of the comments section, highlighting them in any variety of ways such as by displaying them in different background colors and designs compared to the other posts, or bordered by stars, in bold, etc. The end user may be provided with various options for highlighting his or her own posts. The end user may also choose which posts to make public and which to keep private. End users may be much more inclined to publicize their own posts if they can personalize them for others. It also results in promotion of the administrator's site using the tell-a-friend feature in FIG. 8 because the end user's post is the highlight of the "look-at-me page." The feature allows the end user to perform the functions of a "secondary administrator" and promote greater use of the primary administrator's web site thereby greatly increasing the primary administrator's traffic.

A contest generator page hosts the results of end-user post rankings using web site visitors' ratings of the various posts via the ratings feature on the display page of FIG. 7. It features a list of numerically ranked end users names according to his or her scores, highest to lowest. An administrator area of this page contains another entry field that allows the administrator to specify date ranges within which to calculate the scores. Another entry field allows the administrator to specify how many points he or she wants each end user to automatically receive per each post entered. This approach rewards people who post frequently, thus encouraging active participation of end users. The administrator can determine what prizes will be rewarded for each winner.

A "create blog" feature allows each end user to create a blog that displays just his or her posts, and just the ones they choose to make public via checkmark boxes that appear next to each of his or her posts. The end user performs the functions of a "secondary administrator," and promotes greater use of the primary administrator's web site thereby greatly increasing the primary administrator's traffic.

An ebook feature allows each end user to create an ebook of all his or her unique "look-at-me" pages. The end user chooses which posts to include in the ebook. This feature automatically puts all selected posts into an MS Word format or a pdf. format, per his or her own choosing. It also includes various cover template designs, table of content designs, and overall book designs. The administrator may also be ebook creator by creating ebooks of reader comments. The ebooks may be sold or distributed as a "virtual marketing tool." End users whose comments appear frequently in an ebook may be inclined to distribute the ebook to others.

An end user greeting card creator feature enables the end user to send his or her posts as virtual greeting cards. This feature may be used in addition to or instead of the tell-a-friend emails and provides another dynamic marketing tool for the administrator's web site.

A comment rotator and emailer feature allows an administrator to rotate posts appearing at the top of each web page. The posts may be rotated daily or more frequently throughout the day. An email may be sent automatically to each particular end user at the time his/her post is headlined. This feature creates a reason for the end user to revisit the web page and to refer friends to it.

Referring to FIGS. 11-16, category creation and use screen shots according to a second example embodiment of the present invention are shown. Referring to FIG. 11A, a categories overview screen shot for an example embodiment of the present invention is shown. The sample screen shows four categories that have already been created. Referring to FIG. 11B, an add category screen shot for an example embodiment of the present invention is shown. In the category name field 280, the administrator enters a name for a new category (e.g., Old Testament). The next level selection field 284 is used if the category will have sub-categories. "-Select" appears by default, but can be erased. In this example, the administrator has entered "--Select Book--" (to select a "Book" from the Old Testament category). The order type field is a pulldown menu from which the administrator can select a non-sequential or sequential ordering of the sub-categories of the category being created. In the case of "The Old Testament," the administrator has selected "Non-Sequential" because the books of the bible that will be entered as sub-categories are not sequential (e.g., alphabetized or numeric). For example, the next five sub-categories that will be entered in the next phase of the administrator's category/sub-category creation are non-sequential: Genesis, Exodus, Leviticus, Numbers, and Deuteronomy. If the sequential option is selected, the books would later appear to all users in alphabetic order without regard to the order in which the administrator entered them: Deuteronomy, Exodus, Genesis, Leviticus, and Numbers. The administrator selects the "add new category" option to save all selections in the fields above.

Figure 12:
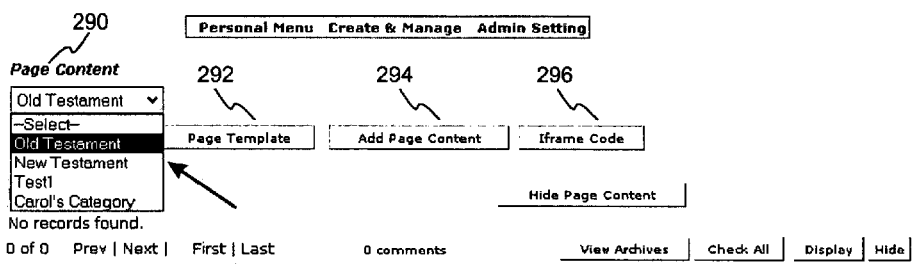
Figure 12B:
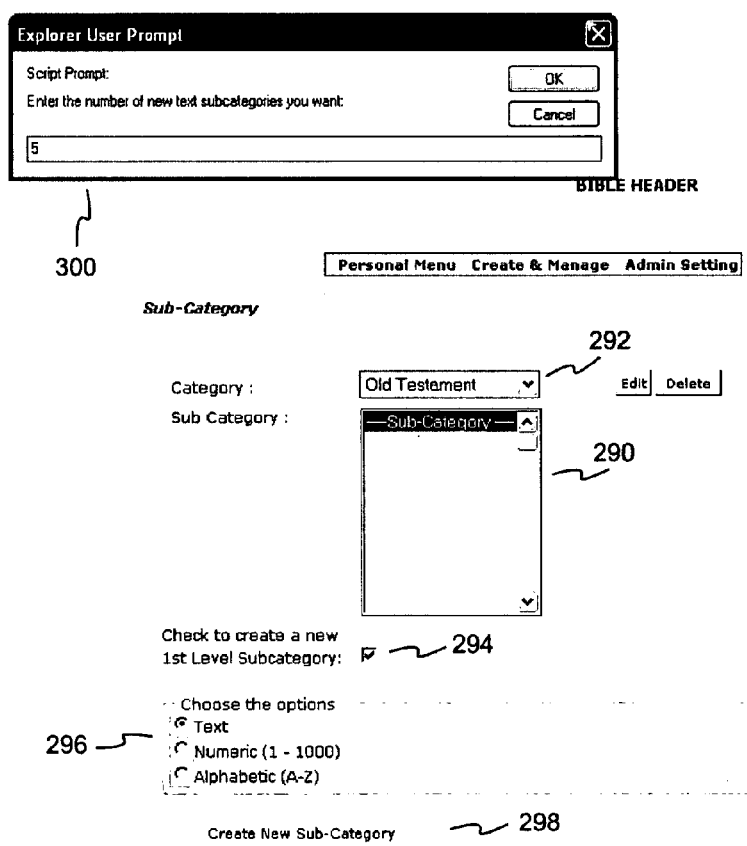

Referring to FIG. 12A, a sub-category creation screen shot according to an example embodiment of the present invention is shown. From the category pulldown menu 286, the administrator chooses from which category he wishes to create sub-categories and then selects "create new sub-category" option 288. Referring to FIG. 12B, a create new text screen shot according to an example embodiment of the present invention is shown. The sub-category pulldown menu 290 appears showing all the sub-categories so far created for the specified category in the category pulldown menu 292. In this example, no sub-categories have been created yet, so administrator selects a "new 1.sup.st level sub-category" option 294. Then he selects one of three options to specify whether the new sub-category will be Text, Numeric, or Alphabetic 296. In this example, the text option is selected. Upon choosing the text option and selecting the "create new sub-category" option, a prompt popup 300 appears, into which administrator enters how many sub-categories he wishes to create (five in this case). After administrator selects the "OK" option, the screen (in FIG. 12C appears.

Referring to FIG. 12C, a text sub-categories entry field screen shot according to an example embodiment of the present invention is shown. Because the user entered "5" for the number of sub-categories to create, five new sub-category entry fields appear. For each new sub-category, similar to the create category function of FIG. 11B, the administrator enters the sub-category names 302 (e.g., Genesis, Exodus, Leviticus, Numbers, and Deuteronomy). Then administrator specifies for each sub-category of the new sub-category (if there will be any) whether the sub-subcategory should be sequential or non-sequential. The "next level selection" field 306 is used if the sub-category will have additional sub-categories. "-Select" appears in the field by default, but can be erased. In this example, the administrator has entered "--Select Chapter--" (i.e., to select a "chapter" of Genesis, Exodus, Leviticus, Numbers, and Deuteronomy). Those sub-category chapters are created in FIG. 12D. The administrator selects the "Create new sub-category" option 308 to create all the new sub-categories.

Figure 12D:
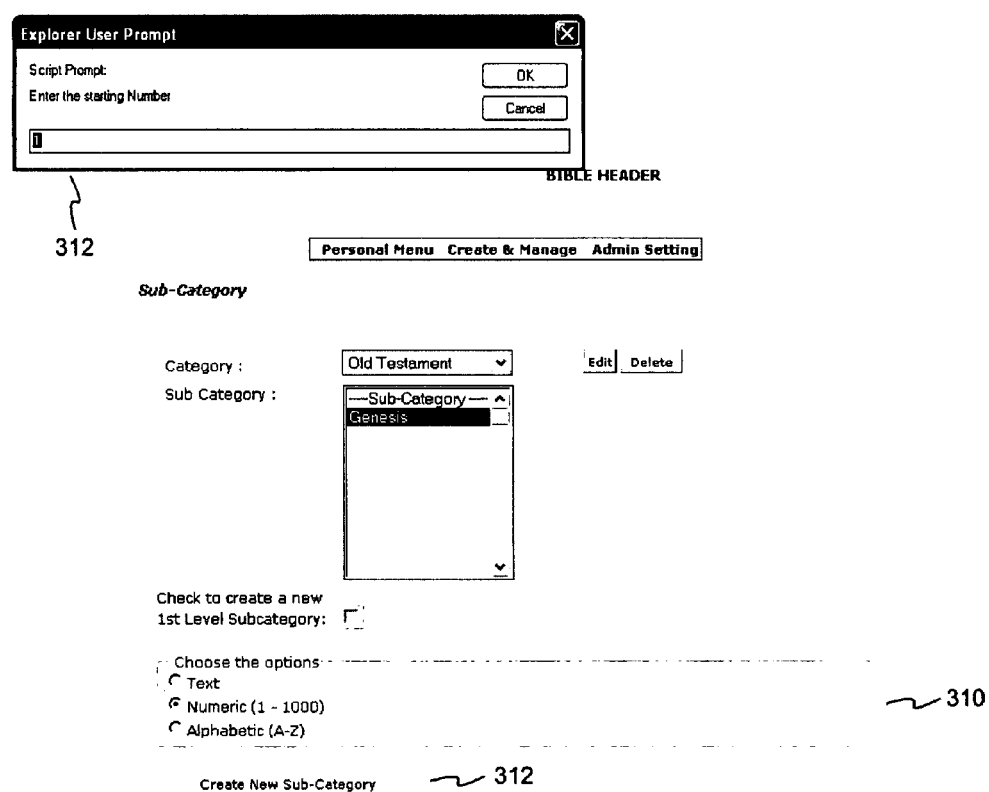
Figure 12E:
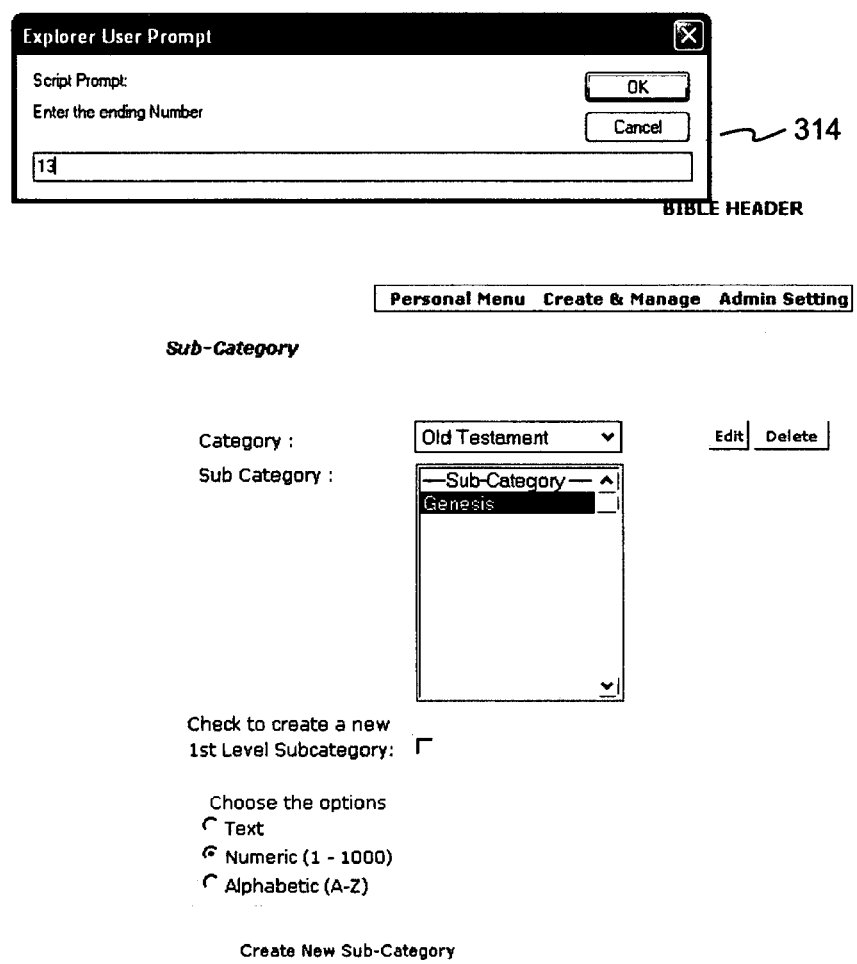
Figure 14:
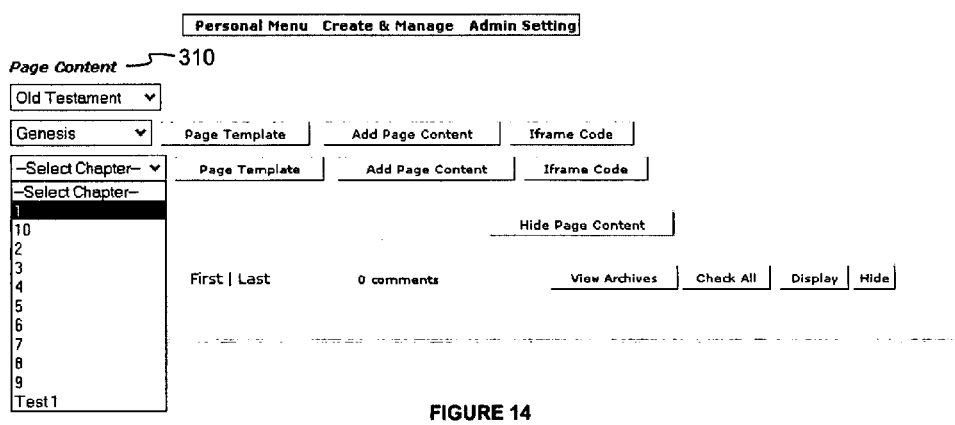

Referring to FIGS. 12D-F, a numeric sub-categories entry field screen shot for an example embodiment of the present invention is shown. In this example, the administrator selected the numeric option 310 in order to create numbered chapters of the selected sub-category Genesis. Upon selecting the numeric option 310 and selecting the "create sub-category" option 312, a prompt popup appears into which administrator enters the starting number of the sub-categories he wishes to create (1 in this example). After selecting the "OK" option, the prompt popup disappears and another prompt popup appears 314 as shown in FIG. 12E. The administrator enters the ending number of the sub-categories he wishes to create (13 in this case). After selecting the "OK" option, the prompt popup 314 disappears and the screen of FIG. 12F appears. If the administrator scrolls through the sub-category pulldown menu 316, he can see all the sub-categories so far created. Visible in this example figure are the 13 sub-categories created under Genesis. (Genesis is not visible because the scrollbar would have to be moved to the highest position). The alphabetic option works in a similar fashion as the number option with the exception that the administrator can create alphabetic sub-categories.

Figure 13:
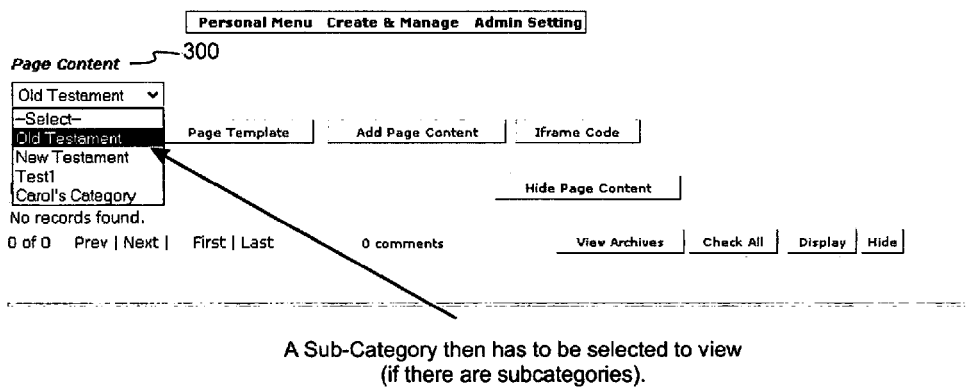
Figure 13B:
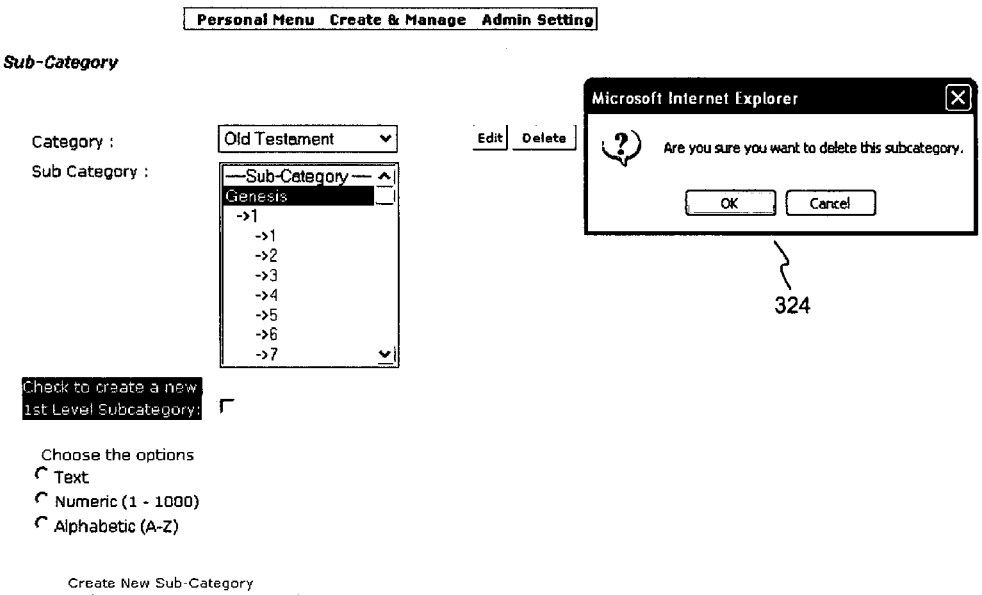

Referring to FIGS. 13A and 13B, edit and delete sub-category screen shots for an example embodiment of the present invention are shown. Referring to FIG. 13A, the administrator may select an edit or delete option 320. If the edit option is selected, a prompt popup 322 appears prompting the administrator to change the options associated with the specified sub-category. Referring to FIG. 13B, when the delete option is selected, a prompt popup appears prompting the administrator to confirm the deletion.

Figure 14A:
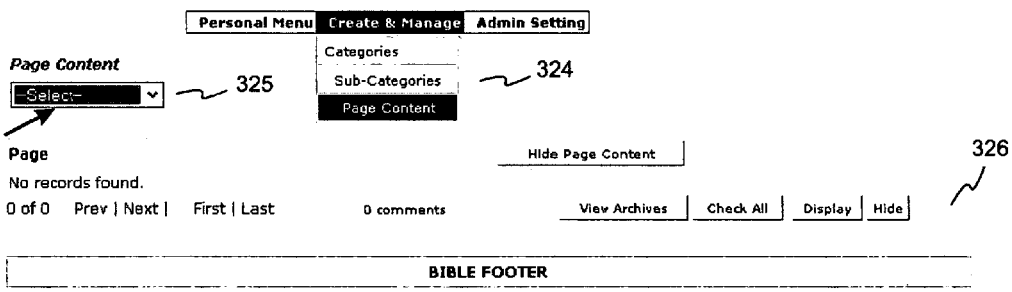
Figure 14B:
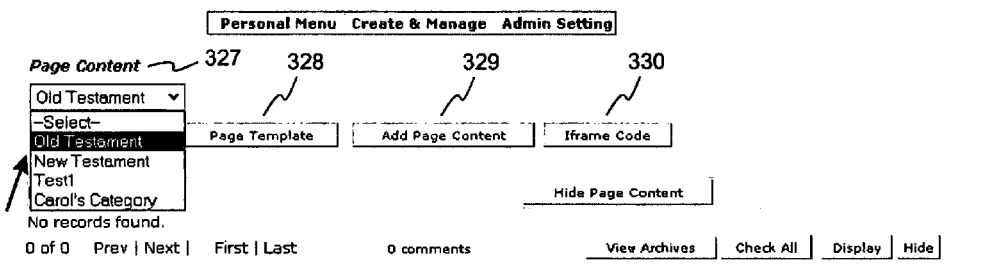
Figure 14C:
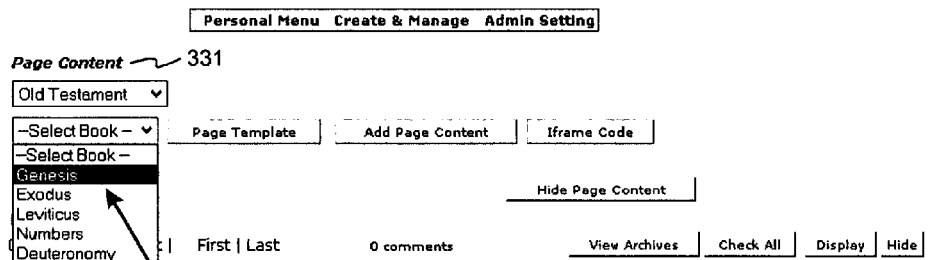

Referring to FIGS. 14A-C, page category creation screen shorts according to an example embodiment of the invention are shown. The administrator may use defined categories and sub-categories in association with page content as he or she chooses so that the administrator can use his or her own preferred way of classifying the web pages for a site. Referring to FIG. 14A, the administrator selects "categories," "sub-categories," or "page content" from a create and manage menu 324 to use a particular class web page content. The web page classification also facilitates end user selection of content for which the end user would like to provide comments. The administrator selects a category or sub-category to be associated with web page content 325. Additional options for managing created web page content include options for viewing archive pages, selecting pages, and displaying/hiding pages are also provided 326.

Figure 15A:
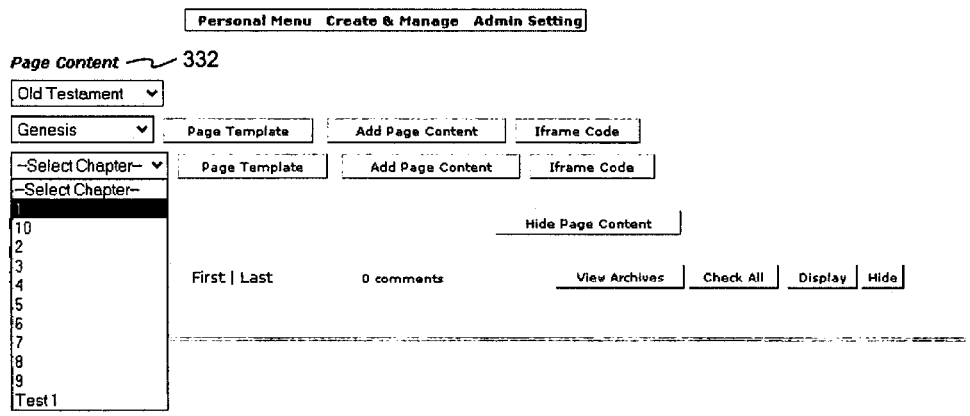
Figure 15B:
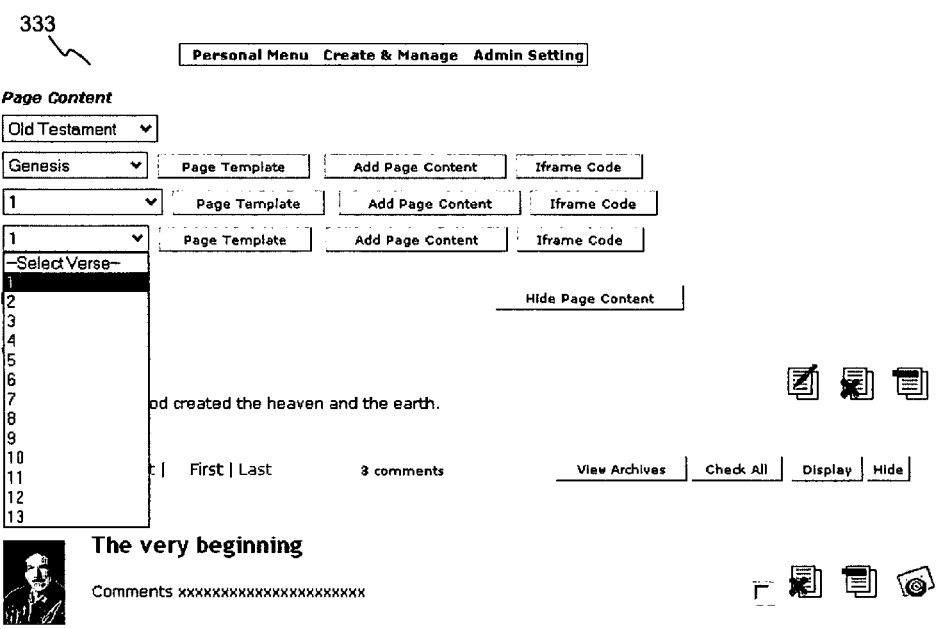
Figures 16, 17:
FIG. 17 is example reader comment area code for insertion into web page content according to an example embodiment of the present invention.

Referring to FIG. 14B, the administrator selects a category 327 (e.g., "Old Testament." The administrator may further select a page template 328 for creating the web page, an option to add page content 329, and an option to add iFrame code 330 to a web page to create a reader comment area on a web page associated with the specified category. Referring to FIG. 14C, following selection of the category, the administrator may select a first sub-category 331 (e.g., "Genesis"). Referring to FIGS. 15A and 15B, additional sub-categories may be selected (e.g., "Chapter 1" 332 and "Verse 1" 333). Referring to FIG. 16, the administrator may then specify content to be associated with the specified categories and sub-categories 334. Referring to FIG. 17, sample iFrame substitution code according to an example embodiment of the present invention is shown. The iFrame substitution code to be associated with the specified web page content is generated so that it may be added to HTML code for the web page. The code may be inserted anywhere in the HTML code where the administrator would like a reader comment area to be provided. The iFrame substitution code provides access to the reader comment area for the specified portion of the web page. Comments provided by end users are then associated with the specified portion of the web page through the reader comment area. When comments are entered by readers of the web site, they are saved in a database remote from the administrator's web site but are still part of the local site for search engine optimization.

Figure 18:
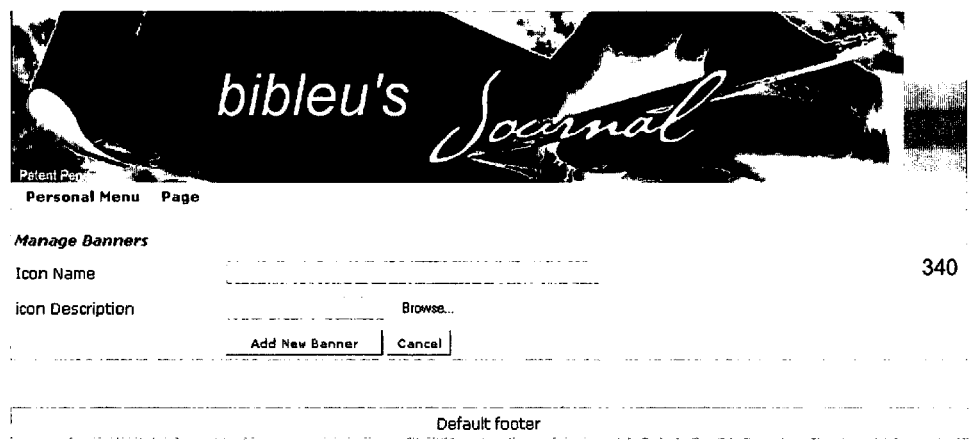
FIGS. 18 and 19 are screen shots for creating and managing banners according to an example embodiment of the present invention.
Figure 19:
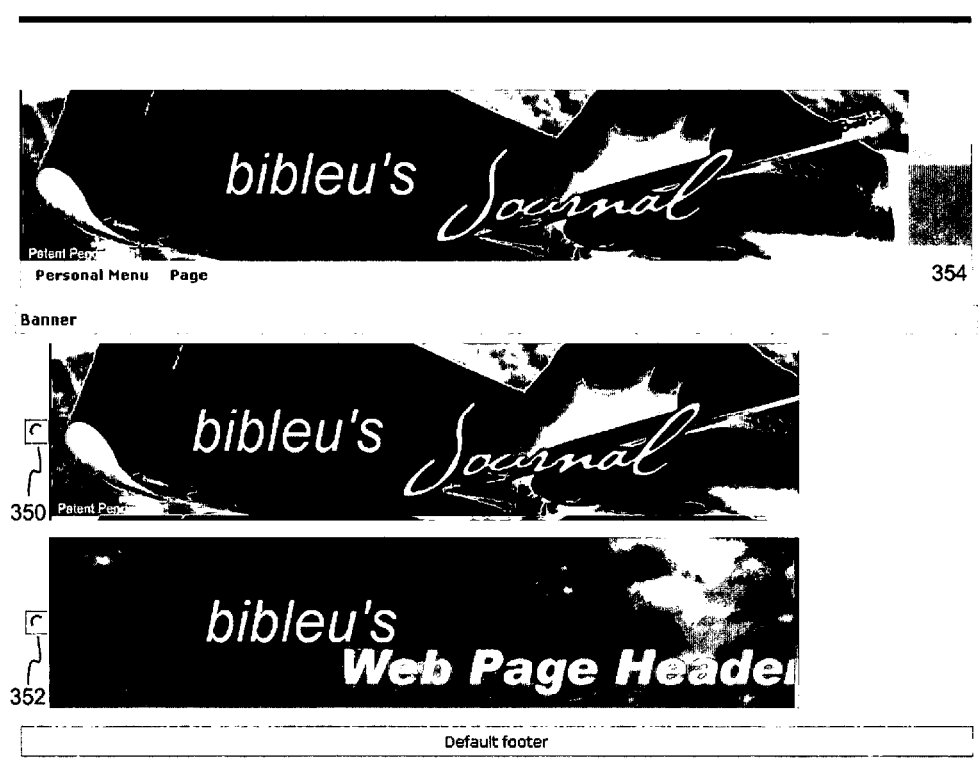

Referring to FIGS. 18 and 19, screen shots for creating and managing banners according to an example embodiment of the present invention are shown. Referring to FIG. 18, an administrator can define various icons 340 to be used as banners for a web page. Referring to FIG. 19, an administrator can select a banner 350, 352 to be used in association with a specified web page. The selected banner may be displayed at the top of the page.

Figure 20:
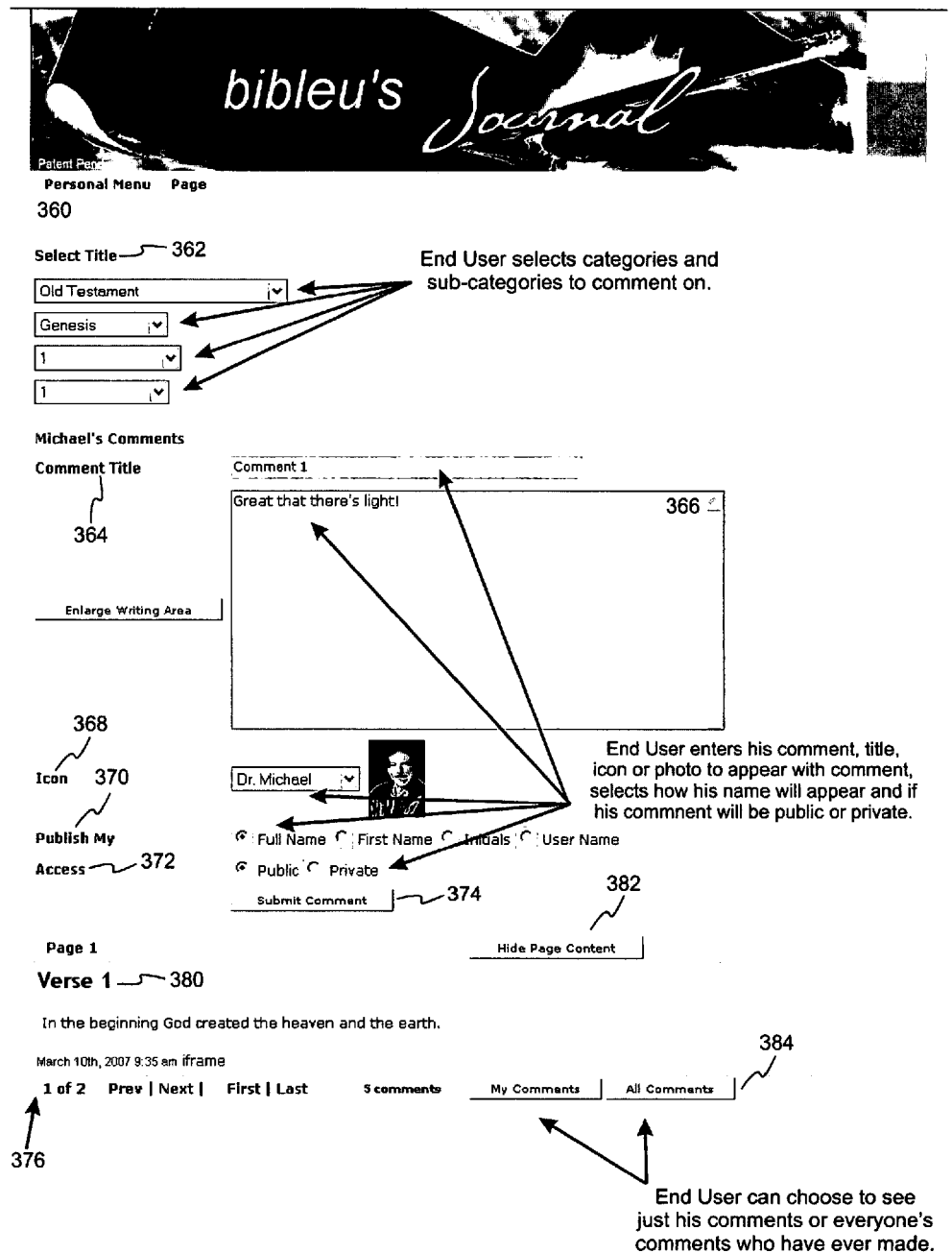
Figure 21:
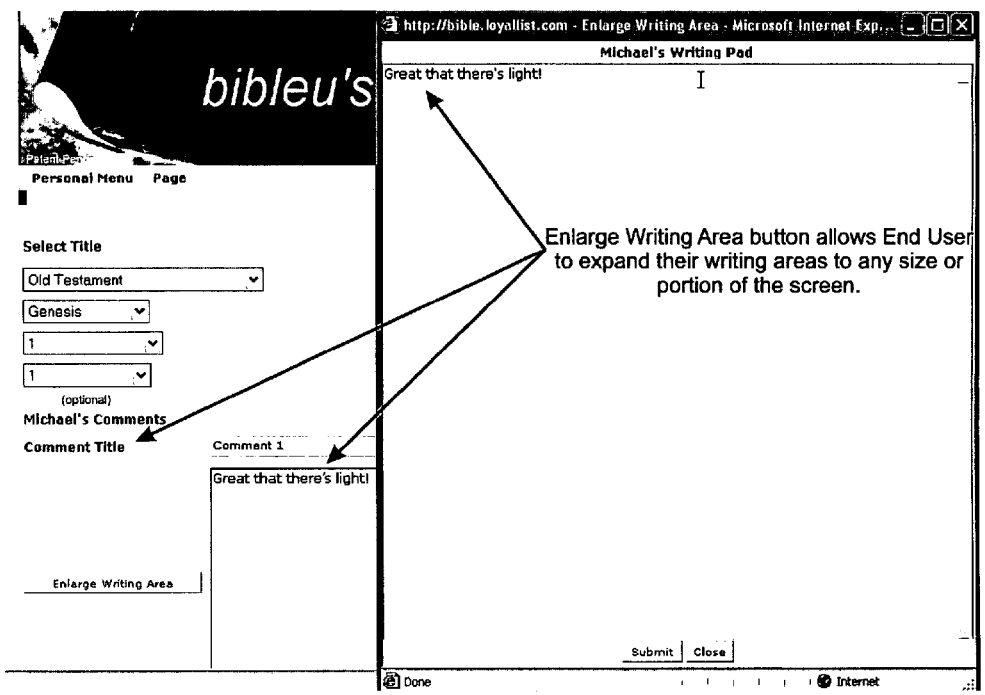

Referring to FIGS. 20-22, sample end user comment screen shots for an example embodiment of the present invention are shown. The screen may comprise a reader comment input section 360 and a reader comment output section 376. Referring to FIG. 20, using the categories and sub-categories defined by the administrator, the end user can specify a category and sub-categories to select a portion of a web page on which to comment 362. In the comment area of the screen, the end user specifies a comment title 364 and enters his or her comment in a text area of the screen 366. The end user may further specify an icon to be associated with the comment 368. The end user may also specify an identifier to be associated with the comment 370 (e.g., full name, first name, initials, or user name). The end user may also decide whether to make his or her comments public or private by specifying an access option 372. After providing the requested input, the end user selects a submit comment option 374 to post the comment publicly or privately depending upon the access option selected.

The end user's comment is displayed in the reader comment output section at the bottom of the screen 376. The comment is displayed 380 along with a time stamp indicating when it was entered. The user may select an option to hide the comment once it has been entered 382. The end user can also choose to see only his or her comment or all of the comments entered by other users 384. Referring to FIG. 21, a screen shot for an enlarge writing area option according to an example embodiment of the present invention is shown. Referring to FIG. 22, another sample end user comment screen shot according to an example embodiment of the present invention is shown. As shown in the reader output section 390, the end user's comment appears as it will on the display page for the web site.

Technical details related to the category/sub-category feature of the present invention are as follows. AJAX framework (HTML AJAX) controls AJAX functionalities for the present invention. The code<?php $utils->get_category_list('slt_category',"onchange=\"sendSub-category(-this.value);showOther( )\"");?>loads a list of categories in the Manage Sub Category page (manage_sub_category.php) page. A utility class is defined in a classes folder (root_folder/classes/utils.class.php) which is a collection of utility functions. This class has many functions including redirecting and displaying JavaScript message, and listing many other functions. The above function get_category_list( ) is defined in a root_folder/classes/utils.class.php file which will that takes some parameters and lists the all the categories made by the current administrator.

When the selection of items listed in the category drop-down list is changed, an onchange event (onchange=\"sendSub-category(this.value)) is called in this function and this sendSub-cateory(this.value) sends the selected item id to sendSub-category(cat_id) javascript function defined in the current page. After the a value is passed to sendSub-category(cat_id) function and parameter values are passed to the function, it hides the Options Panel and sub category Panel if the passed parameter value is 0 . Otherwise it creates an instance of object of review class defined in root_folder/ajax_classes/review.class.php.

After the instance of object of review class is created using javascript, a last line of code defined in the function sendSub-cateogry(cat_id) registers a php function loadSub-category (cat_id,") defined in review.class.php class file. While using HTML_AJAX framework in our program we have to register our user defined class to the ReviewServer defined in root_folder/ajax_claases/auto_server.class.php. After the load-Sub-category(cat_id) is called this function connects to the database and loads all the sub-categories under selected category and return to the JavaScript. Again there is a function called loadSub-category: function(result) which is a part of HTML_AJAX. This retrieves the HTML and reloads the sub category drop down box. The options panel is also visible.

Figure 23A:
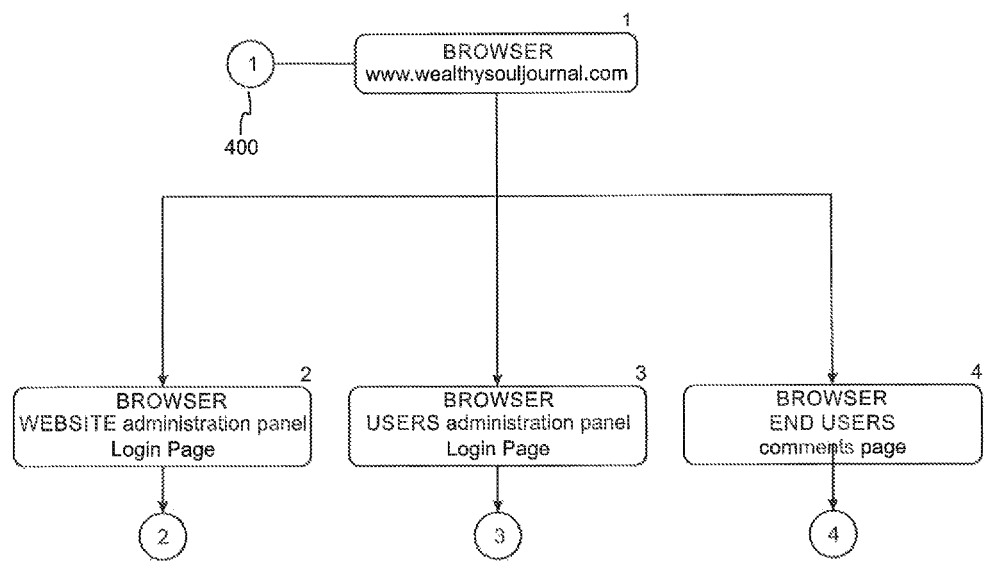
FIGS. 23A-23OO are a flow diagram illustrating the web site administration, user administration, and end user components for an example embodiment of the present invention.
Figure 23B:
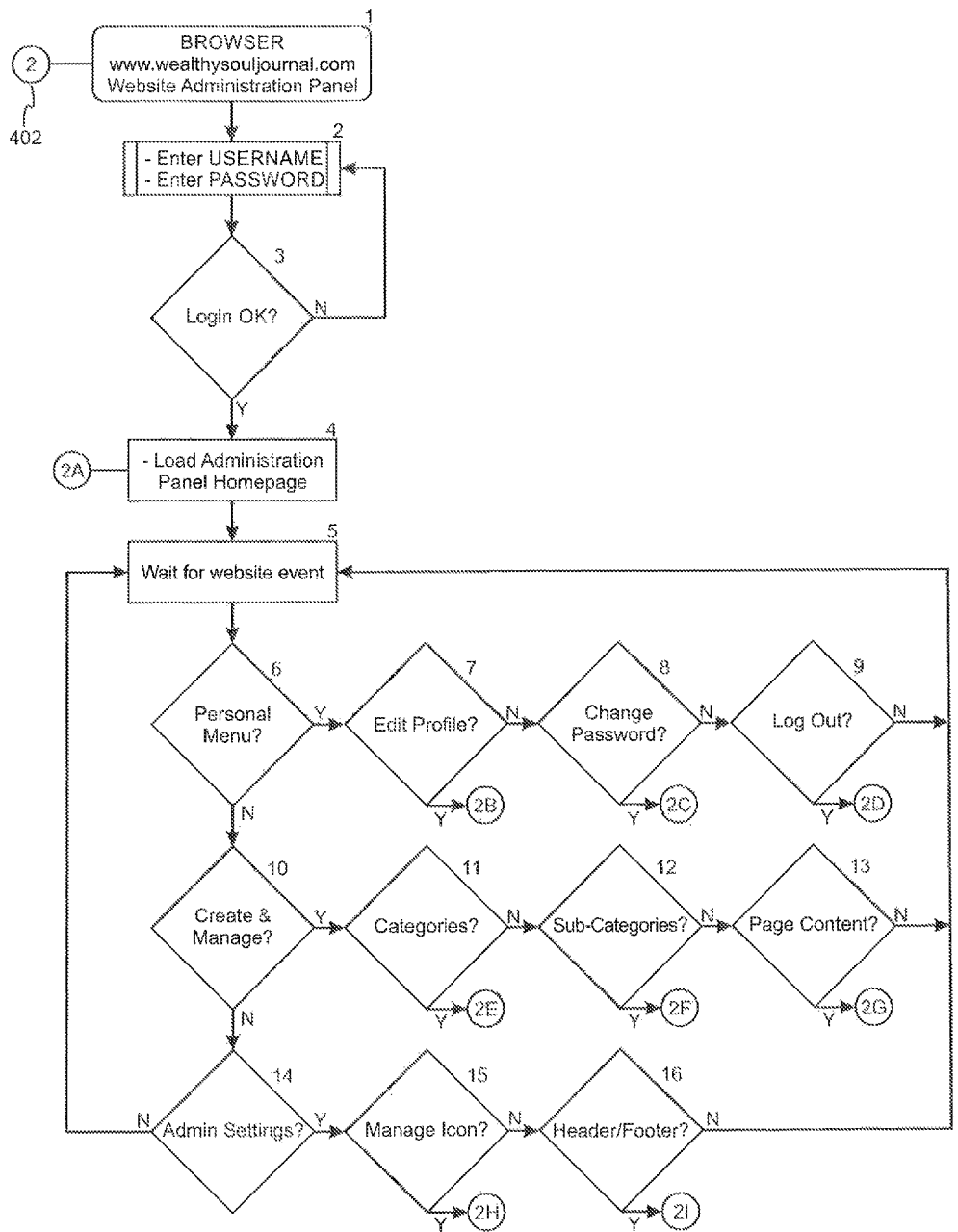
Figure 23C:
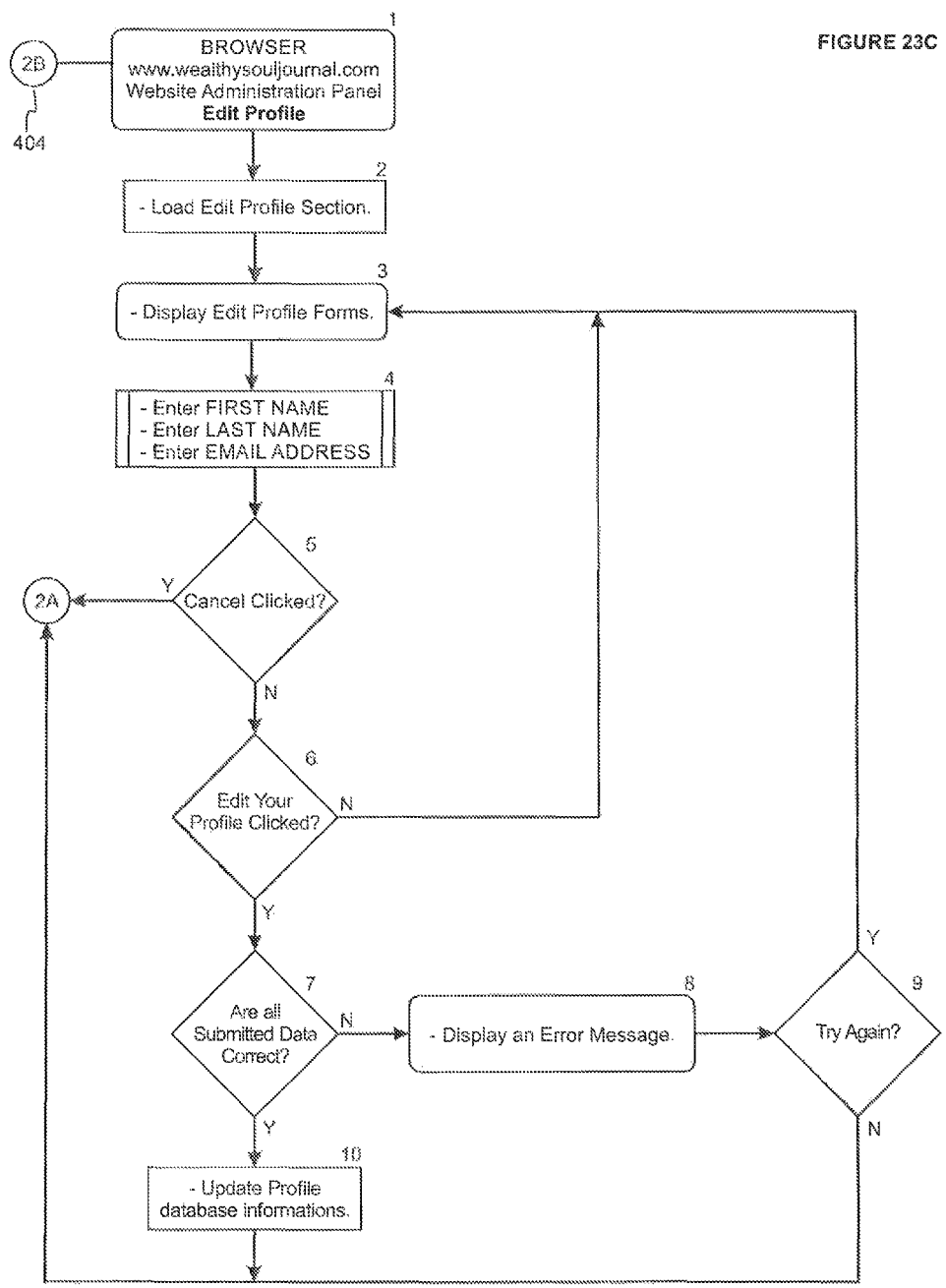
Figure 23D:
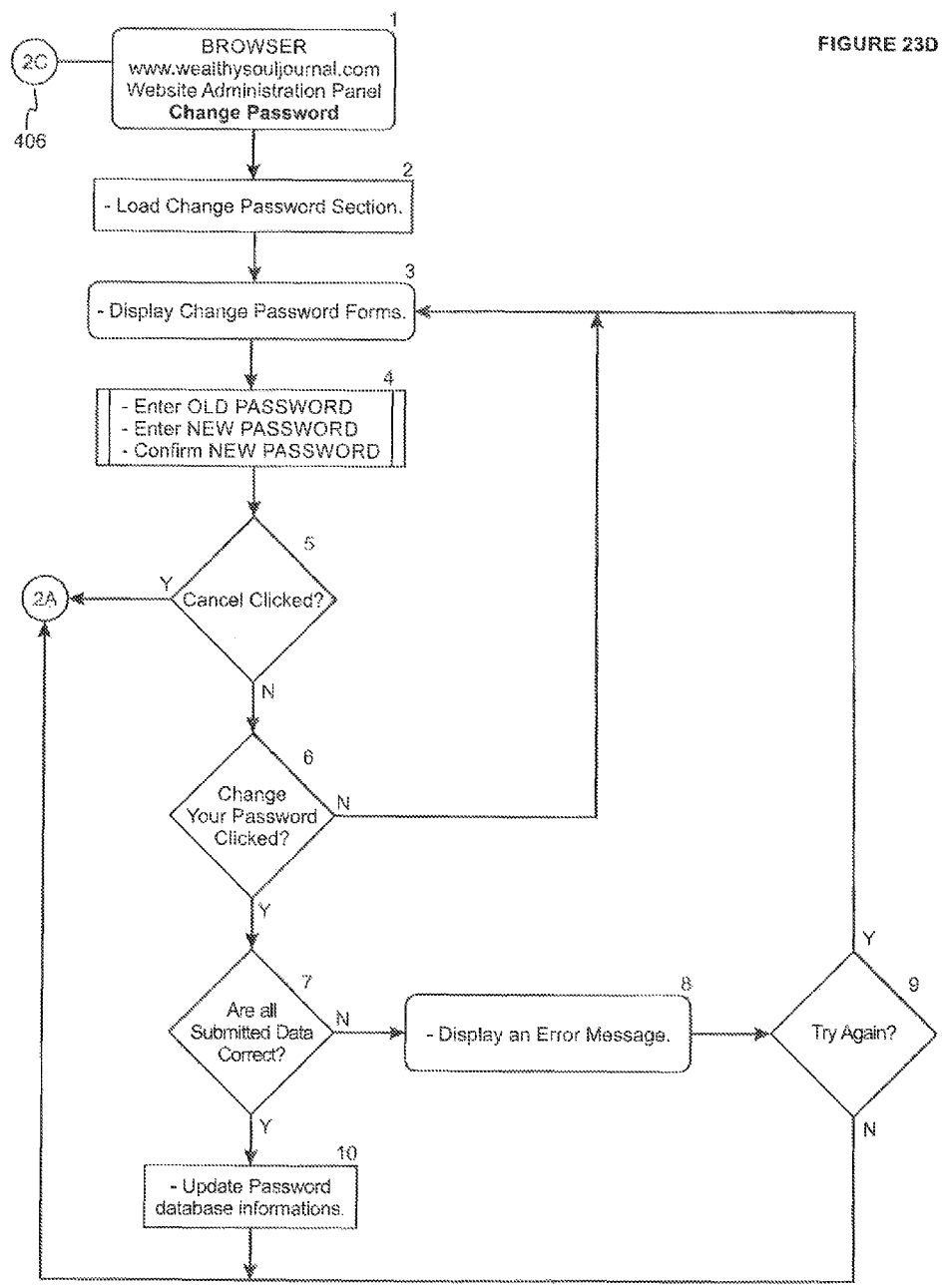
Figure 23E:
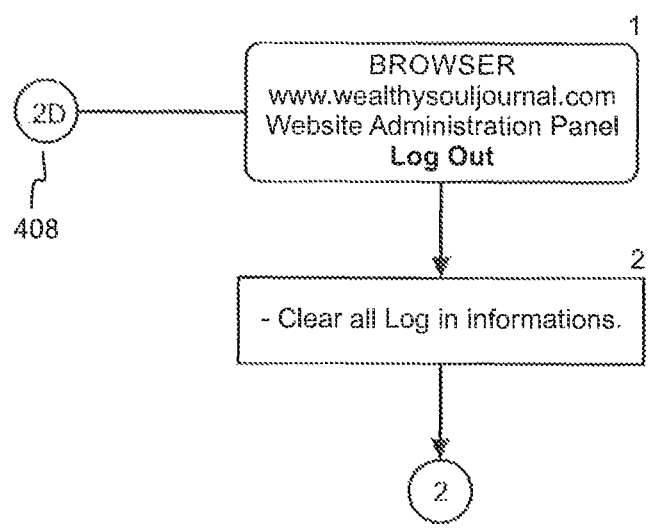
Figure 23F:
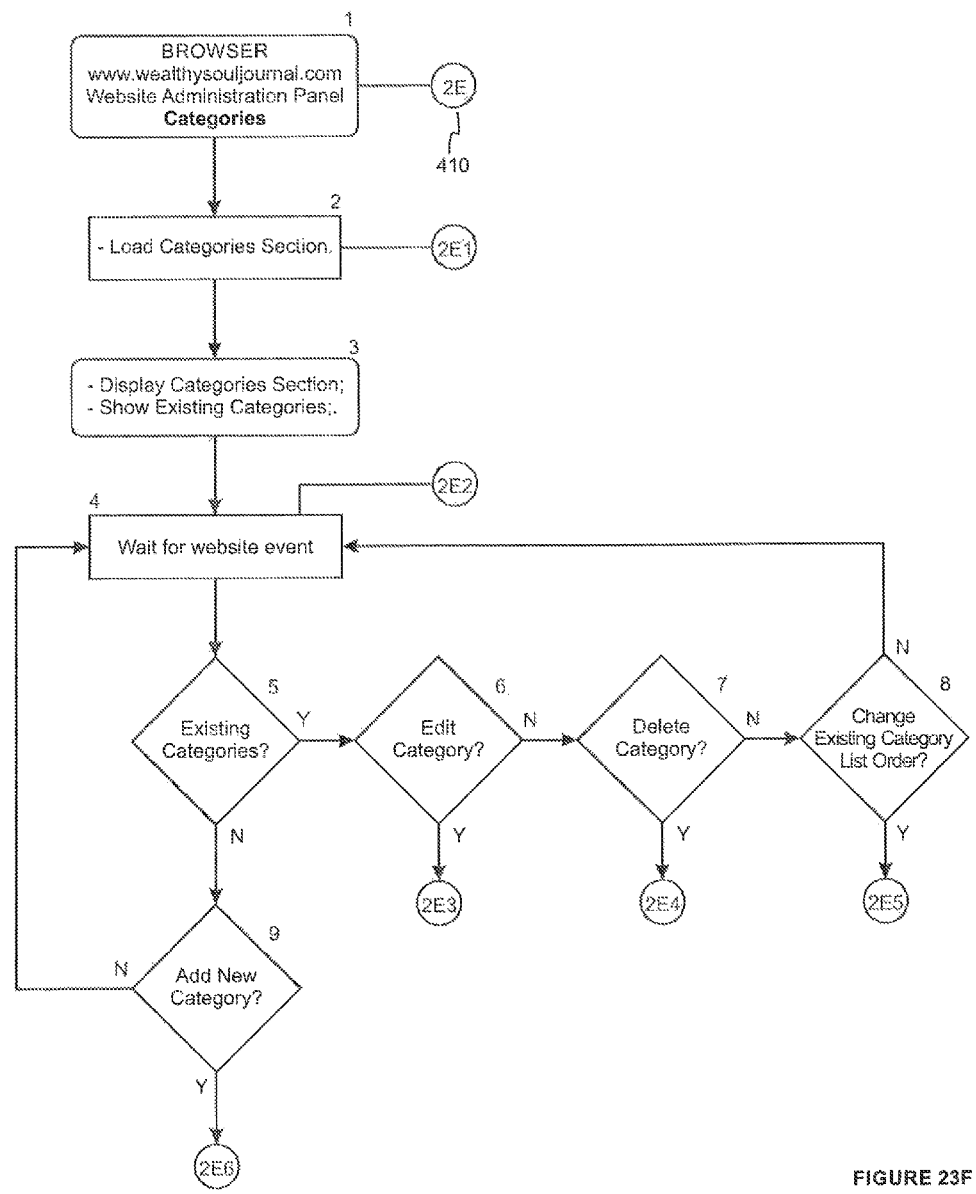
Figure 23H:
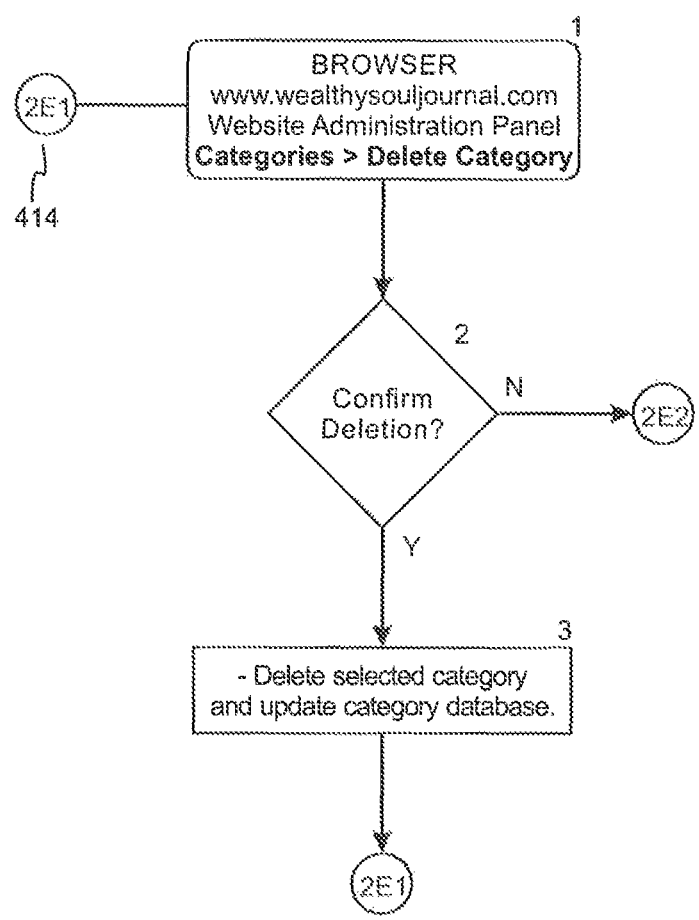
Figure 23I:
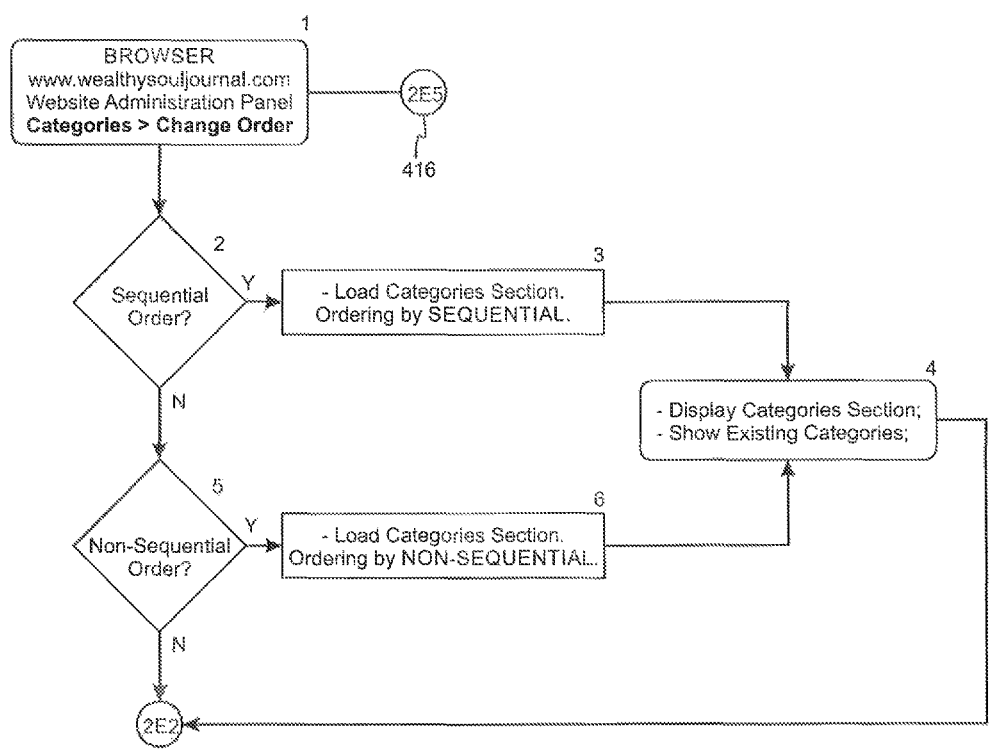
Figure 23J:
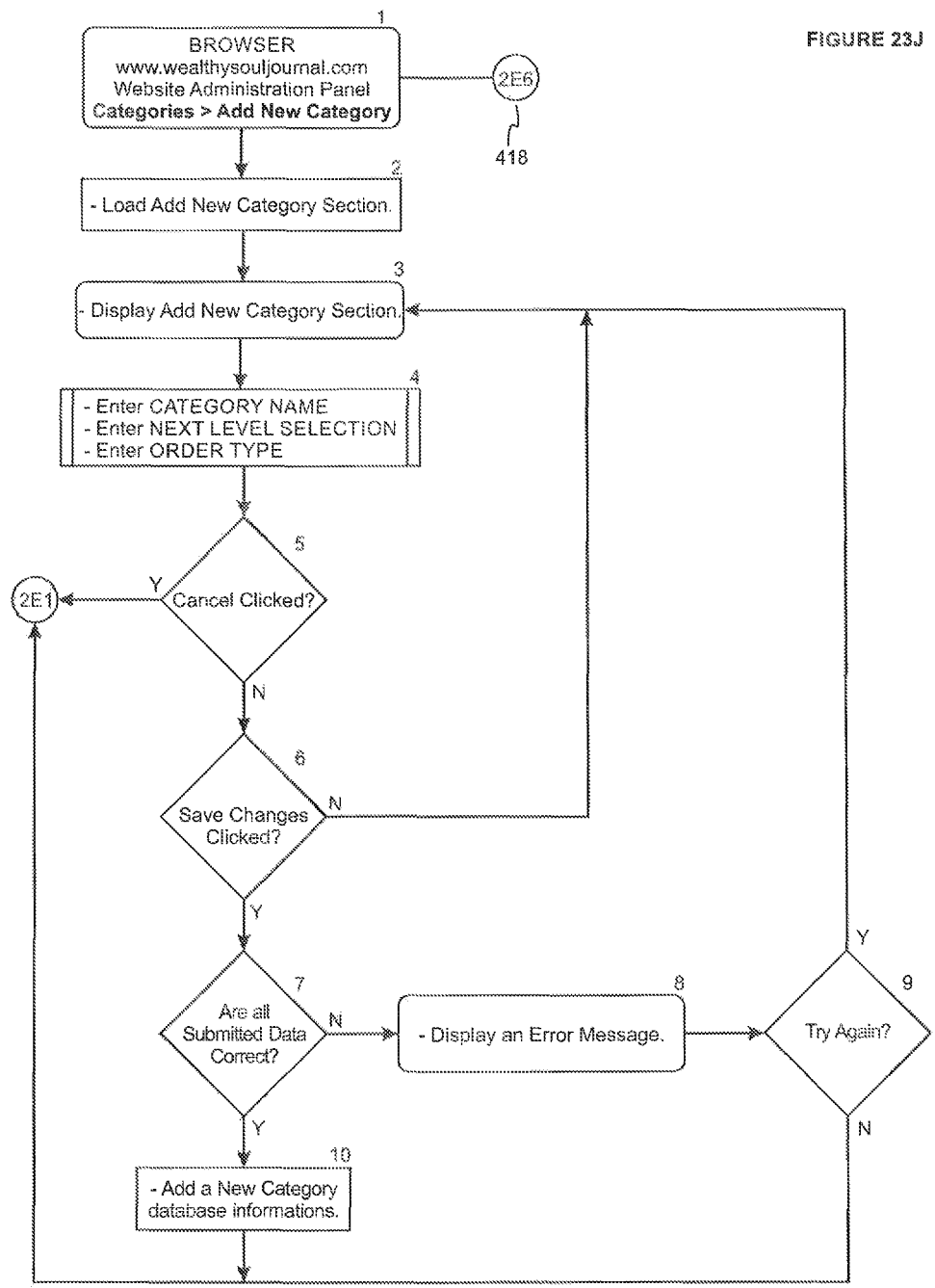
Figure 23L:
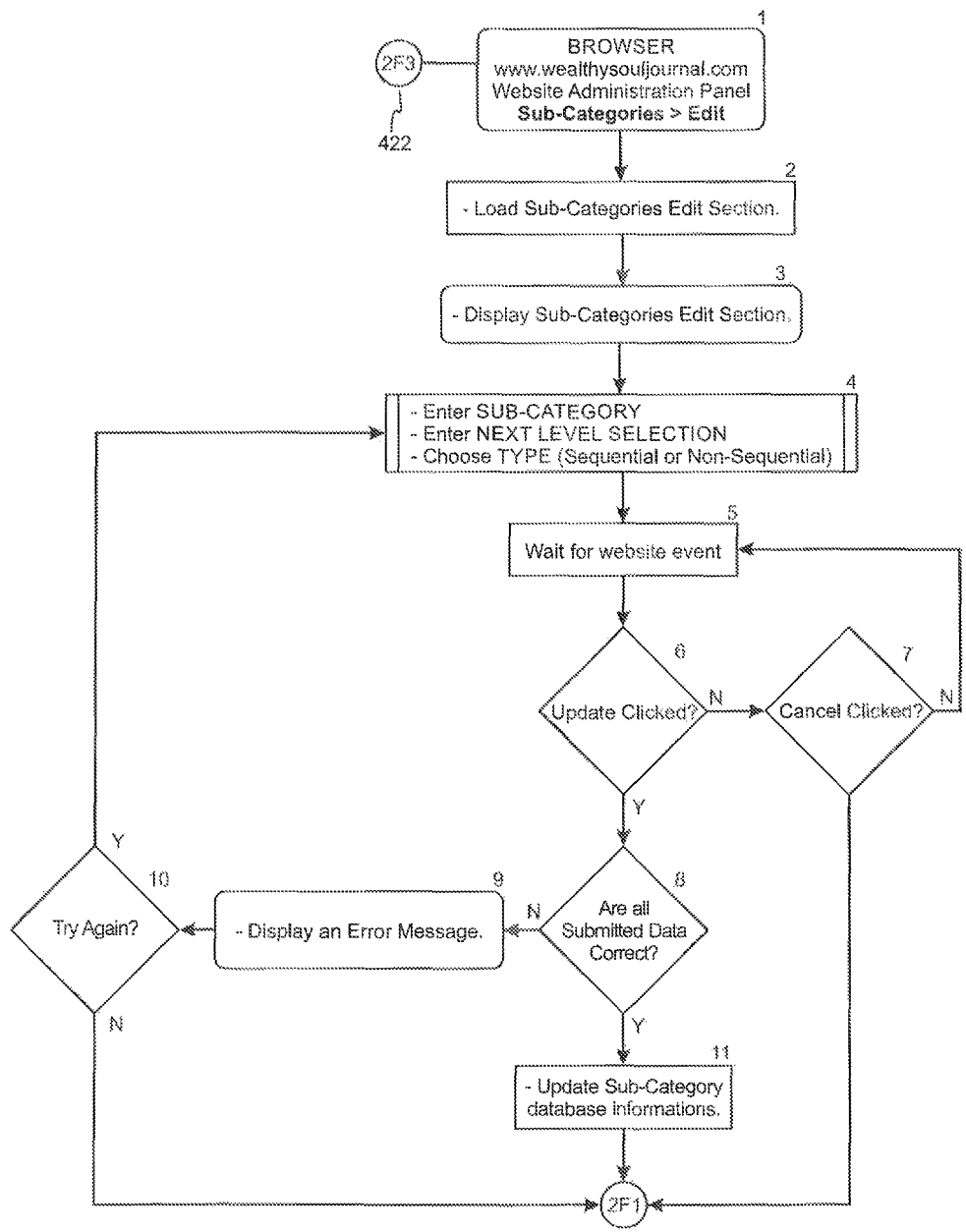
Figure 23M:
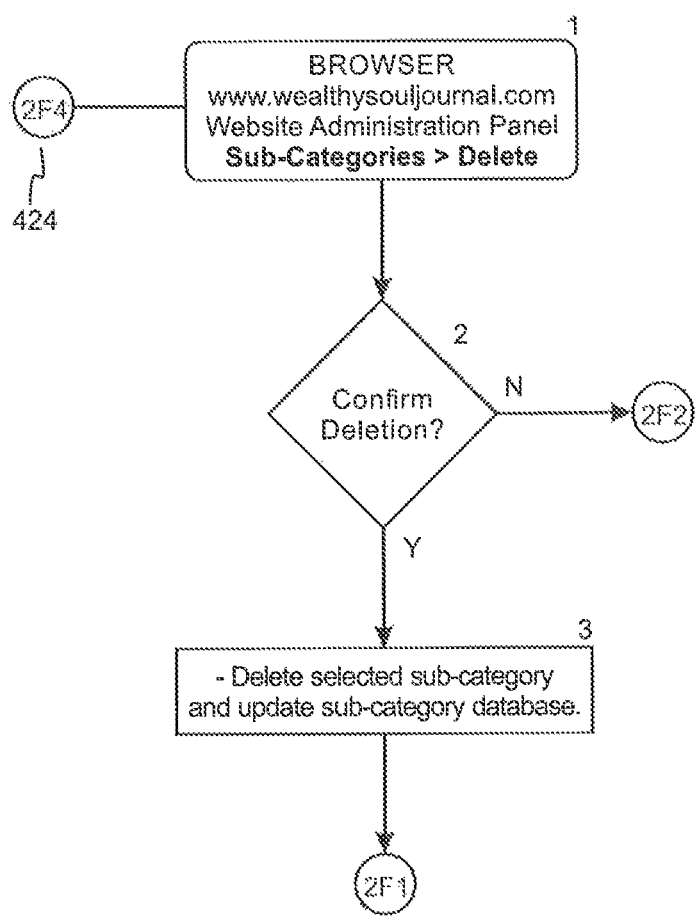
Figure 23N:
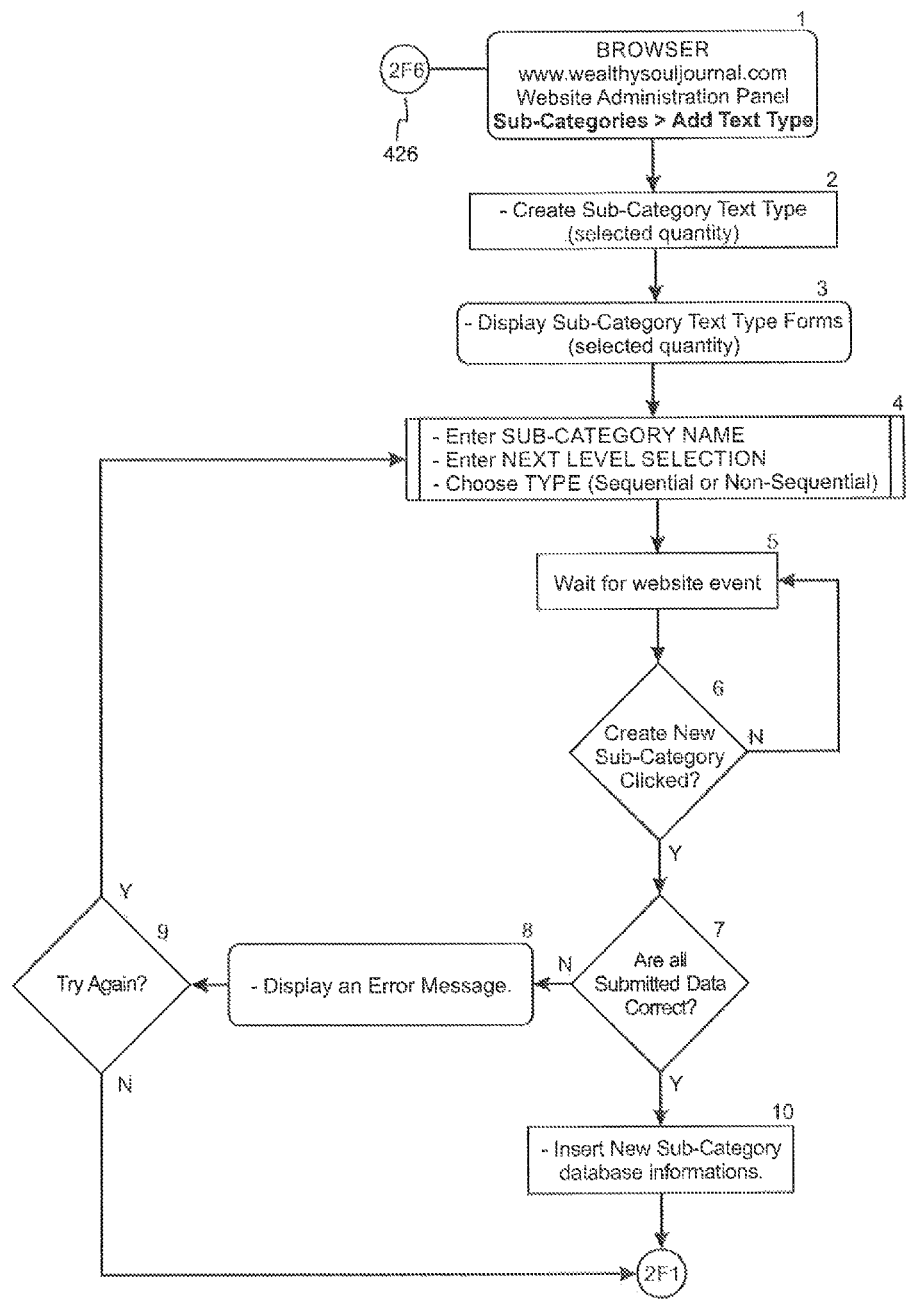
Figure 23O:
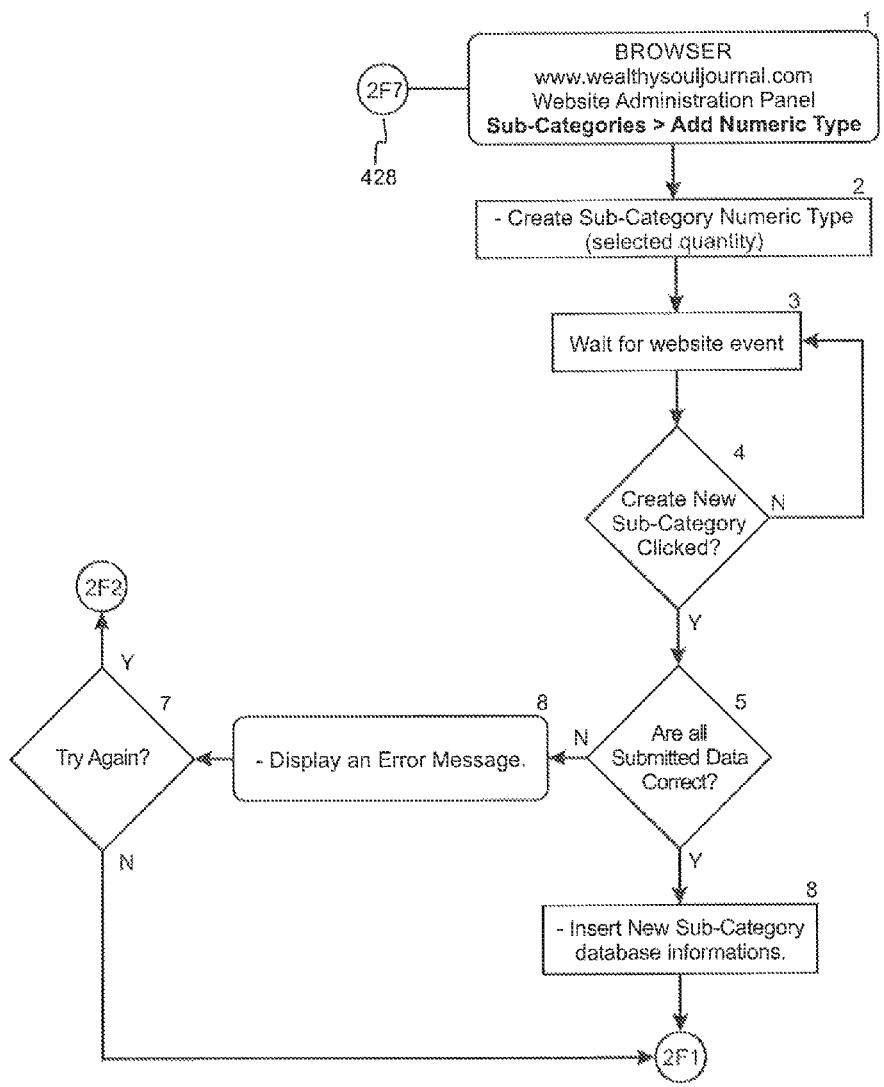

Referring to FIGS. 23A-23OO, a flow diagram illustrating the web site administration, user administration, and end user components for an example embodiment of the present invention is shown. The present invention comprises an iFrame substitution solution to provide features and functionality related to reader comment areas. The embedded technologies in the iFrame substitution solution include HTML, PHP, Javascript, MySQL, CSS, and AJAX methods.

Referring to FIG. 23A, beginning at 400, the following steps are performed.

TABLE 1

| Step | Action |
|---|---|
| 1 | With any ECMA-262 compatible browsers (Internet Explorer 5+, FireFox 1.5+, Opera 8+, etc), the user accesses a URL (e.g., (www.wealthysouljournal.com). Users are permitted to access to one of three distinct sections: Web Site Administration System Panel, Users Administration System Panel, and End User System Panel. |
| 2 | The user proceeds to the WEB SITE administration panel login page. |
| 3 | The user proceeds to the USERS administration panel login page. |
| 4 | The user proceeds to the END USERS comment page. |

Referring to FIG. 23B, beginning at 402, the following steps are performed.

TABLE 2

| Step | Action |
|---|---|
| 1 | Browser will display a security check page asking USERNAME and PASSWORD. |
| 2 | User MUST enter USERNAME and PASSWORD; |
| 3 | If USERNAME and PASSWORD are OK, then follow the "Y" path, otherwise, follow the "N" path; |
| 4 | With an authenticated user, the system will load the "Website Administration Panel" homepage and will show all available menu option for this section; |
| 5 | The website will wait until the user choose one of the options on main menu; |
| 6 | If user chose PERSONAL MENU, a sub-menu with another options will appear and wait until one of its options are chosen; Its options are: (7) Edit Profile, (8) Change Password and (9) Log out; |
| 7 | If user chose PERSONAL MENU.fwdarw.EDIT PROFILE, it will follow "Y" path to diagram [2B], otherwise it will wait until the user's choice. |
| 8 | If user chose PERSONAL MENU.fwdarw.EDIT PROFILE, it will follow "Y" path to diagram [2C], otherwise it will wait until the user's choice. |
| 9 | If user chose PERSONAL MENU.fwdarw.EDIT PROFILE, it will follow "Y" path to diagram [2D], otherwise it will wait until the user's choice. |
| 10 | If user chose CREATE & MANAGE MENU, a sub-menu with another options will appear and wait until one of its options are chosen; Its options are: (11) Categories, (12) Sub-Categories and (13) Page Content; |
| 11 | If user chose CREATE & MANAGE MENU.fwdarw.CATEGORIES, it will follow "Y" path to diagram [2E], otherwise it will wait until the user's choice. |
| 12 | If user chose CREATE & MANAGE MENU.fwdarw.SUB-CATEGORIES, it will follow "Y" path to diagram [2F], otherwise it will wait until the user's choice. |
| 13 | If user chose CREATE & MANAGE MENU.fwdarw.PAGE CONTENT, it will follow "Y" path to diagram [2G], otherwise it will wait until the user's choice. |
| 14 | If user chose administrator SETTINGS MENU, a sub-menu with another options will appear and wait until one of its options are chosen; Its options are: (15) Manage Icon and (16) HEADER/FOOTER; |
| 15 | If user chose administrator SETTINGS MENU.fwdarw.MANAGE ICON, it will follow "Y" path to diagram [2H], otherwise it will wait until the user's choice. |
| 16 | If user chose administrator SETTINGS MENU.fwdarw.HEADER/FOOTER, it will follow "Y" path to diagram [2I], otherwise it will wait until the user's choice. |

Referring to FIG. 23C, beginning at 404, the following steps are performed:

TABLE 3

| Step | Action |
|---|---|
| 1 | Browser will display EDIT PROFILE title. |
| 2 | Website will load EDIT PROFILE section; |
| 3 | Website will display EDIT PROFILE page with its forms; |
| 4 | User MUST enter FIRST NAME, LAST NAME and EMAIL ADDRESS; |
| 5 | If user clicked on CANCEL during the process, the system will follow the "Y" path to diagram [2A], otherwise it will follow the "N" path; |
| 6 | If user clicked on EDIT YOUR PROFILE, the system will follow the "Y" path, otherwise it will follow the "N" path; |
| 7 | If all submitted data are correct, it will follow the "Y" path, otherwise it will follow the "N" path; |
| 8 | If an error happens, an error message will be showed and user can choose to try again; |
| 9 | If user wants to try again it will follow the "Y" path, otherwise it will follow the "N" path to diagram [2A]; |
| 10 | The system will update USER PROFILE database and goes to diagram [2A]; |

Referring to FIG. 23D, beginning at 406, the following steps are performed.

TABLE 4

| Step | Action |
|---|---|
| 1 | Browser will display CHANGE PASSWORD title. |
| 2 | Website will load CHANGE PASSWORD section; |
| 3 | Website will display CHANGE PASSWORD page with its forms; |
| 4 | User MUST enter OLD PASSWORD, NEW PASSWORD and CONFIRM NEW PASSWORD; |
| 5 | If user clicked on CANCEL during the process, the system will follow the "Y" path to diagram [2A], otherwise it will follow the "N" path; |
| 6 | If user clicked on CHANGE PASSWORD, the system will follow the "Y" path, otherwise it will follow the "N" path; |
| 7 | If all submitted data are correct, it will follow the "Y" path, otherwise it will follow the "N" path; |
| 8 | If an error happens, an error message will be showed and user can choose to try again; |
| 9 | If user wants to try again it will follow the "Y" path, otherwise it will follow the "N" path to diagram [2A]; |
| 10 | The system will update PASSWORD database and goes to diagram [2A]; |

Referring to FIG. 23E, beginning at 408, the following steps are performed.

TABLE 5

| Step | Action |
|---|---|
| 1 | Browser will display LOG OUT title. |
| 2 | Website will clear all log in information and goes to diagram [2]; |

Referring to FIG. 23F, beginning at 410, the following steps are performed.

TABLE 6

| Step | Action |
|---|---|
| 1 | Browser will display CATEGORIES title. |
| 2 | Website will load CATEGORIES section and check if there are any categories into database system; |
| 3 | If any category was previously added, these categories will be listed and a special menu for it will be loaded and ADD NEW CATEGORY will be in the options too. The options for its menu are: (9) Add New Category, (6) Edit Category, (7) Delete Category, (8) Change Existing Categories List Order; |
| 4 | If user chose PERSONAL MENU, a sub-menu with another options will appear and wait until one of its options are chosen; its options are: (7) Edit Profile, (8) Change Password and (9) Log out; |
| 5 | If user clicked on CANCEL during the process, the system will follow the "Y" path to diagram [2E1], otherwise it will follow the "N" path; |
| 6 | If user chose CATEGORIES→EDIT CATEGORY, it will follow "Y" path to diagram [2E3], otherwise it will wait until the user's choice. |
| 7 | If user chose CATEGORIES→DELETE CATEGORY, it will follow "Y" path to diagram [2E4], otherwise it will wait until the user's choice. |

TABLE 6-continued

| Step | Action |
|---|---|
| 8 | If user chose CATEGORIES→CHANGE LIST ORDER, it will follow "Y" path to diagram [2E5], otherwise it will wait until the user's choice. |

Referring to FIG. 23G, beginning at 412, the following steps are performed.

TABLE 7

| Step | Action |
|---|---|
| 1 | Browser will display CATEGORIES-EDIT CATEGORY title. |
| 2 | Website will load EDIT CATEGORY section and check if there are any sub-categories for selected category; |
| 3 | Website will display EDIT CATEGORY page with its forms; |
| 4 | User MUST enter CATEGORY NAME, NEXT LEVEL SELECTION and ORDER TYPE; |
| 5 | If user clicked on CANCEL during the process, the system will follow the "Y" path to diagram [2E1], otherwise it will follow the "N" path; |
| 6 | If user clicked on SAVE CHANGES, the system will follow the "Y" path, otherwise it will follow the "N" path; |
| 7 | If all submitted data are correct, it will follow the "Y" path, otherwise it will follow the "N" path; |
| 8 | If an error happens, an error message will be showed and user can choose to try again; |
| 9 | If user wants to try again it will follow the "Y" path, otherwise it will follow the "N" path to diagram [2E1]; |
| 10 | The system will update CATEGORY database and goes to diagram [2E1]; |

Referring to FIG. 23H, beginning at 414, the following steps are performed.

TABLE 8

| Step | Action |
|---|---|
| 1 | Browser will display CATEGORIES-DELETE CATEGORY title. |
| 2 | Website will ask user to CONFIRM CATEGORY TO DELETE; If user clicked on NO during the process, the system will follow the "N" path to diagram [2E2], otherwise it will follow the "Y" path; |
| 3 | The system will delete selected CATEGORY, update category database and goes to diagram [2E1]; |

Referring to FIG. 23I, beginning at 416, the following steps are performed.

TABLE 9

| Step | Action |
|---|---|
| 1 | Browser will display CATEGORIES-CHANGE ORDER title. |
| 2 | If user chose SEQUENTIAL ORDER, it will follow the "Y" path, otherwise it will follow "N" path; |
| 3 | Website will load all available categories ordering by "SEQUENTIAL" option; |
| 4 | The system display CATEGORIES SECTION using the chosen order and goes to diagram [2E2]; |

TABLE 9-continued

| Step | Action |
|---|---|
| 5 | If user chosen NON-SEQUENTIAL ORDER, it will follow the "Y" path, otherwise it will follow "N" path; |
| 6 | Website will load all available categories ordering by "NON-SEQUENTIAL" option; |

Referring to FIG. 23J, beginning at 418, the following steps are performed.

TABLE 10

| Step | Action |
|---|---|
| 1 | Browser will display ADD NEW CATEGORY title. |
| 2 | Website will load ADD NEW CATEGORY section; |
| 3 | Website will display ADD NEW CATEGORY page with its forms; |
| 4 | User MUST enter CATEGORY NAME, NEXT LEVEL SELECTION and ORDER TYPE; |
| 5 | If user clicked on CANCEL during the process, the system will follow the "Y" path to diagram [2E1], otherwise it will follow the "N" path; |
| 6 | If user clicked on ADD NEW CHANGE PASSWORD, the system will follow the "Y" path, |

Figure 23P:
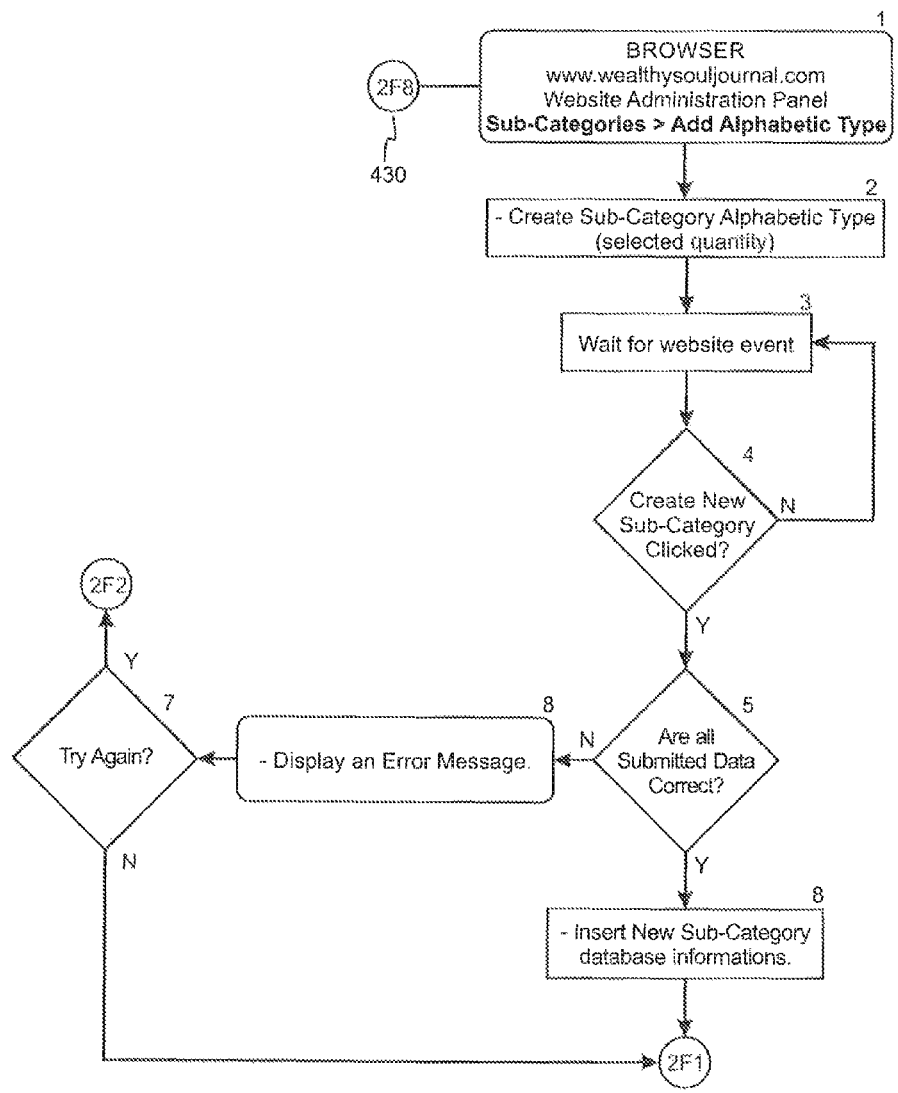
Figure 23Q:
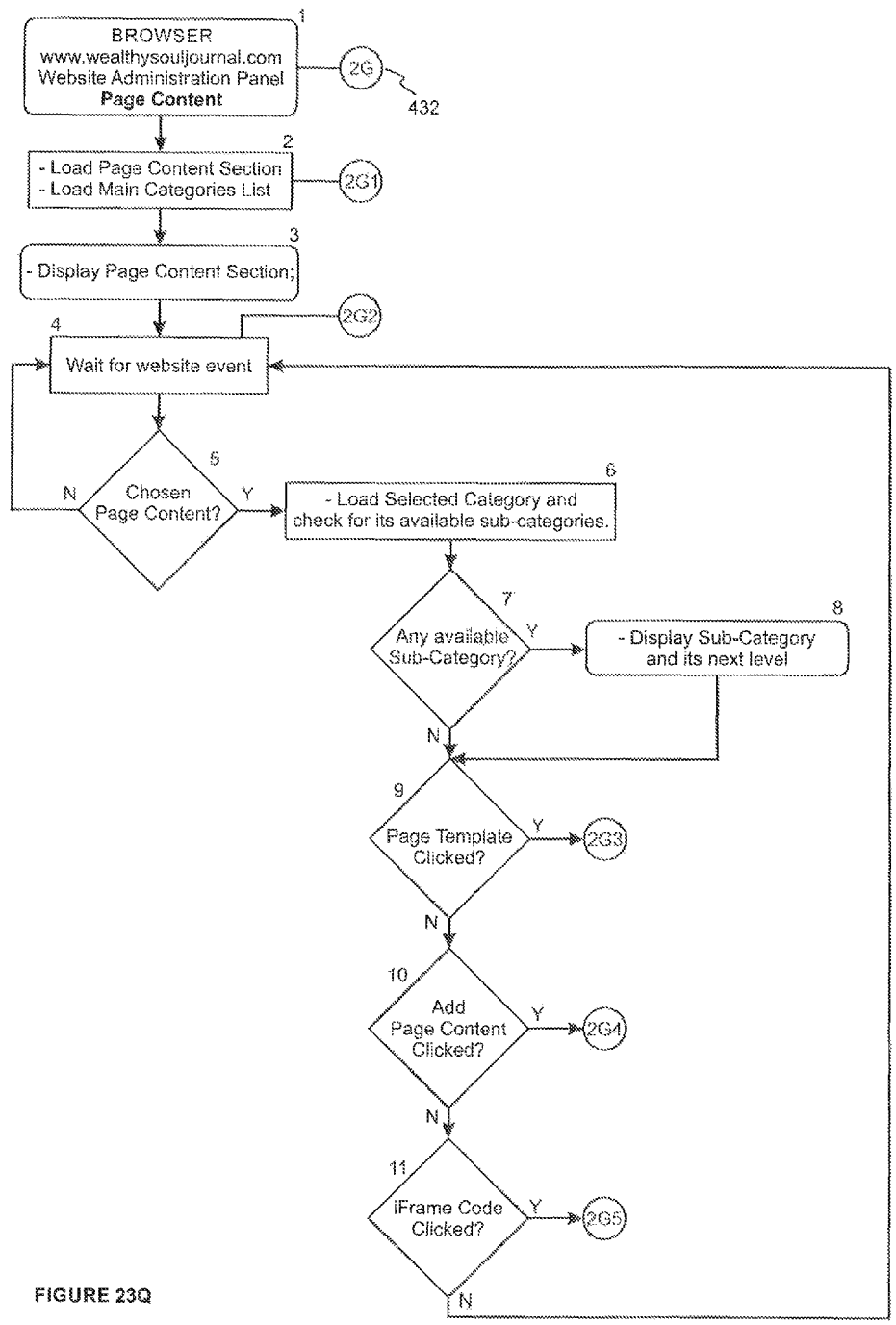
Figure 23S:
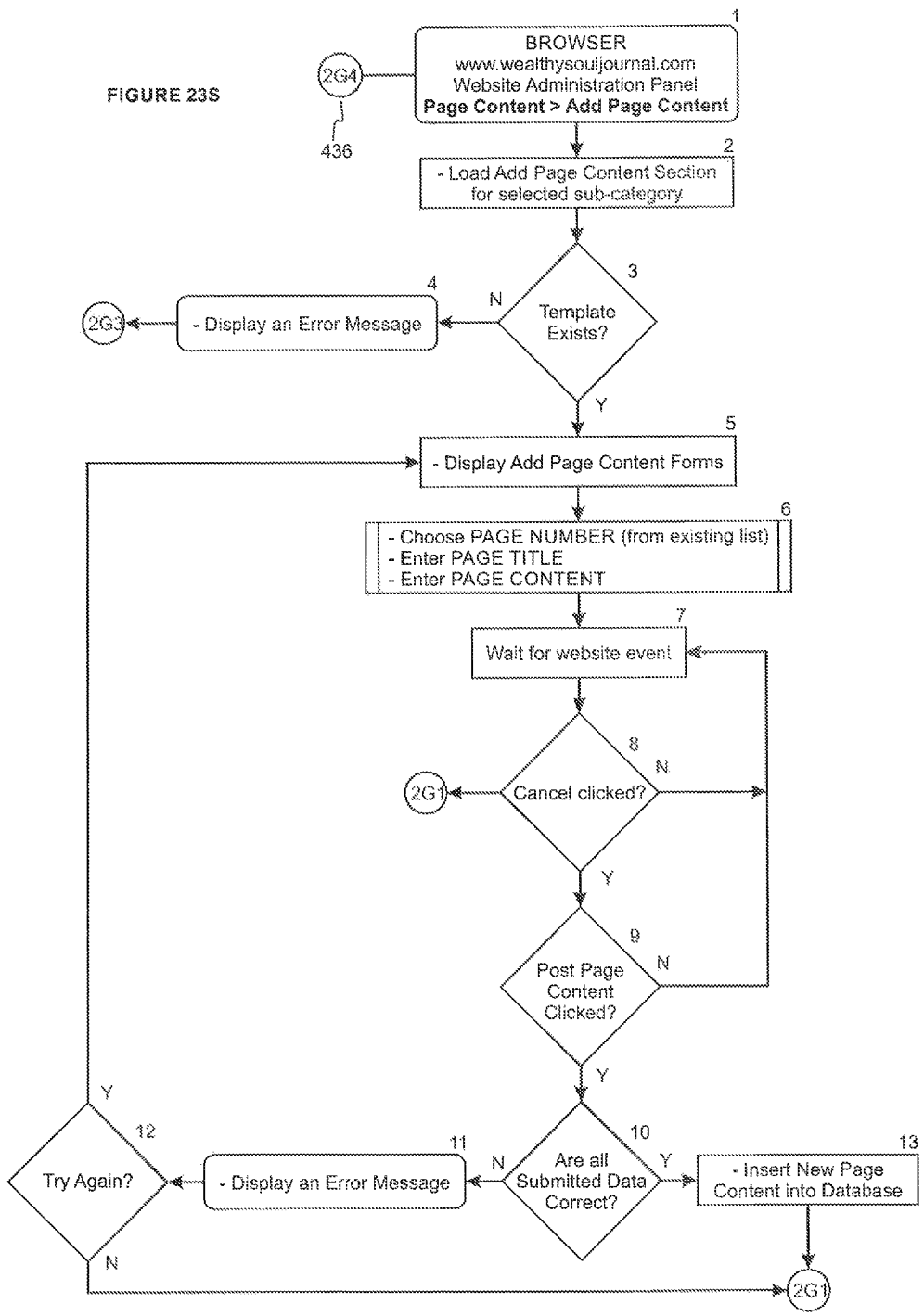
Figure 23T:
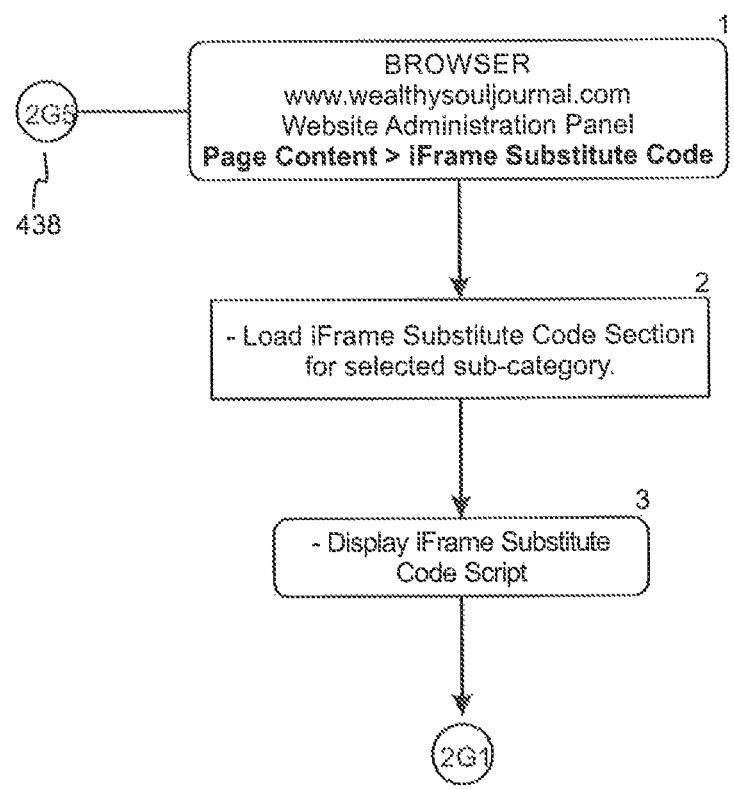
Figure 23U:
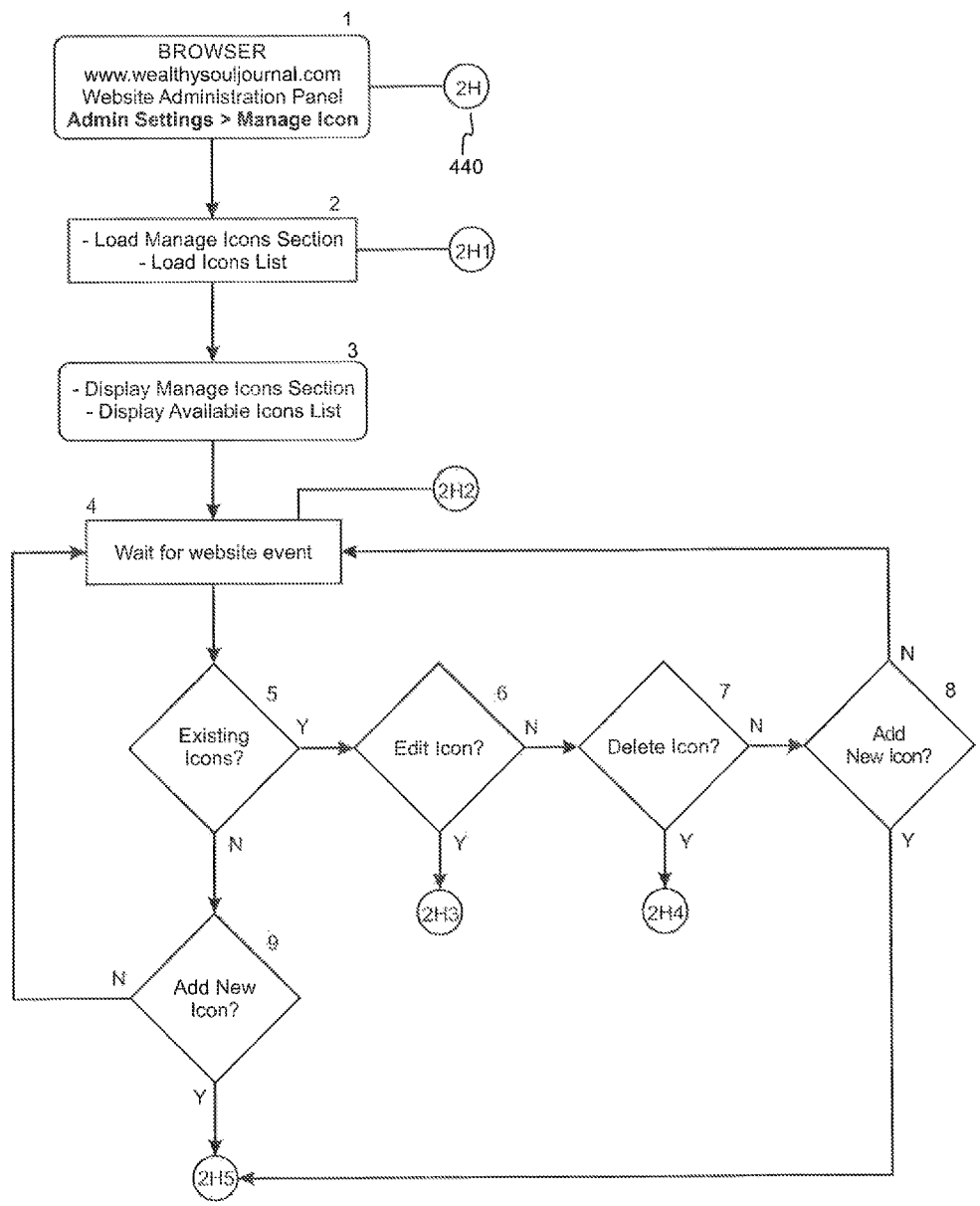
Figure 23W:
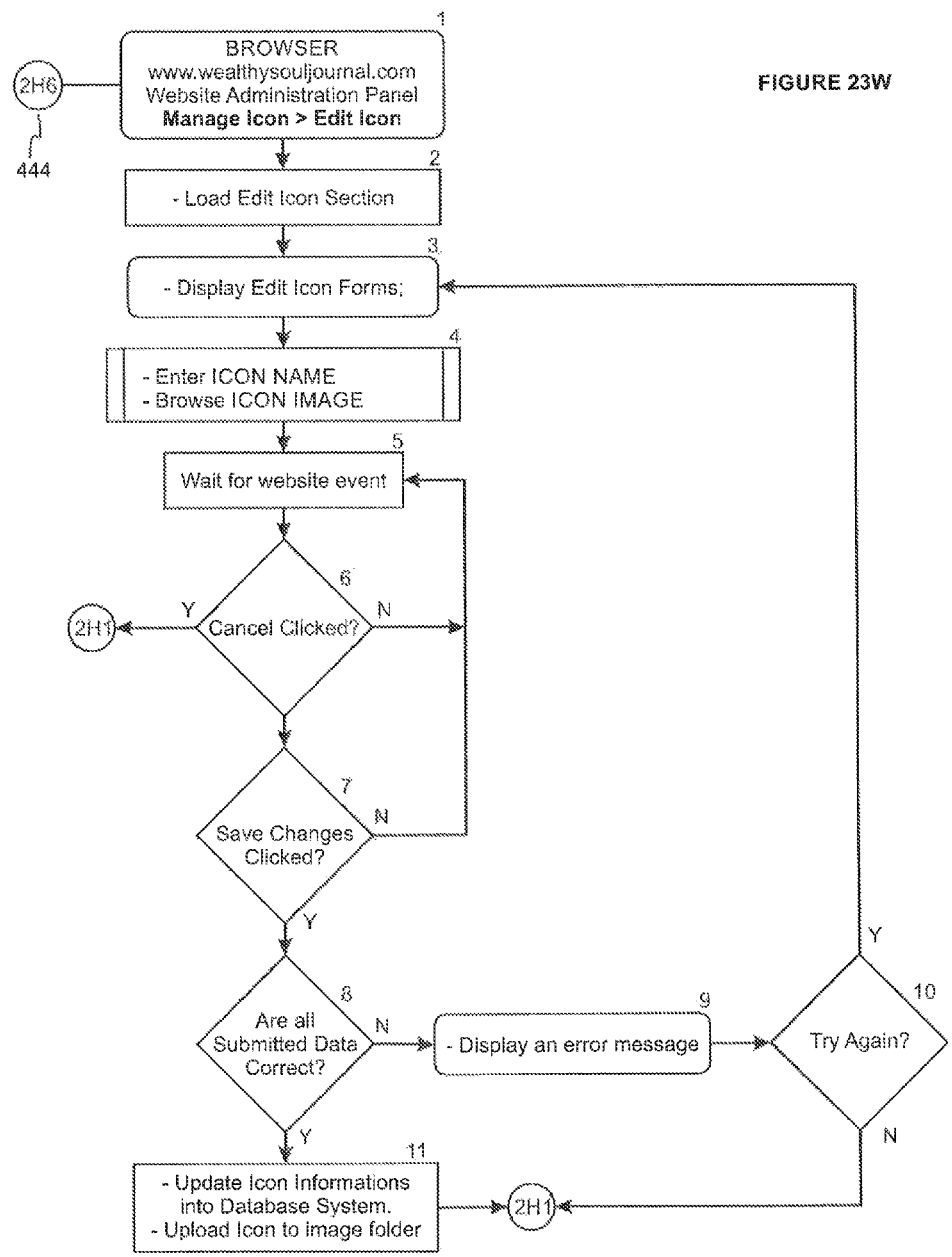
Figure 23X:
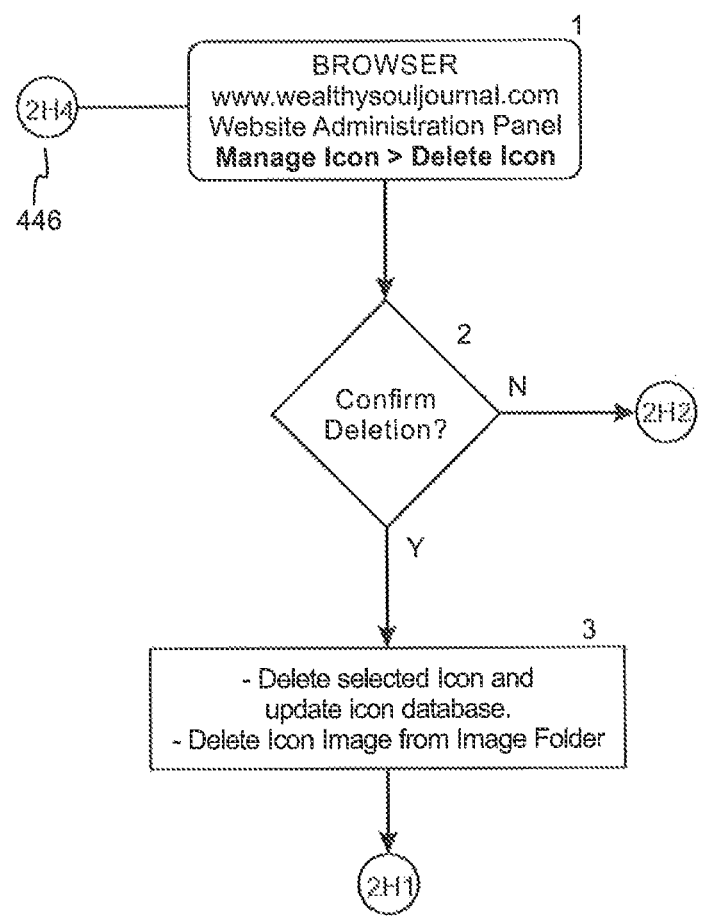
Figure 23Y:
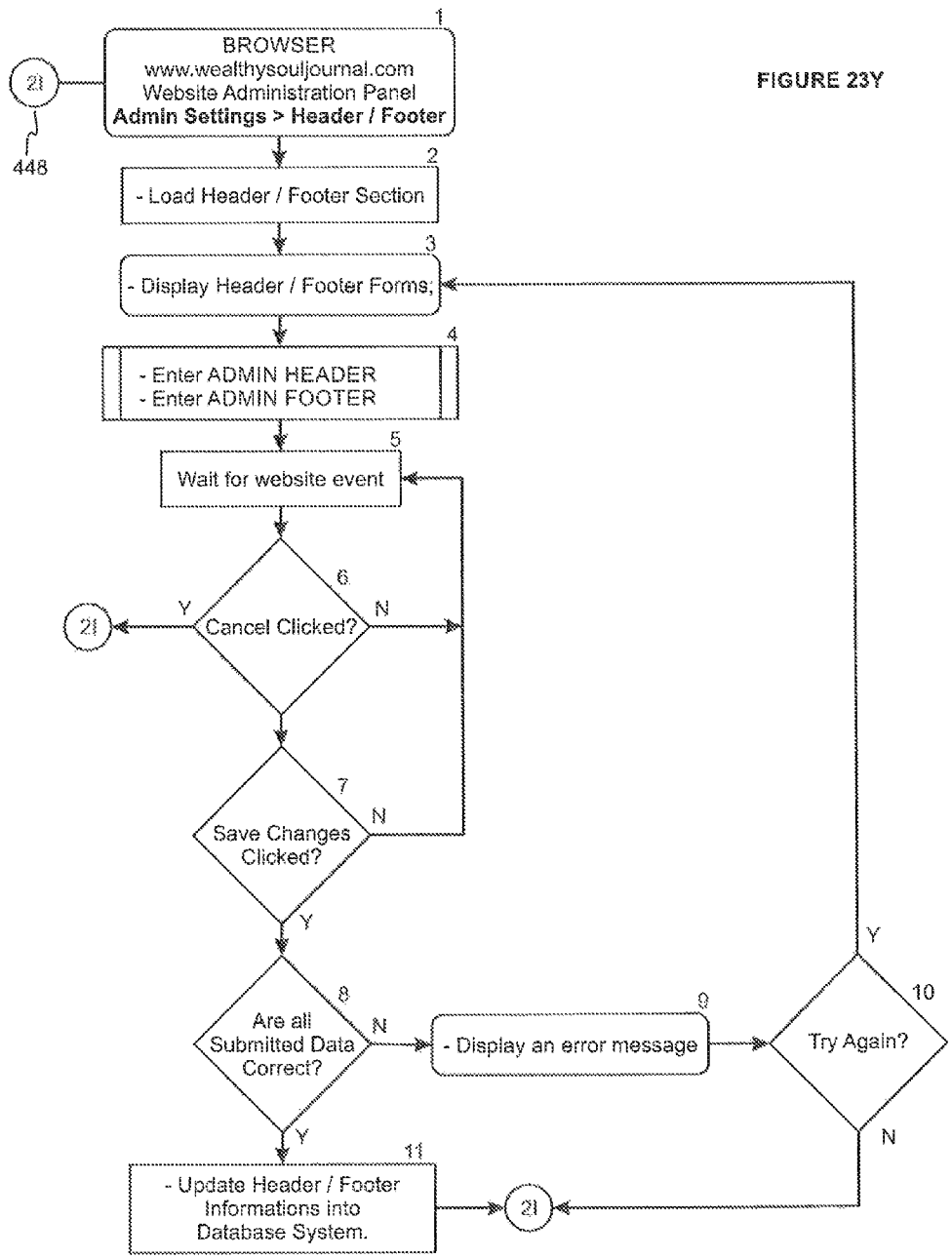
Figure 23Z:
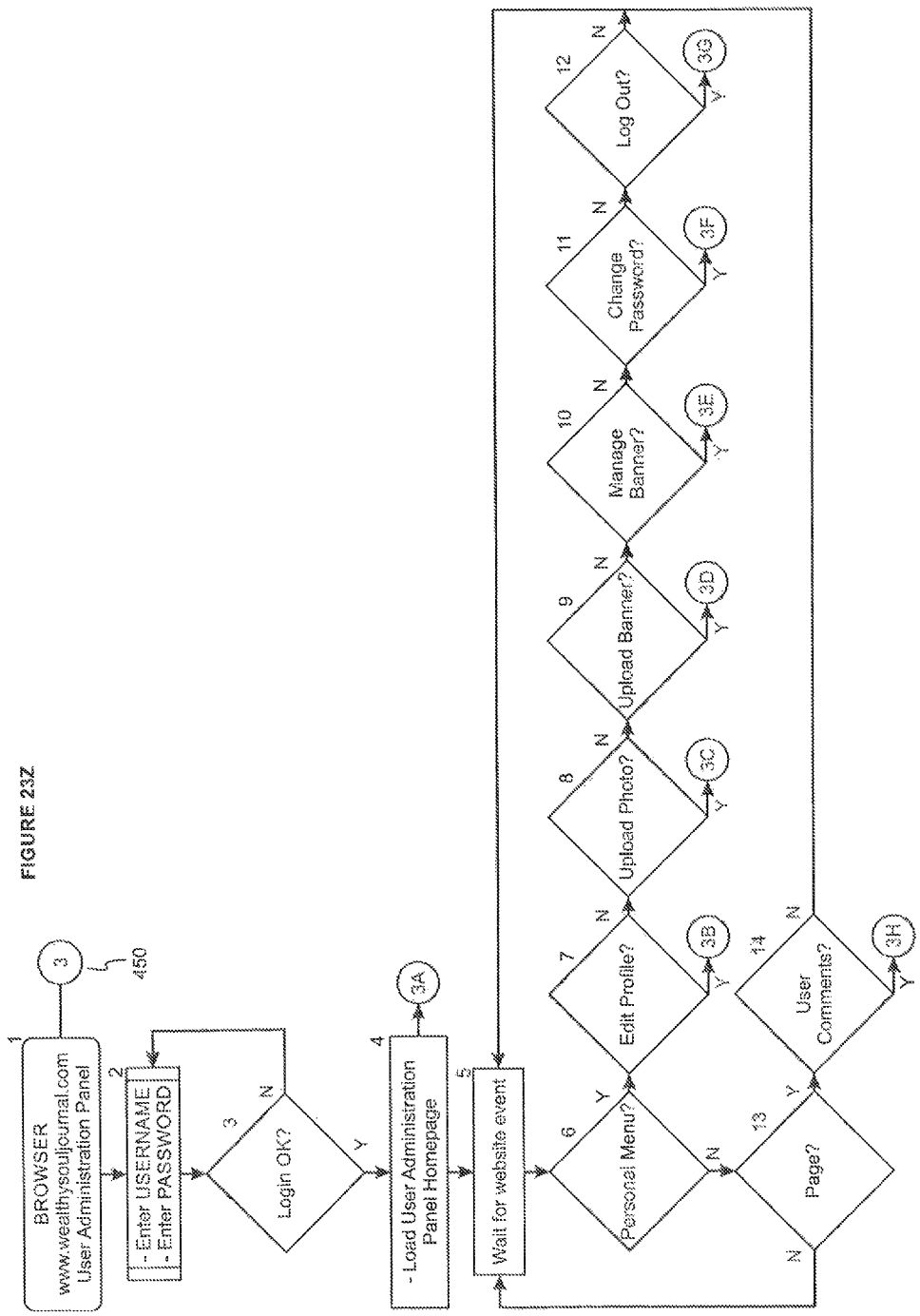
Figure 23A:
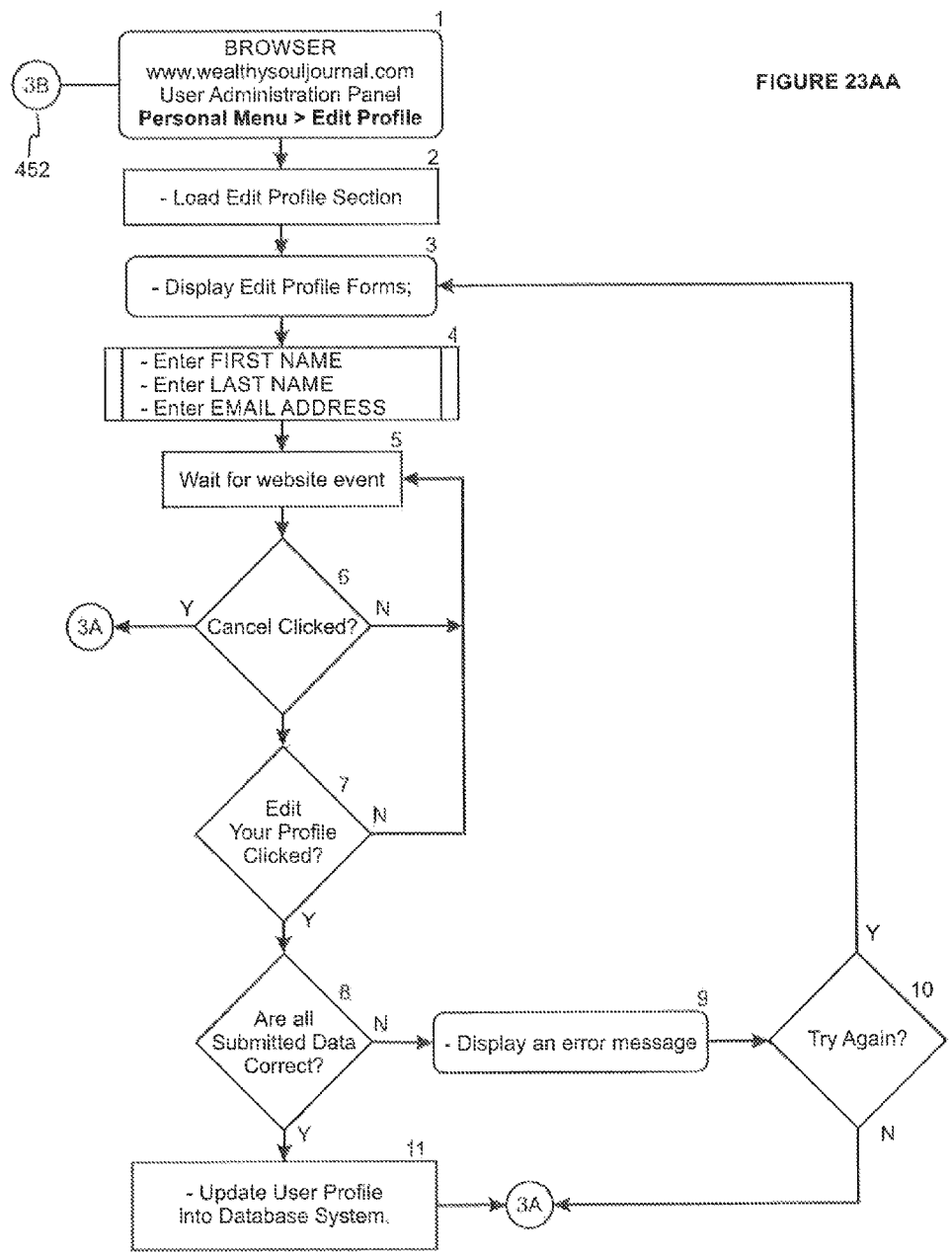
Figure 23B:
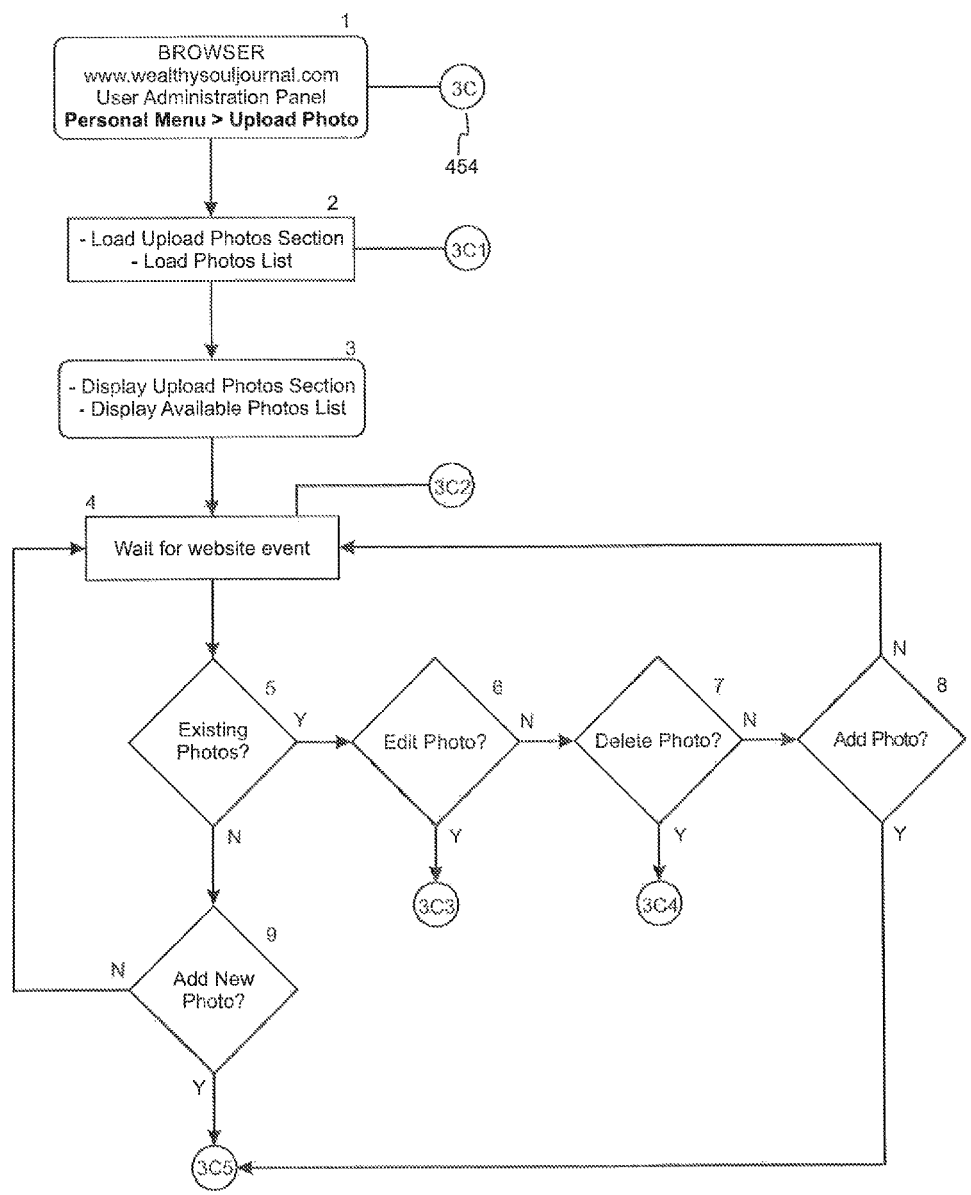
Figure 23C:
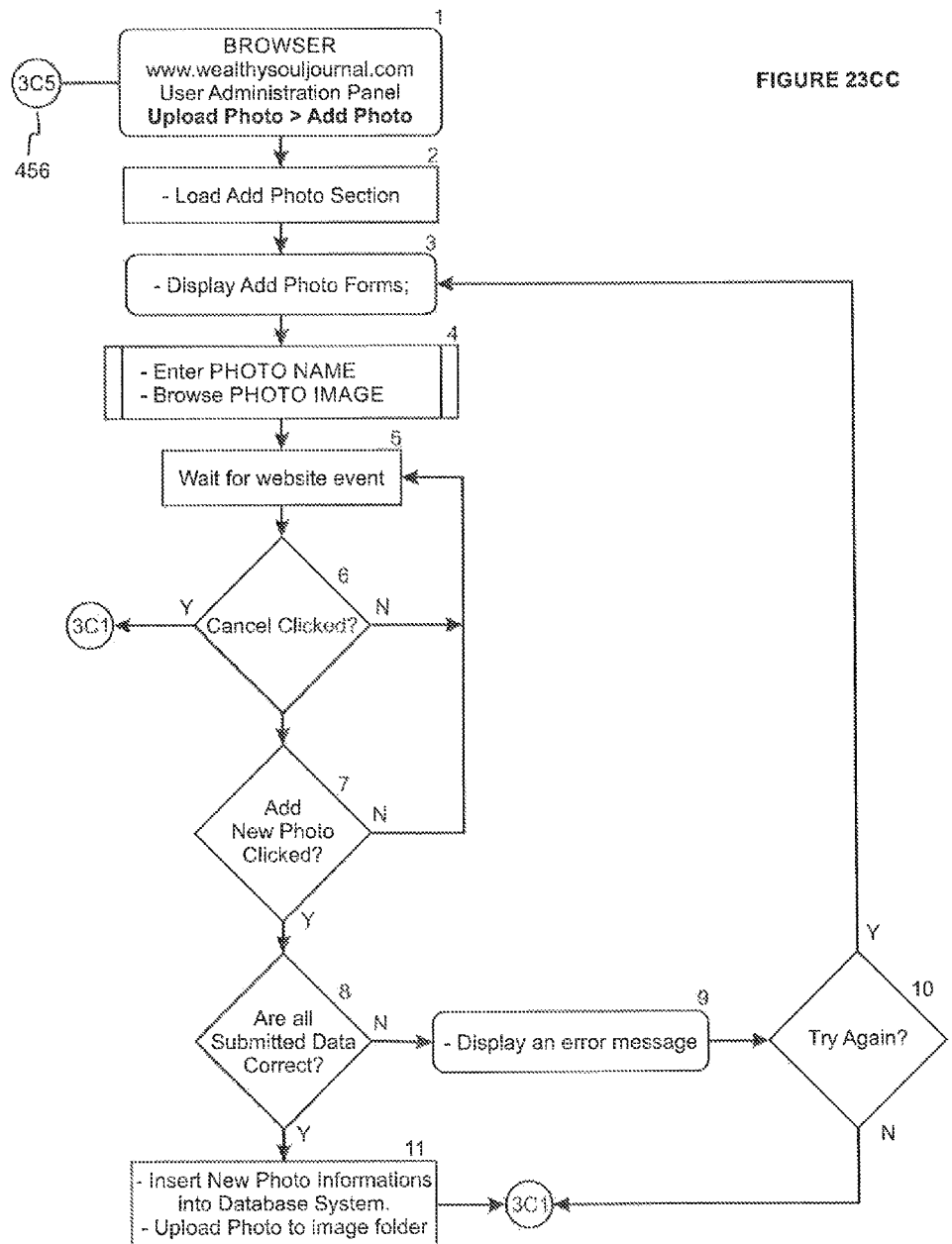
Figure 23D:
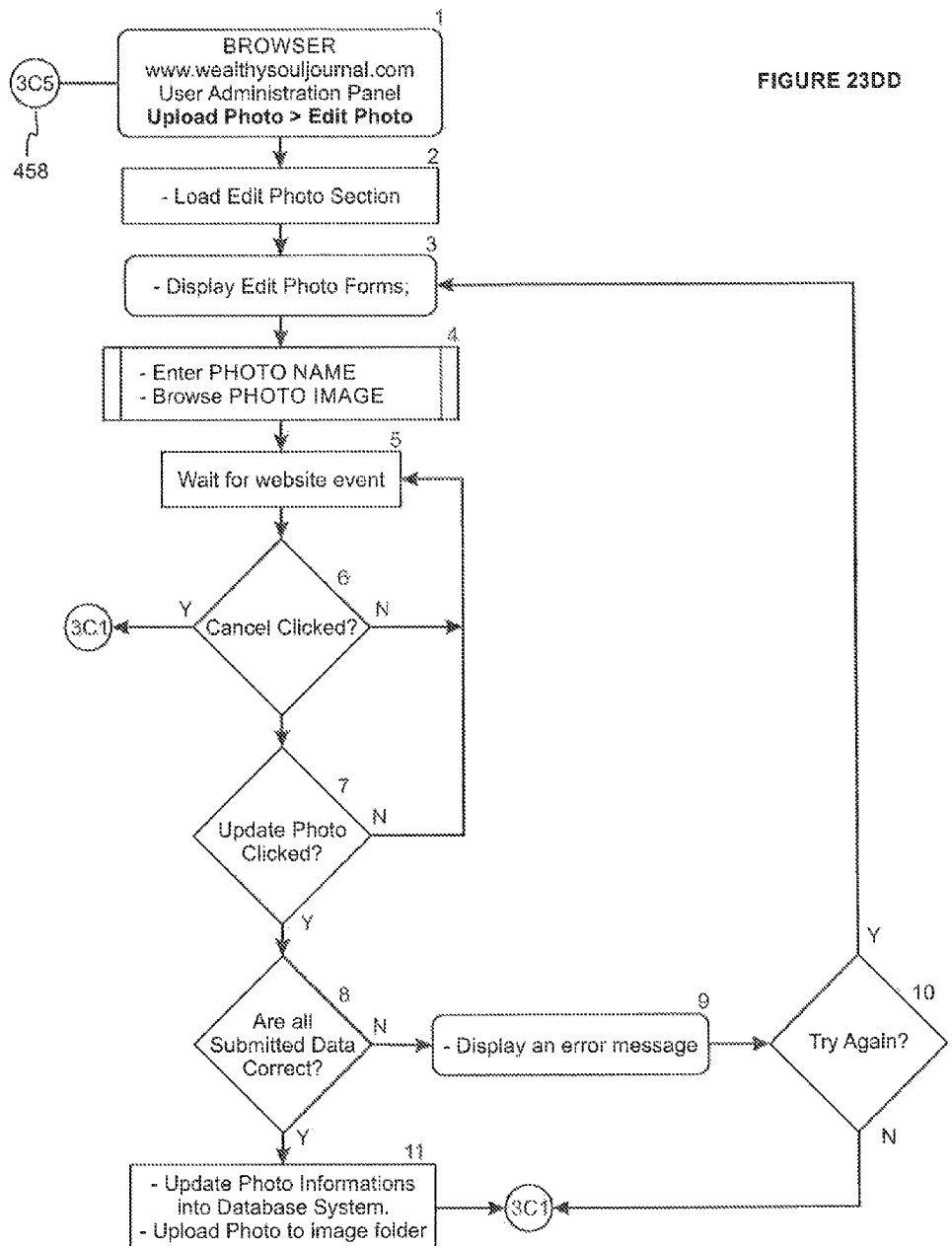
Figure 23E:
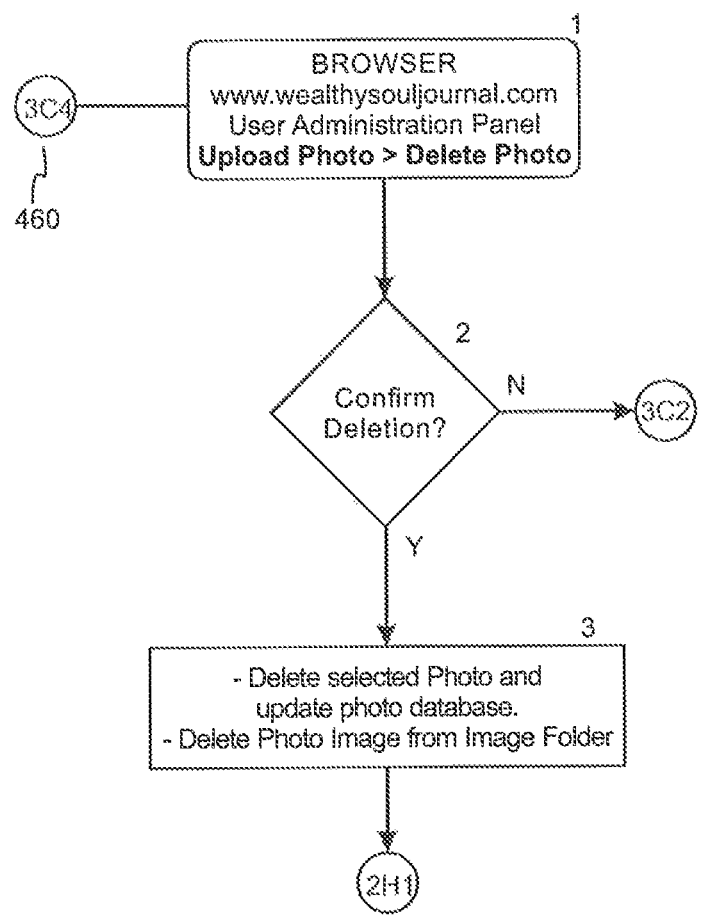
Figure 23F:
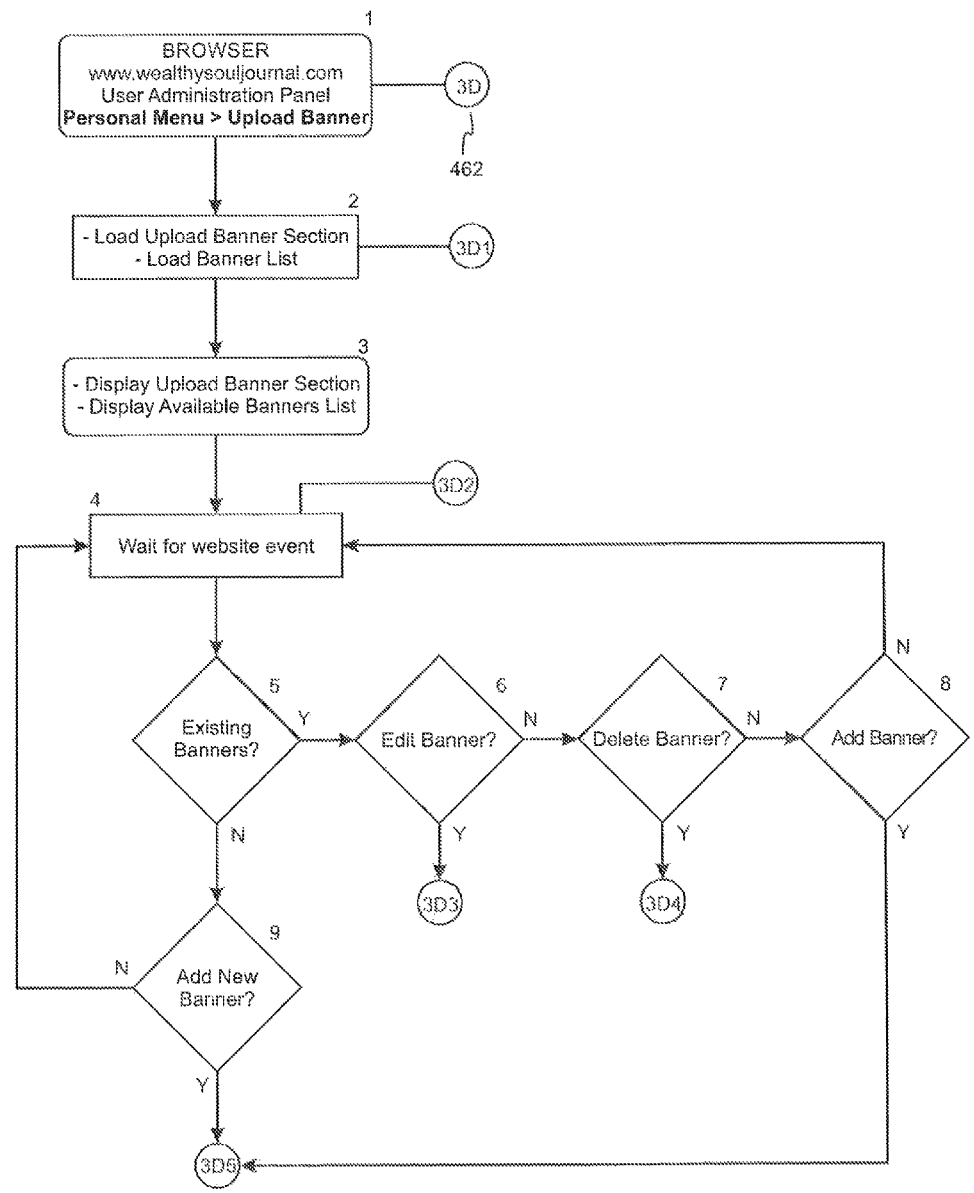
Figure 23H:
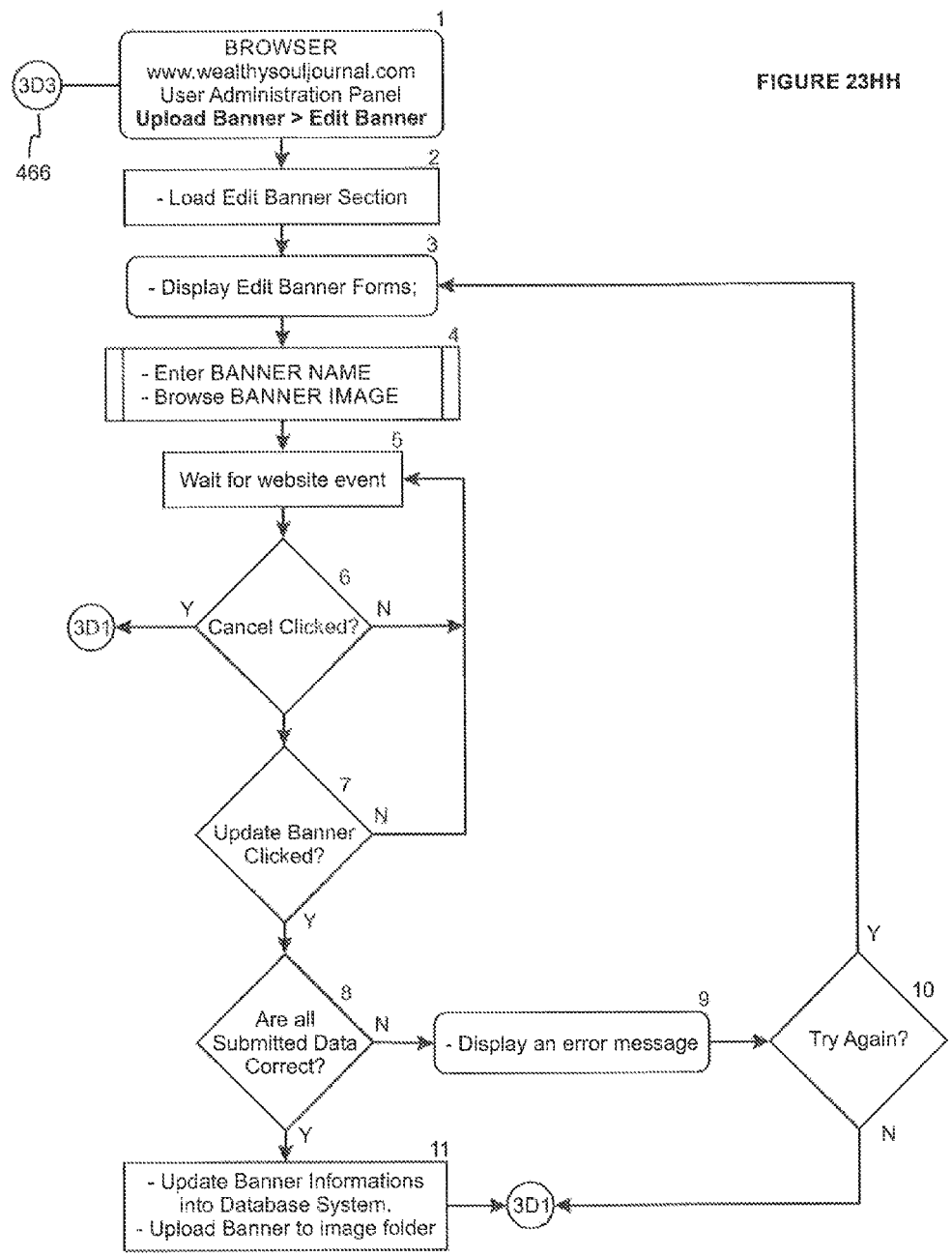
Figure 23I:
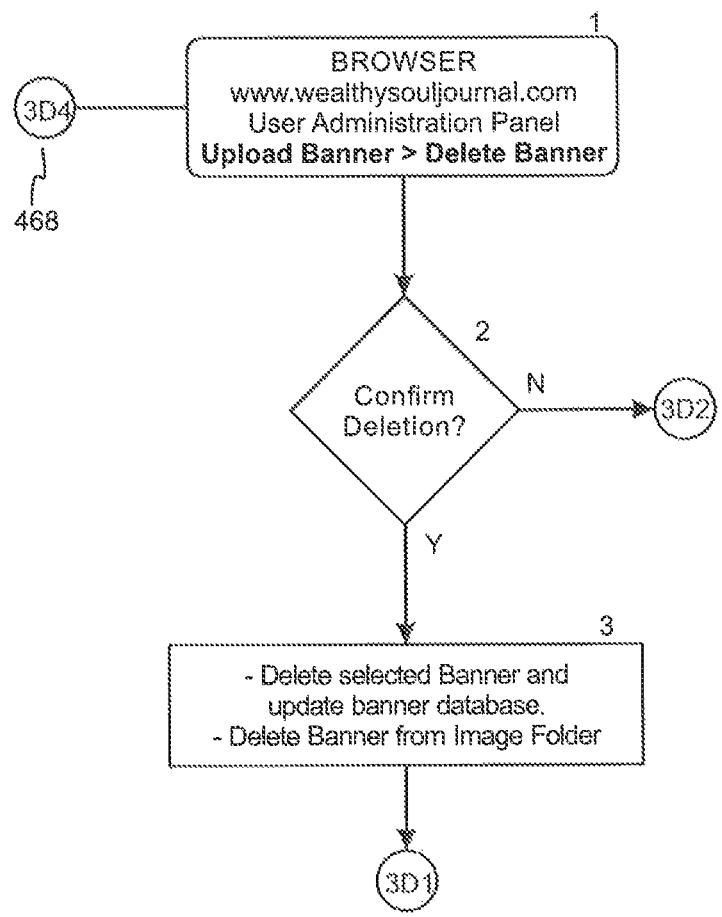
Figure 23J:
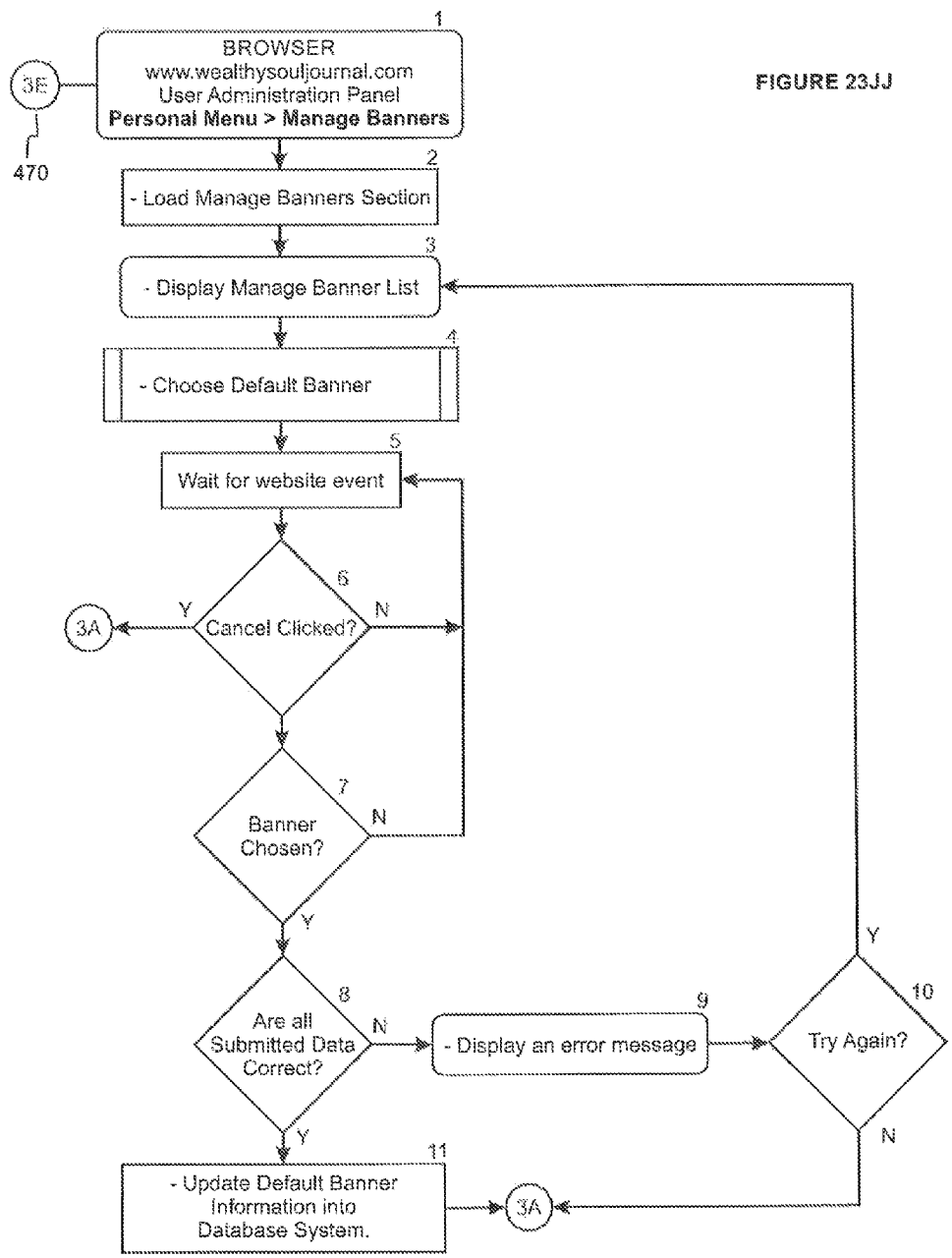
Figure 23K:
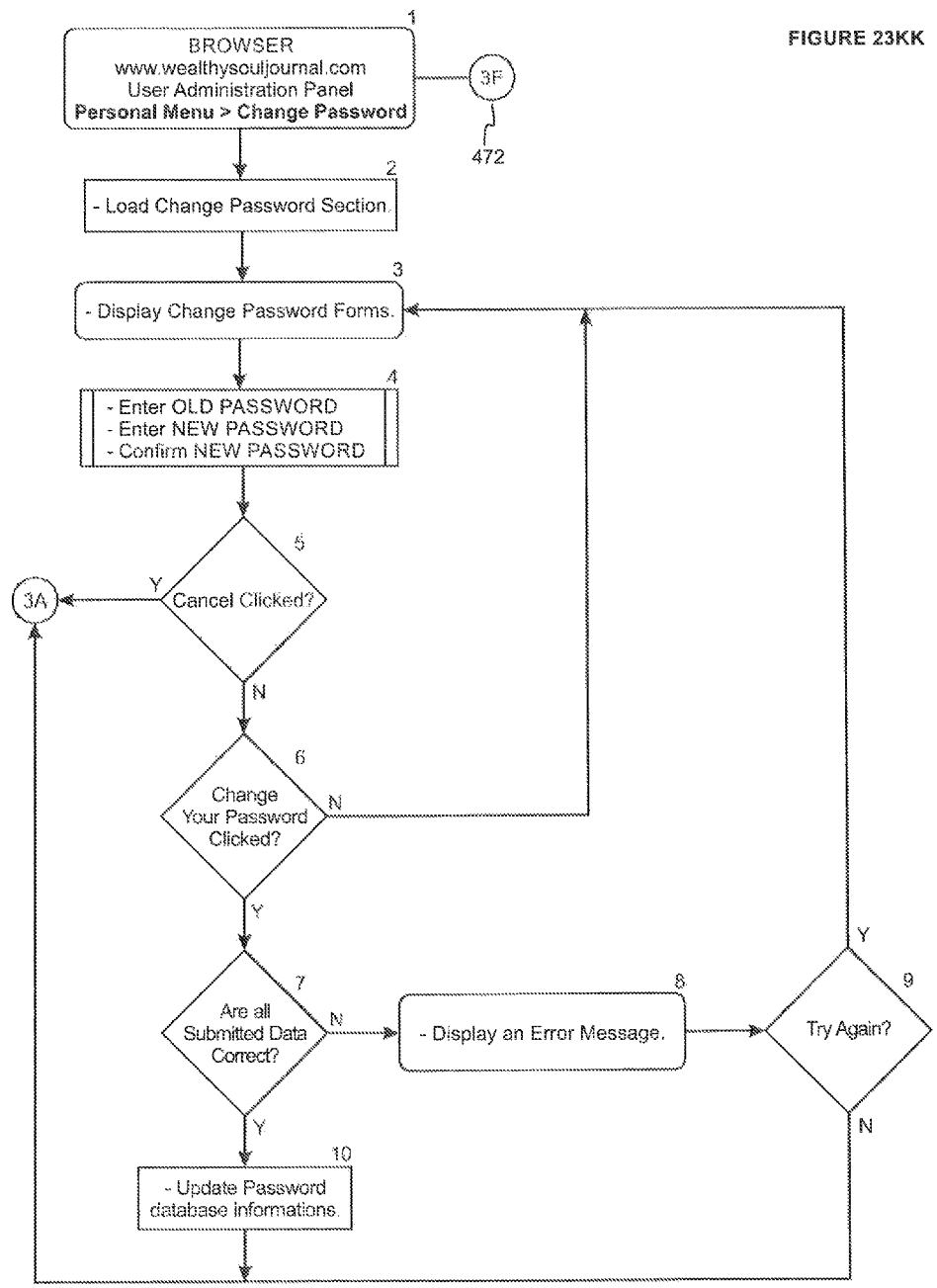
Figure 23L:
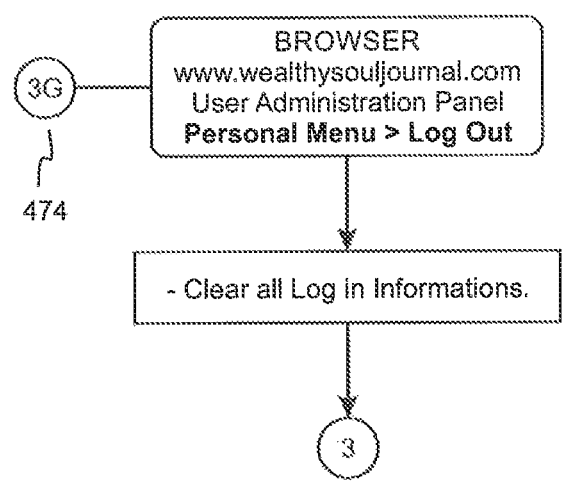
Figure 23M:
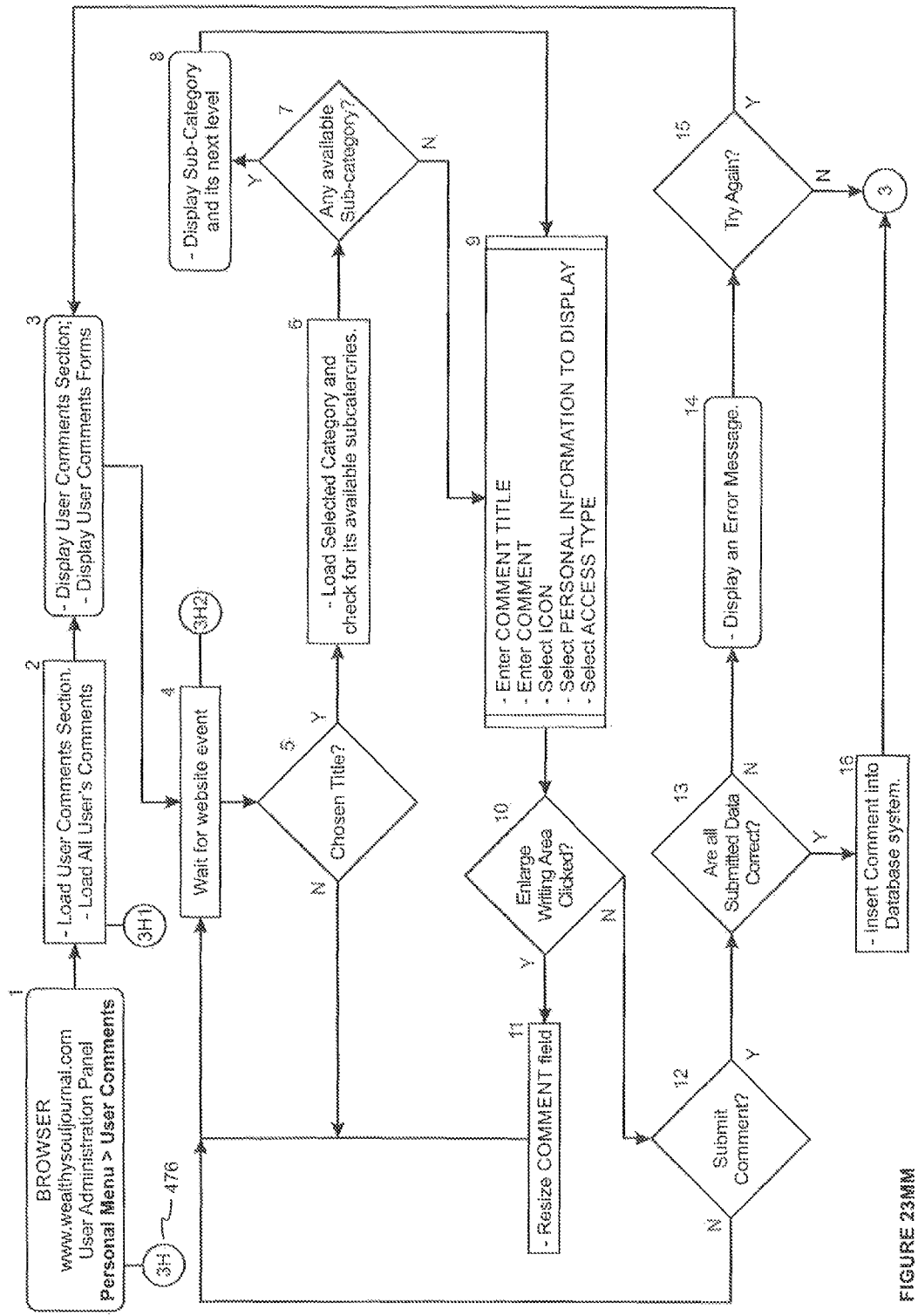
Figure 23N:
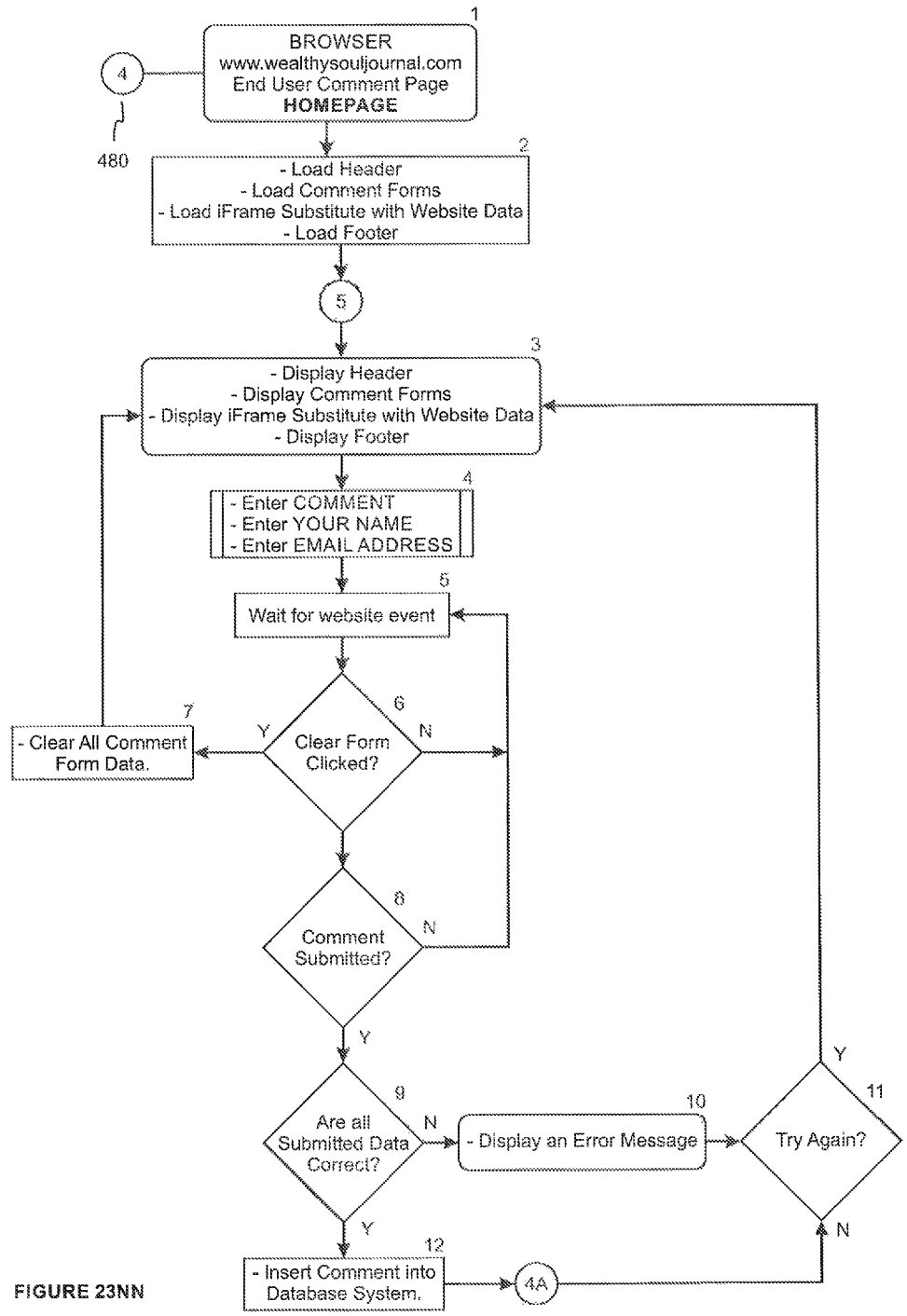

Referring to FIG. 23K, beginning at 420, the following steps are performed.

TABLE 11

| Step | Action |
|---|---|
| 1 | Browser will display SUB-CATEGORIES title. |
| 2 | Website will load SUB-CATEGORIES section; |
| 3 | Website will display SUB-CATEGORIES page with its forms; |
| 4 | Website will wait until one of the available options is chosen; |
| 5 | If SUB-CATEGORIES chosen, it will follow the "Y" path and a sub-menu will appear for its sub-categories, otherwise it will follow the "N" path; |

TABLE 11-continued

| Step | Action |
|---|---|
| 6 | If user chose SUB-CATEGORIES→EDIT SUB-CATEGORY, it will follow "Y" path to diagram [2F3], otherwise it will wait until the user's choice. |
| 7 | If user chose SUB-CATEGORIES→DELETE SUB-CATEGORY, it will follow "Y" path to diagram [2F4], otherwise it will wait until the user's choice. |
| 8 | If a category is chosen and the user clicks on SUB-CATEGORIES→CREATE SUB-CATEGORY, a list of options for SUB-CATEGORY creation type will appear; |
| 9 | The system will wait until one of the available types of sub-categories is chosen. The options are: (10) Text, (13) Numeric and (16) Alphabetic; |
| 10 | If TEXT is chosen, it will follow "Y" path, otherwise it will follow "N" path; |
| 11 | User MUST enter the number (quantity) of NEW TEXT SUB-CATEGORIES that will be created; |
| 12 | If creation is confirmed, it will follow "Y" path to diagram [2F6], otherwise it will be canceled and will follow the "N" path; |
| 13 | If NUMERIC is chosen, it will follow "Y" path, otherwise it will follow "N" path; |
| 14 | User MUST enter the STARTING NUMBER and END NUMBER of NEW NUMERIC SUB-CATEGORIES that will be created. These numbers MUST be bigger than 0 and smaller than 1001; |
| 15 | If creation is confirmed, it will follow "Y" path to diagram [2F7], otherwise it will be canceled and will follow the "N" path; |
| 16 | If ALPHABETIC is chosen, it will follow "Y" path, otherwise it will follow "N" path; |
| 17 | User MUST enter the STARTING LETTER and END LETTER of NEW ALPHABETIC SUB-CATEGORIES that will be created; |
| 18 | If creation is confirmed, it will follow "Y" path to diagram [2F8], otherwise it will be canceled and will follow the "N" path; |

Referring to FIG. 23L, beginning at 422, the following steps are performed.

TABLE 12

| Step | Action |
|---|---|
| 1 | Browser will display SUB-CATEGORIES - EDIT title. |
| 2 | Website will load SUB-CATEGORIES - EDIT section; |
| 3 | Website will display SUB-CATEGORIES - EDIT page with its forms; |
| 4 | User MUST enter CATEGORY NAME, NEXT LEVEL SELECTION and ORDER TYPE; |
| 5 | Website will wait until one of the available options is chosen; |
| 6 | If UPDATE clicked, the system will follow the "Y" path, otherwise it will follow the "N" path; |
| 7 | If user clicked on CANCEL during the process, the system will follow the "Y" path to diagram [2F1], otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [2F1]; |
| 11 | The system will UPDATE THE SUB-CATEGORY into database and goes to diagram [2F1]; |

Referring to FIG. 23M, beginning at 424, the following steps are performed.

TABLE 13

| Step | Action |
|---|---|
| 1 | Browser will display SUB-CATEGORIES - DELETE title. |
| 2 | Website will ask user to CONFIRM SUB-CATEGORY TO DELETE; If user clicked on NO during the process, the system will follow the "N" path to diagram [2F2], otherwise it will follow the "Y" path; |
| 3 | The system will delete selected SUB-CATEGORY, update sub-category database and goes to diagram [2F1]; |

Referring to FIG. 23N, beginning at 426, the following steps are performed.

TABLE 14

| Step | Action |
|---|---|
| 1 | Browser will display SUB-CATEGORIES - ADD TEXT TYPE title. |
| 2 | Website will create SUB-CATEGORIES TEXT TYPE (selected category); |
| 3 | Website will display SUB-CATEGORIES TEXT TYPE forms (selected category); |
| 4 | User MUST enter SUB-CATEGORY NAME, NEXT LEVEL SELECTION and ORDER TYPE; |
| 5 | Website will wait until one of the available options is chosen; |

TABLE 14-continued

| Step | Action |
|---|---|
| 6 | If CREATE NEW SUB-CATEGORY clicked, the system will follow the "Y" path, otherwise it will follow the "N" path; |
| 7 | If all submitted data are correct, it will follow the "Y" path, otherwise it will follow the "N" path; |
| 8 | If an error happens, an error message will be showed and user can choose to try again; |
| 9 | If user wants to try again it will follow the "Y" path, otherwise it will follow the "N" path to diagram [2F1]; |
| 10 | The system will add the NEW SUB-CATEGORIES into database and goes to diagram [2F1]; |

Referring to FIG. 23O, beginning at 428, the following steps are performed.

TABLE 15

| Step | Action |
|---|---|
| 1 | Browser will display SUB-CATEGORIES - ADD NUMERIC TYPE title. |
| 2 | Website will create SUB-CATEGORIES NUMERIC TYPE (selected category); |
| 3 | Website will wait until one of the available options is chosen; |
| 4 | If CREATE NEW SUB-CATEGORY clicked, the system will follow the "Y" path, otherwise it will follow the "N" path; |
| 5 | If all submitted data are correct, it will follow the "Y" path, otherwise it will follow the "N" path; |
| 6 | If an error happens, an error message will be showed and user can choose to try again; |
| 7 | If user wants to try again it will follow the "Y" path and goes to diagram [2F2], otherwise it will follow the "N" path to diagram [2F1]; |
| 8 | The system will add the NEW SUB-CATEGORIES into database and goes to diagram [2F1]; |

Referring to FIG. 23P, beginning at 430, the following steps are performed.

TABLE 16

| Step | Action |
|---|---|
| 1 | Browser will display SUB-CATEGORIES - ADD ALPHABETIC TYPE title. |
| 2 | Website will create SUB-CATEGORIES ALPHABETIC TYPE (selected category); |
| 3 | Website will wait until one of the available options is chosen; |
| 4 | If CREATE NEW SUB-CATEGORY clicked, the system will follow the "Y" path, otherwise it will follow the "N" path; |
| 5 | If all submitted data are correct, it will follow the "Y" path, otherwise it will follow the "N" path; |
| 6 | If an error happens, an error message will be showed and user can choose to try again; |
| 7 | If user wants to try again it will follow the "Y" path and goes to diagram [2F2], otherwise it will follow the "N" path to diagram [2F1]; |
| 8 | The system will add the NEW SUB-CATEGORIES into database and goes to diagram [2F1]; |

Referring to FIG. 23Q, beginning at 432, the following steps are performed.

TABLE 17

| Step | Action |
|---|---|
| 1 | Browser will display PAGE CONTENT title. |
| 2 | Website will load PAGE CONTENT section and all MAIN CATEGORIES LIST; |
| 3 | Website will display PAGE CONTENT page with its forms; |
| 4 | Website will wait until one of the available options is chosen; |
| 5 | If PAGE CONTENT chosen, it will follow the "Y" path and a sub-menu will appear for its sub-categories, otherwise it will follow the "N" path; |
| 6 | The system will load selected category and will check for its available sub-categories; |
| 7 | If category has any sub-categories available it will follow "Y" path, otherwise it will follow "N" path; |
| 8 | Website will display Category's sub-categories and its next levels; |
| 9 | If PAGE TEMPLATE was clicked, it will follow "Y" path to diagram [2G3], otherwise it will follow "N" path; |
| 10 | If ADD PAGE CONTENT was clicked, it will follow "Y" path to diagram [2G4], otherwise it will follow "N" path; |
| 11 | If IFRAME CODE was clicked, it will follow "Y" path to diagram [2G5], otherwise it will follow "N" path; |

Referring to FIG. 23R, beginning at 434, the following steps are performed.

TABLE 18

| Step | Action |
|---|---|
| 1 | Browser will display PAGE CONTENT - PAGE TEMPLATE title. |
| 2 | Website will load PAGE TEMPLATE section for selected category or sub-category; |
| 3 | Website will display PAGE TEMPLATE page with its forms; |
| 4 | User MUST enter TEMPLATE TITLE, BOOK DESCRIPTION, KEYWORDS, PAGE FROM, PAGE TO, HEADER TEMPLATE, FOOTER TEMPLATE, choose COMMENTS TYPE (Display or Hide), AUTO-RESPONDER SERVICE, EMAIL SUBJECT, EMAIL CONTENT and choose MAKE DEFAULT (Yes or No); |
| 5 | Website will wait until one of the available options is chosen; |
| 6 | If user clicked on CANCEL during the process, the system will follow the "Y" path to diagram [2G1], otherwise it will follow the "N" path; |
| 7 | If CREATE PAGE SETUP clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [2G1]; |
| 11 | The system will ADD A NEW TEMPLATE into database and goes to diagram [2G1]; |

Referring to FIG. 23S, beginning at 436, the following steps are performed.

TABLE 19

| Step | Action |
|---|---|
| 1 | Browser will display PAGE CONTENT - ADD PAGE CONTENT title. |
| 2 | Website will load ADD PAGE CONTENT section for selected category or sub-category; |
| 3 | If no templates are found for its category/sub-category it will follow the "N" path, otherwise it will follow the "Y" path; |
| 4 | System will show an error message and goes to diagram [2G3]; |
| 5 | Website will display ADD PAGE CONTENT page with its forms; |
| 6 | User MUST choose PAGE NUMBER (from existing list), enter PAGE TITLE and enter PAGE CONTENT; |
| 7 | Website will wait until one of the available options is chosen; |
| 8 | If user clicked on CANCEL during the process, the system will follow the "Y" path to diagram [2G1], otherwise it will follow the "N" path; |
| 9 | If POST PAGE CONTENT clicked, the system will follow the "Y" path, otherwise it will follow the "N" path; |
| 10 | If all submitted data are correct, it will follow the "Y" path, otherwise it will follow the "N" path; |
| 11 | If an error happens, an error message will be showed and user can choose to try again; |
| 12 | If user wants to try again it will follow the "Y" path, otherwise it will follow the "N" path to diagram [2G1]; |
| 13 | The system will ADD NEW PAGE CONTENT into database and goes to diagram [2G1]; |

Referring to FIG. 23T, beginning at 438, the following steps are performed.

TABLE 20

| Step | Action |
|---|---|
| 1 | Browser will display PAGE CONTENT - IFRAME SUBSTITUTE CODE title. |
| 2 | Website will load IFRAME SUBSTITUTE CODE section for selected category or sub-category; |
| 3 | Website will display IFRAME SUBSTITUTE CODE SCRIPT to be used into website's HTML body and goes to diagram [2G1]; |

Referring to FIG. 23U, beginning at 440, the following steps are performed.

TABLE 21

| Step | Action |
|---|---|
| 1 | Browser will display administrator SETTINGS - MANAGE ICON title. |
| 2 | Website will load MANAGE ICON section and its available icons; |
| 3 | Website will display MANAGE ICON and its available icons; |
| 4 | Website will wait until one of the available options is chosen; |

TABLE 21-continued

| Step | Action |
|---|---|
| 5 | If there are any previously icons added it will follow the "Y" path and a sub-menu for its icons will appear, otherwise it will follow the "N" path and only ADD NEW ICON must be showed; |
| 6 | If EDIT ICON is chosen it will follow "Y" path to diagram [2H3], otherwise it will await until the user's choice. |
| 7 | If DELETE ICON is chosen it will follow "Y" path to diagram [2H4], otherwise it will await until the user's choice. |
| 8 | If ADD ICON is chosen it will follow "Y" path to diagram [2H5], otherwise it will await until the user's choice. |
| 9 | If ADD ICON is chosen it will follow "Y" path to diagram [2H5], otherwise it will await until the user's choice. |

Referring to FIG. 23V, beginning at 442, the following steps are performed.

TABLE 22

| Step | Action |
|---|---|
| 1 | Browser will display MANAGE ICON - ADD ICON title. |
| 2 | Website will load ADD ICON section; |
| 3 | Website will display ADD ICON page with its forms; |
| 4 | User MUST enter ICON NAME and choose an ICON IMAGE to upload; |
| 5 | Website will wait until one of the available options is chosen; |
| 6 | If user clicked on CANCEL during the process, the system will follow the "Y" path to diagram [2H1], otherwise it will follow the "N" path; |
| 7 | If ADD NEW ICON clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [2H1]; |
| 11 | The system will ADD NEW ICON information and UPLOAD AN ICON IMAGE to image folder and goes to diagram [2H1]; |

Referring to FIG. 23W, beginning at 444, the following steps are performed.

TABLE 23

| Step | Action |
|---|---|
| 1 | Browser will display MANAGE ICON - EDIT ICON title. |
| 2 | Website will load EDIT ICON section; |
| 3 | Website will display EDIT ICON page with its forms; |
| 4 | User MUST enter ICON NAME and choose an ICON IMAGE to upload; |
| 5 | Website will wait until one of the available options is chosen; |
| 6 | If user clicked on CANCEL during the process, the system will follow the "Y" path to diagram [2H1], otherwise it will follow the "N" path; |
| 7 | If SAVE CHANGES clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [2H1]; |
| 11 | The system will UPDATE ICON information and UPLOAD AN ICON IMAGE to image folder and goes to diagram [2H1]; |

Referring to FIG. 23X, beginning at 446, the following steps are performed.

TABLE 24

| Step | Action |
|---|---|
| 1 | Browser will display MANAGE ICON - DELETE title. |
| 2 | Website will ask user to CONFIRM ICON TO DELETE; If user clicked on NO during the process, the system will follow the "N" path to diagram [2H2], otherwise it will follow the "Y" path; |
| 3 | The system will delete selected ICON and ICON IMAGE, update icon database and goes to diagram [2H1]; |

Referring to FIG. 23Y, beginning at 448, the following steps are performed.

TABLE 25

| Step | Action |
|------|--------|
| 1 | Browser will display administrator SETTING - HEADER/FOOTER title. |
| 2 | Website will load HEADER/FOOTER section; |
| 3 | Website will display HEADER/FOOTER page with its forms; |
| 4 | User MUST enter administrator HEADER and administrator FOOTER; |
| 5 | Website will wait until one of the available options is chosen; |
| 6 | If user clicked on CANCEL during the process, the system will follow the "Y" path to diagram [2I], otherwise it will follow the "N" path; |
| 7 | If SAVE CHANGES clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [2I]; |
| 11 | The system will UPDATE HEADER AND FOOTER information and goes to diagram [2I]; |

Referring to FIG. 23Z, beginning at 450, the following steps are performed.

TABLE 26

| Step | Action |
|------|--------|
| 1 | Browser will display a security check page asking USERNAME and PASSWORD. |
| 2 | User MUST enter USERNAME and PASSWORD; |
| 3 | If USERNAME and PASSWORD are OK, then follow the "Y" path, otherwise, follow the "N" path; |
| 4 | With an authenticated user, the system will load the "User Administration Panel" homepage and will show all available menu option for this section; |
| 5 | The website will wait until the user choose one of the options on main menu; |
| 6 | If user chose PERSONAL MENU, a sub-menu with another options will appear and wait until one of its options are chosen; Its options are: (7) Edit Profile, (8) Upload Photo, (9) Upload Banner, (10) Manage Banner, (11) Change Password and (12) Log out; |
| 7 | If user chose PERSONAL MENU→EDIT PROFILE, it will follow "Y" path to diagram [3B], otherwise it will wait until the user's choice. |
| 8 | If user chose PERSONAL MENU→UPLOAD PHOTO, it will follow "Y" path to diagram [3C], otherwise it will wait until the user's choice. |
| 9 | If user chose PERSONAL MENU→UPLOAD BANNER, it will follow "Y" path to diagram [3D], otherwise it will wait until the user's choice. |
| 10 | If user chose PERSONAL MENU→MANAGE BANNER, it will follow "Y" path to diagram [3E], otherwise it will wait until the user's choice. |
| 11 | If user chose PERSONAL MENU→CHANGE PASSWORD, it will follow "Y" path to diagram [3F], otherwise it will wait until the user's choice. |
| 12 | If user chose PERSONAL MENU→LOG OUT, it will follow "Y" path to diagram [3G], otherwise it will wait until the user's choice. |
| 13 | If user chose PAGE MENU, a sub-menu with another option will appear and wait until one of its options are chosen; Its options is: (14) User Comments; |
| 14 | If user chose PAGE MENU→USER COMMENTS, it will follow "Y" path to diagram [3H], otherwise it will wait until the user's choice. |

Referring to FIG. 23AA, beginning at 452, the following steps are performed.

TABLE 27

| Step | Action |
|------|--------|
| 1 | Browser will display PERSONAL MENU-EDIT PROFILE title. |
| 2 | Website will load EDIT PROFILE section; |
| 3 | Website will display EDIT PROFILE page with its forms; |
| 4 | User MUST enter FIRST NAME, LAST NAME and EMAIL ADDRESS; |
| 5 | Website will wait until one of the available options is chosen; |
| 6 | If user clicked on CANCEL during the process, the system will follow the "Y" path to diagram [3A], otherwise it will follow the "N" path; |
| 7 | If EDIT YOUR PROFILE was clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [3A]; |
| 11 | The system will UPDATE USER PROFILE information and goes to diagram [3A]; |

Referring to FIG. 23BB, beginning at 454, the following steps are performed.

TABLE 28

| Step | Action |
|---|---|
| 1 | Browser will display PERSONAL MENU-UPLOAD PHOTO title. |
| 2 | Website will load UPLOAD PHOTO section and its available photos; |
| 3 | Website will display UPLOAD PHOTO and its available photos; |
| 4 | Website will wait until one of the available options is chosen; |
| 5 | If there are any previously photos added it will follow the "Y" path and a sub-menu for its photos will appear, otherwise it will follow the "N" path and only ADD NEW PHOTO must be showed; |
| 6 | If EDIT PHOTO is chosen it will follow "Y" path to diagram [3C3], otherwise it will await until the user's choice. |
| 7 | If DELETE PHOTO is chosen it will follow "Y" path to diagram [3C4], otherwise it will await until the user's choice. |
| 8 | If ADD PHOTO is chosen it will follow "Y" path to diagram [3C5], otherwise it will await until the user's choice. |
| 9 | If ADD PHOTO is chosen it will follow "Y" path to diagram [3C5], otherwise it will await until the user's choice. |

Referring to FIG. 23CC, beginning at 456, the following steps are performed.

TABLE 29

| Step | Action |
|---|---|
| 1 | Browser will display UPLOAD PHOTO - ADD PHOTO title. |
| 2 | Website will load ADD PHOTO section; |
| 3 | Website will display ADD PHOTO page with its forms; |
| 4 | User MUST enter PHOTO NAME and choose a PHOTO to upload; |
| 5 | Website will wait until one of the available options is chosen; |
| 6 | If user clicked on CANCEL during the process, the system will follow the "Y" path to diagram [3C1], otherwise it will follow the "N" path; |
| 7 | If ADD NEW PHOTO clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [3C1]; |
| 11 | The system will ADD THE PHOTO information and UPLOAD THE PHOTO to image folder and goes to diagram [3C1]; |

Referring to FIG. 23DD, beginning at 458, the following steps are performed.

TABLE 30

| Step | Action |
|---|---|
| 1 | Browser will display UPLOAD PHOTO - EDIT PHOTO title. |
| 2 | Website will load EDIT PHOTO section; |
| 3 | Website will display EDIT PHOTO page with its forms; |
| 4 | User MUST enter PHOTO NAME and choose a PHOTO to upload; |
| 5 | Website will wait until one of the available options is chosen; |
| 6 | If user clicked on CANCEL during the process, the system will follow the "Y" path to diagram [3C1], otherwise it will follow the "N" path; |
| 7 | If SAVE CHANGES clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [3C1]; |
| 11 | The system will UPDATE PHOTO information and UPLOAD THE PHOTO to image folder and goes to diagram [3C1]; |

Referring to FIG. 23EE, beginning at 460, the following steps are performed.

TABLE 31

| Step | Action |
|---|---|
| 1 | Browser will display UPLOAD PHOTO - DELETE PHOTO title. |
| 2 | Website will ask user to CONFIRM PHOTO TO DELETE; |
| 3 | If user clicked on NO during the process, the system will follow the "N" path to diagram [2C2], otherwise it will follow the "Y" path; |
| 4 | The system will delete selected PHOTO information and PHOTO, update photo database and goes to diagram [3C1]; |

Referring to FIG. 23FF, beginning at 462, the following steps are performed.

TABLE 32

| Step | Action |
|---|---|
| 1 | Browser will display PERSONAL MENU - UPLOAD BANNER title. |
| 2 | Website will load UPLOAD BANNER section and its available photos; |
| 3 | Website will display UPLOAD BANNER and its available photos; |
| 4 | Website will wait until one of the available options is chosen; |
| 5 | If there are any previously banners added it will follow the "Y" path and a sub-menu for its banners will appear, otherwise it will follow the "N" path and only ADD NEW BANNER must be showed; |
| 6 | If EDIT BANNER is chosen it will follow "Y" path to diagram [3D3], otherwise it will await until the user's choice. |
| 7 | If DELETE BANNER is chosen it will follow "Y" path to diagram [3D4], otherwise it will await until the user's choice. |
| 8 | If ADD BANNER is chosen it will follow "Y" path to diagram [3D5], otherwise it will await until the user's choice. |
| 9 | If ADD BANNER is chosen it will follow "Y" path to diagram [3D5], otherwise it will await until the user's choice. |

Referring to FIG. 23GG, beginning at 464, the following steps are performed.

TABLE 33

| Step | Action |
| --- | --- |
| 1 | Browser will display UPLOAD BANNER - EDIT BANNER title. |
| 2 | Website will load EDIT BANNER section; |
| 3 | Website will display EDIT BANNER page with its forms; |
| 4 | User MUST enter BANNER NAME and choose a BANNER to upload; |
| 5 | Website will wait until one of the available options is chosen; |
| 6 | If user clicked on CANCEL during the process, the system will follow the "Y" path to diagram [3D1], otherwise it will follow the "N" path; |
| 7 | If SAVE CHANGES clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [3D1]; |
| 11 | The system will UPDATE BANNER information and UPLOAD THE BANNER to image folder and goes to diagram [3C1]; |

Referring to FIG. 23HH, beginning at 464, the following steps are performed.

TABLE 34

| Step | Action |
| --- | --- |
| 1 | Browser will display UPLOAD BANNER - ADD BANNER title. |
| 2 | Website will load ADD BANNER section; |
| 3 | Website will display ADD BANNER page with its forms; |
| 4 | User MUST enter BANNER NAME and choose a BANNER to upload; |
| 5 | Website will wait until one of the available options is chosen; |
| 6 | If user clicked on CANCEL during the process, the system will follow the "Y" path to diagram [3D1], otherwise it will follow the "N" path; |
| 7 | If ADD NEW BANNER clicked, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [3D1]; |
| 11 | The system will ADD THE BANNER information and UPLOAD THE BANNER to image folder and goes to diagram [3D1]; |

Referring to FIG. 23II, beginning at 468, the following steps are performed.

TABLE 35

| Step | Action |
| --- | --- |
| 1 | Browser will display UPLOAD BANNER - DELETE BANNER title. |
| 2 | Website will ask user to CONFIRM BANNER TO DELETE; if user clicked on NO during the process, the system will follow the "N" path to diagram [3D2], otherwise it will follow the "Y" path; |
| 3 | The system will delete selected BANNER information and BANNER, update banner database and goes to diagram [3C1]; |

Referring to FIG. 23JJ, beginning at 470, the following steps are performed.

TABLE 36

| Step | Action |
| --- | --- |
| 1 | Browser will display PERSONAL MENU - MANAGE BANNER title. |
| 2 | Website will load MANAGE BANNER section; |
| 3 | Website will display MANAGE BANNER page with its forms; |
| 4 | User MUST choose the DEFAULT BANNER; |
| 5 | Website will wait until one of the available options is chosen; |

TABLE 36-continued

| Step | Action |
| --- | --- |
| 6 | If user clicked on CANCEL during the process, the system will follow the "Y" path to diagram [3A], otherwise it will follow the "N" path; |
| 7 | If BANNER is chosen, the system will follow the "Y" path, otherwise it will follow the "N" path; |
| 8 | If all submitted data are correct, it will follow the "Y" path, otherwise it will follow the "N" path; |
| 9 | If an error happens, an error message will be showed and user can choose to try again; |
| 10 | If user wants to try again it will follow the "Y" path, otherwise it will follow the "N" path to diagram [3A]; |
| 11 | The system will UPDATE DEFAULT BANNER information into database system and goes to diagram [3A]; |

Referring to FIG. 23KK, beginning at 472, the following steps are performed.

TABLE 37

| Step | Action |
| --- | --- |
| 1 | Browser will display PERSONAL MENU - CHANGE PASSWORD title. |
| 2 | Website will load CHANGE PASSWORD section; |
| 3 | Website will display CHANGE PASSWORD page with its forms; |
| 4 | User MUST enter OLD PASSWORD, NEW PASSWOR and CONFIRM NEW PASSWORD; |
| 5 | If user clicked on CANCEL during the process, the system will follow the "Y" path to diagram [3A], otherwise it will follow the "N" path; |
| 6 | If CHANGE YOUR PASSWORD was clicked, the system will follow the "Y" path, otherwise it will follow the "N" path; |
| 7 | If all submitted data are correct, it will follow the "Y" path, otherwise it will follow the "N" path; |
| 8 | If an error happens, an error message will be showed and user can choose to try again; |
| 9 | If user wants to try again it will follow the "Y" path, otherwise it will follow the "N" path to diagram [3A]; |
| 10 | The system will UPDATE PASSWORD information into database system and goes to diagram [3A]; |

Referring to FIG. 23LL, beginning at 474, the following steps are performed.

TABLE 38

| Step | Action |
| --- | --- |
| 1 | Browser will display LOG OUT title. |
| 2 | Website will clear all log in information and goes to diagram [3]; |

Referring to FIG. 23MM, beginning at 476, the following steps are performed.

TABLE 39

| Step | Action |
|---|---|
| 1 | Browser will display PERSONAL MENU - USER COMMENTS title. |
| 2 | Website will load USER COMMENTS section and all available users' comments; |
| 3 | Website will display USER COMMENTS page with its forms; |
| 4 | Website will wait until one of the available options is chosen; |
| 5 | If Title is chosen the system will follow the "Y" path, otherwise it will follow the "N" path; |
| 6 | Website will load the selected category and will check for available sub-categories; |
| 7 | If there are sub-categories, it will follow the "Y" path, otherwise it will follow the "N" path; |
| 8 | The system will display all available sub-categories for selected category and its next levels; |
| 9 | User MUST enter COMMENT TITLE, COMMENT, choose ICON, select which PERSONAL INFORMATION the system will display, and select ACCESS TYPE; |
| 10 | If Enlarge Writing Area was clicked it will follow the "Y" path, otherwise it will follow the "N" path; |
| 11 | As soon Enlarge Writing Area is chosen, the COMMENT field will be resized either to a bigger writing area or, if it already resized, will be resized to its initial size; |
| 12 | If all information were submitted it will follow the "Y" path, otherwise it will follow the "N" path; |
| 13 | If all submitted data are correct, it will follow the "Y" path, otherwise it will follow the "N" path; |
| 14 | If an error happens, an error message will be showed and user can choose to try again; |
| 15 | If user wants to try again it will follow the "Y" path, otherwise it will follow the "N" path to diagram [3]; |
| 16 | The system will ADD COMMENT information into database system and goes to diagram [3]; |

Referring to FIG. 23NN, beginning at 480, the following steps are performed.

TABLE 40

| Step | Action |
|---|---|
| 1 | Browser will display WEALTHYSOULJOURNAL.COM HOMEPAGE (A.K.A. End Users' Comments Page) title. |
| 2 | Website will load HEADER, COMMENT FORMS, IFRAME SUBSTITUTE (described on DIAGRAM 5 file) and FOOTER sections; |
| 3 | Website will display HEADER, COMMENT FORMS, IFRAME SUBSTITUTE (described on DIAGRAM 5 file) and FOOTER sections; |
| 4 | User MUST enter COMMENT, NAME and EMAIL ADDRESS; |
| 5 | Website will wait until one of the available options is chosen; |
| 6 | If CLEAR FORM was clicked the system will follow the "Y" path, otherwise it will follow the "N" path; |
| 7 | The system will clear any information that user added to comments forms; |
| 8 | If User's comments were submitted it will follow the "Y" path, otherwise it will follow "N" path; |
| 9 | If all submitted data are correct, it will follow the "Y" path, otherwise it will follow the "N" path; |
| 10 | If an error happens, an error message will be showed and user can choose to try again; |
| 11 | If user wants to try again it will follow the "Y" path, otherwise it will follow the "N" path to diagram [4A]; |
| 12 | The system will ADD USER'S COMMENT information into database system and goes to diagram [4A] |

Referring to FIG. 23OO, beginning at 482, the following steps are performed.

TABLE 41

| Step | Action |
|---|---|
| 1 | Browser will display an iFrame DIV into HTML body's layout; |
| 2 | Browser will display a LOADING PAGE until all iFrame is loaded; |
| 3 | Website will send its ID to comments database to identify which data will be loaded; |

TABLE 41-continued

| Step | Action |
| --- | --- |
| 4 | Website will load Comment Title, Keyword (used for Search Engine Optimizations), Full Comment, Personal Data, Date and Time for each comment; |
| 5 | If all data is already loaded it will follow the "Y" path, otherwise it will follow the "N" until all available data is loaded; |
| 6 | Website will load user's template that was chosen into "User's administrator Panel"; |
| 7 | If template is loaded, all data will be formatted into it and the website will create the complete comments' page; |
| 8 | If iFrame is fully loaded it will follow the "Y" path, otherwise it will follow the "N" until all available data is loaded; |
| 9 | With all data loaded, another script will detect if these data has been fit into the actual height, or if it needs to be resized. If it has been fit then the script will follow the "Y" path, if not, it will follow the "N" path; |
| 10 | When the loaded data can't fit into its actual iFrame height, another script will be triggered and a new height will be calculated; |
| 11 | When the new height has been calculated, this script will resize the iFrame to its new height and will fit it into the all page content; |
| 12 | With all internal iFrame process is done, it will remove the LOADER PAGE from iFrame Substitute Area and goes to diagram [4B]; |

Figure 24:
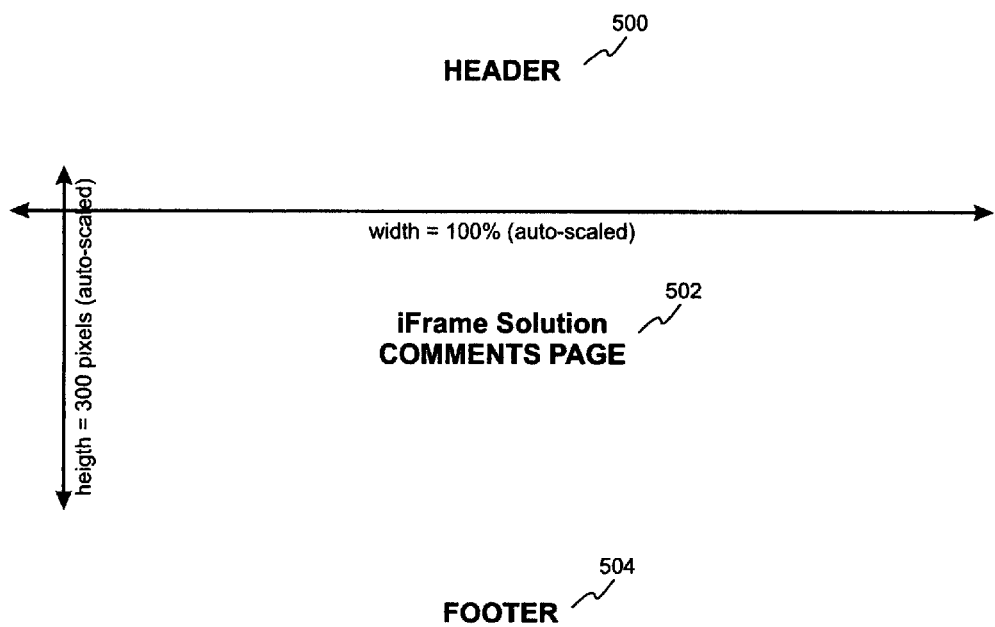
FIG. 24 is a sample web page comprising a reader comment area according to an example embodiment of the present invention.

The present invention comprises an "iFrame solution" to add reader comment areas to web pages. The "iFrame solution" of the present invention may be implemented with an existing web page framework. In the following example, the www.wealthysoul.com domain is used. An iFrame is a webpage element that creates an inline frame that contains another document. An iFrame functions as a document within a document, or like a floating FRAME. It just loads another HTML document within the <iframe> tags. Syntax <IFRAME> . . . </IFRAME>. The following example uses the IFRAME element and an HTML fragment to create a frame containing the page sample.htm as shown in FIG. 24. The page comprises a header 500, comments page 502, and footer 504. Comments, therefore, may be added within any section of a HTML document comprising the iFrame solution of the present invention.

TABLE 42

| Code | Parameters for IFrame |
| --- | --- |
| <IFRAME SRC=URI ID="iFrame1" | (URI of frame content) NAME=CDATA (name of frame) |
| FRAMEBORDER="0" SCROLLING="NO" SRC="sample.htm"> | LONGDESC=URI (link to long description) WIDTH=Length (frame width) HEIGHT=Length (frame height) ALIGN=[ top \| middle \| bottom \| left \| right ] (frame alignment) |
| </IFRAME> | MARGINWIDTH=Pixels (margin width) MARGINHEIGHT=Pixels (margin height) FRAMEBORDER=[ 1 \| 0 ] (frame border) SCROLLING=[ yes \| no \| auto ] (ability to scroll) |

The embedded technologies into iFrame solution are HTML, PHP, Javascript, MySQL, CSS and AJAX methods.

Figure 25:
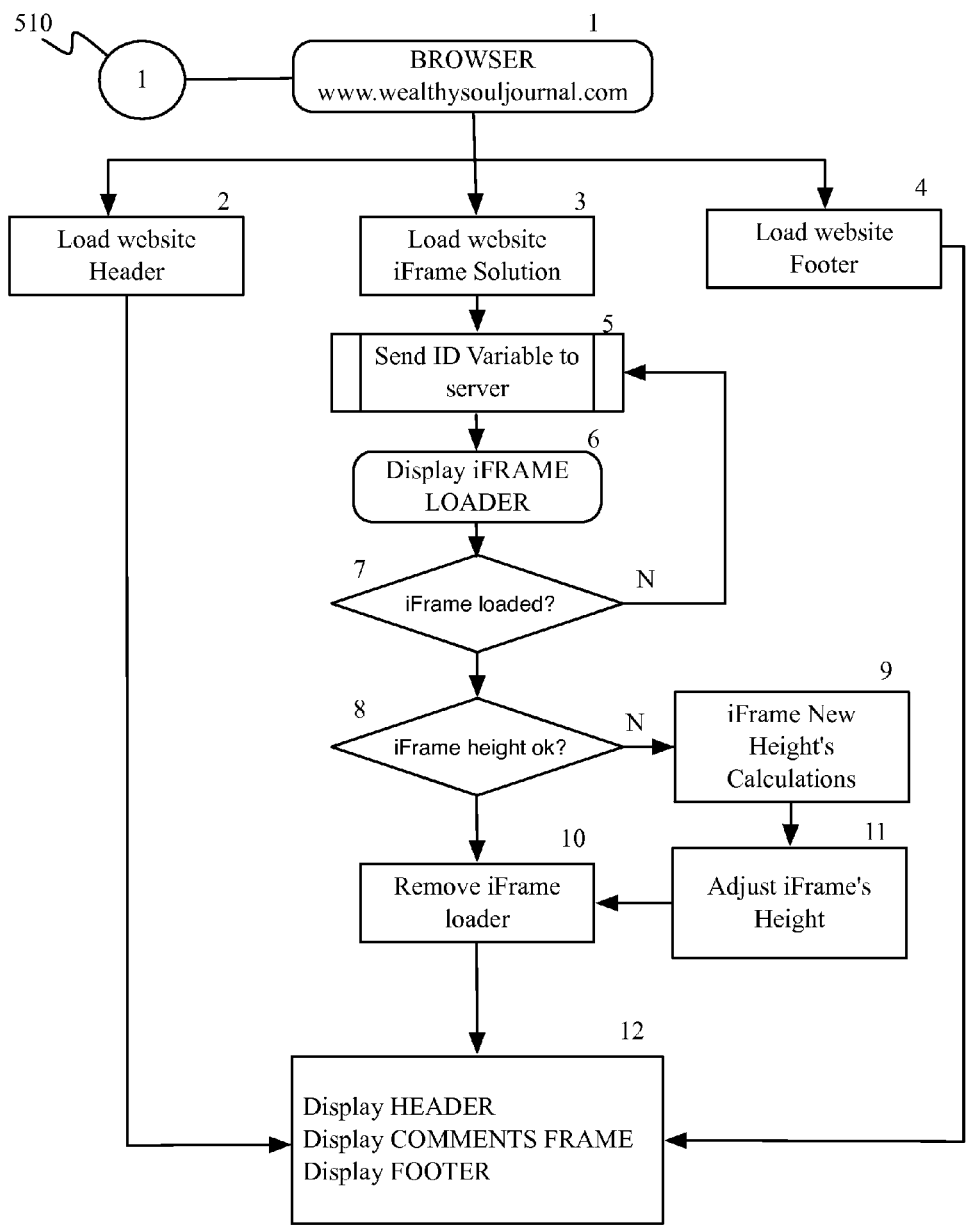
FIG. 25 is a flowchart illustrating an iFrame solution for a reader comment area according to an example embodiment of the present invention.

Referring to FIG. 25, a flowchart illustrating the iFrame substitution solution according to an example embodiment of the present invention is shown. Referring to FIG. 25, beginning at 510, the following steps are performed to implement the iFrame solution.

TABLE 43

| Step | Action |
| --- | --- |
| 1 | With any ECMA-262 compatible browsers (Internet Explorer 5+, FireFox 1.5+, Opera 8+, etc), the user will access URL given in this example (www.wealthysoul.com); |
| 2 | Accessing the domain, the main framework will load its HEADER information and will display it as seen FIG. 24 header 500; |
| 3 | Accessing the domain, the main framework will load its FOOTER information and will display it as seen in FIG. 24 footer 500; |
| 4 | The iFrame will load an internal PHP dynamic page called comments.php. |
| 5 | Starting the loading functions, the framework should detect its domain (in this example, www.wealthysoul.com), and will send an ID variable that will define which data the comments.php page must load, as all its CSS styles; |
| 6 | As soon as comments.php start its function, a Javascript code will load a DIV tag who will display an 100% opaque image (white board in the example given), displaying an animated gif showing "LOADING"; |
| 7 | Into the HEAD TAG, an OnLoad trigger will start another script as soon as all contents from database is loaded as noticed into "Y" path. If all data haven't been loaded yet, the loader DIV will stay on screen as noticed into the "N" path; |
| 8 | With all data loaded, another script will detect if these data has been fit into the actual height, or if it needs to be resized. If it has been fit then the script will follow the "Y" path, if not, it will follow the "N" path; |
| 9 | When the loaded data can't fit into its actual iFrame height, another script will be triggered and a new height will be calculated; |

TABLE 43-continued

| Step | Action |
|---|---|
| 10 | When the new height has been calculated, this script will resize the iFrame to its new height and will fit it into the all page content; |
| 11 | After all scripts have been executed and none has failed, the iFrame LOADER DIV will be removed and the loaded data will be revealed. |
| 12 | HEADER, comments.php iFrame and FOOTER will be revealed into user's browser (e.g., as shown in FIG. 24: header 500, comments page 502, footer 504. |

The iFrame substitution solution of the present invention allows the reader comments to be stored at a web site remote from the administrator's hosting web site resulting in many benefits for the web site administrator and the readers who enter comments on the administrator's web site. While certain exemplary embodiments are described in detail above, the scope of the application is not to be considered limited by such disclosure, and modifications are possible without departing from the spirit of the invention as evidenced by the following claims.

What is claimed is:

1. A computerized method effecting entity interaction with a web page hosted at a first web site server to be viewable by others on a second web page hosted at a second web site server, the method comprising the actions of:

embedding executable code within a first internet accessible web page hosted at the first web site server that when executed during the rendering of the first web page instantiates the display of a reader interaction function within the first web page which is incorporated and displayed within renderings of the first web page when accessed on the first web site server;

receiving an actuation of the reader interaction function by an entity that is accessing the first web page;

responding to receiving that actuation by sending data identifying the first web page to a remote second web site server, said data being stored in a database separate from said first web site server;

displaying within a second internet accessible web page that is hosted by the second website server, information based on the data identifying the first web page thus resulting in the second web page providing an indication that the reader interaction function has been actuated for that first web page; and providing an option for the reader to manage his or her reader interactions with a plurality of web pages by publishing the reader interactions on a personal journal page.

2. The method of claim 1, wherein the action of receiving an actuation of the reader interaction function further comprises the first web site server receiving a comment provided by the entity; and the action of sending data comprises sending the comment.

3. The method of claim 1, further comprising the action of rendering the reader interaction function along with the content of first web page such that a user can view the reader interaction function along with the first web page.

4. A computerized method for receiving and managing data provided by an entity and that is provided in association with at least a portion of the content of a web page, the computerized method comprising:

a first web site server displaying a first publicly accessible web page comprising a user interaction function associated with at least a portion of the content of the first web page;

the first web site server receiving data indicating an actuation of the user interaction function by an entity interfacing with the first web page;

the first web site server associating the received data with the first web page;

sending the data associated with the first web page to a remote second web site server such that the data can be stored at the remote second web site server within a database that is remote from the first web site server and then rendered on a display of a system accessing a second publicly accessible web page hosted by the second web site server; and providing an option for the reader to manage his or her reader interactions with a plurality of web pages by publishing the reader interactions on a personal journal page.

5. The computerized method of claim 4, wherein the action of the first web site server receiving data indicating an actuation of the user interaction function further comprises receiving a comment sourced by the entity and, the first web site server including the comment when sending the data.

6. The computerized method of claim 5, wherein the action of the first web site server receiving data indicating an actuation of the user interaction function further comprises receiving an indication that the comment is private.

7. A computerized method for receiving and managing reader interactions associated with at least a portion of the content rendered for a first publicly accessible web page, wherein a first web site server renders the first publicly accessible web page and modifies the first publicly accessible web page to include a reader interaction function, the reader interaction function being configured to receive data in conjunction with an actuation of the reader interaction function, the data being provided by a reader of the first publicly accessible web page displayed by the first web site server, the method comprising the actions of;

receiving at a remote second web site server data sent from the first web site server, the data including an indication of the at least a portion of the content rendered for the first publicly accessible web page, the data being transferred upon said user actuating the reader interaction function;

storing at the remote second web site server, using a database that is remote from the first web site server the data;

providing access to the stored data received from the first web site server to a second publicly accessible web page for display within the second publicly accessible web page; and providing an option for the reader to manage his or her reader interactions with a plurality of web pages by publishing the reader interactions on a personal journal page.

8. The method of claim 7, wherein the action of receiving an actuation of the reader interaction function further comprises the first web site server receiving a comment provided by the entity; and the action of sending data comprises sending the comment without converting the comment to or from an instant message.

9. A computerized method for allowing interaction with a web page hosted at a first web site server, the method comprising the actions of:
- incorporating code within a first web page hosted at the first web site server, said code providing a reader interaction function within the first web page and being incorporated by the first web site server along with the first web page;
- receiving an actuation of the reader interaction function by an entity accessing the first web page;
- in response to receiving the actuation, sending data identifying the first web page to a remote second web site server, said data being stored in a database separate from said first web site server; and
- displaying within a second web page, information based on the data identifying the first web page thus indicating that the reader interaction function has been actuated for that first web page, the information being displayed without any connection to any other content; and
- providing an option for the reader to manage his or her reader interactions with a plurality of web pages by publishing the reader interactions on a personal journal page.

* * * * *